United States Patent [19]
Lee et al.

[11] Patent Number: 5,592,226
[45] Date of Patent: Jan. 7, 1997

[54] METHOD AND APPARATUS FOR VIDEO DATA COMPRESSION USING TEMPORALLY ADAPTIVE MOTION INTERPOLATION

[75] Inventors: Jungwoo Lee, Princeton; Bradley W. Dickinson, Lawrenceville, both of N.J.

[73] Assignee: BTG USA Inc., Gulph Mills, Pa.

[21] Appl. No.: 187,595

[22] Filed: Jan. 26, 1994

[51] Int. Cl.$^6$ ............... H04N 7/30; H04N 7/32
[52] U.S. Cl. ............ 348/413; 348/407; 348/416; 348/402; 348/700
[58] Field of Search ............... 348/700, 699, 348/416, 412, 413, 398, 407, 403, 405, 415, 384, 390, 401, 409, 402; H04N 7/137, 7/133

[56] References Cited

U.S. PATENT DOCUMENTS

| | | | |
|---|---|---|---|
| 4,383,272 | 10/1983 | Netravali | 348/416 |
| 4,816,906 | 3/1989 | Kummerfeldt et al. | 348/402 |
| 4,862,264 | 8/1989 | Wells et al. | 348/416 |
| 4,947,248 | 8/1990 | Hienerwadel et al. | 348/415 |
| 4,972,261 | 11/1990 | Whalley | 348/415 |
| 4,982,285 | 1/1991 | Sugiyama | 348/415 |
| 4,989,089 | 1/1991 | Chantelou et al. | 348/416 |
| 4,991,009 | 2/1991 | Suzuki et al. | 348/415 |

(List continued on next page.)

FOREIGN PATENT DOCUMENTS

| | | | |
|---|---|---|---|
| 405842 | 1/1991 | European Pat. Off. | H04N 7/30 |
| 414113 | 2/1991 | European Pat. Off. | H04N 7/32 |
| 444839 | 9/1991 | European Pat. Off. | H04N 7/32 |
| 472806 | 3/1992 | European Pat. Off. | H04N 5/14 |
| 474388 | 3/1992 | European Pat. Off. | H04N 7/32 |
| 520789 | 12/1992 | European Pat. Off. | H04N 7/30 |
| 518314 | 12/1992 | European Pat. Off. | H04N 7/32 |
| 540961 | 5/1993 | European Pat. Off. | H04N 7/30 |
| 584840 | 3/1994 | European Pat. Off. | H04N 7/30 |
| 597647 | 5/1994 | European Pat. Off. | H04N 7/32 |
| 2153625 | 8/1985 | United Kingdom | H04N 5/14 |
| WO9309637 | 5/1993 | WIPO | H04N 7/30 |

OTHER PUBLICATIONS

A. Puri and R. Aravind, "On comparing motion–interpolation structures for video coding," In SPIE Conf. Vis. Commun. and Image Proc., pp. 1560–1571, 1990.

M. Nomura, T. Fujii, and N. Ohta, "Basic characteristic of variable rate video coding in ATM environment," IEEE J. Selected Areas Commun., vol. 7, No. 5, pp. 752–760, Jun. 1989.

M. Nomura, T. Fujii, and N. Ohta, "Layered coding for ATM based video distribution systems," Signal Processing: Image Commun., vol. 3, No. 4, pp. 301–311, Sep. 1991.

(List continued on next page.)

*Primary Examiner*—Tommy P. Chin
*Assistant Examiner*—Vu Le
*Attorney, Agent, or Firm*—Watov & Kipnes, P.C.

[57] ABSTRACT

In a system for compressing video data, temporally adaptive motion interpolation based upon temporal characteristics of human vision is used for establishing threshold levels relative to the degree of motion as a whole (global motion) between frames. The global motion between successive frames in a group of pictures (GOP) is measured to determine if the motion is less or greater than the established threshold levels for determining the designation of I, P, and B frames, spacing between I and P reference frames, and the number of bits used for each frame, and B frames therebetween.

44 Claims, 70 Drawing Sheets

TYPICAL MOTION COMPENSATION ENCODER

U.S. PATENT DOCUMENTS

| | | | |
|---|---|---|---|
| 4,996,594 | 2/1991 | Murayama | 348/409 |
| 4,999,704 | 12/1991 | Ando | 348/401 |
| 5,028,996 | 7/1991 | Takahashi et al. | 348/420 |
| 5,049,991 | 9/1991 | Niihara | 348/416 |
| 5,057,921 | 10/1991 | Robert et al. | 348/439 |
| 5,068,722 | 11/1991 | Suigiyama | 348/699 |
| 5,132,792 | 7/1992 | Yonemitsu et al. | 348/699 |
| 5,134,476 | 7/1992 | Aravind et al. | 348/415 |
| 5,142,361 | 8/1992 | Tayama et al. | 348/416 |
| 5,155,593 | 10/1992 | Yonemitsu et al. | 348/413 |
| 5,157,742 | 10/1992 | Niihara | 348/699 |
| 5,159,447 | 10/1992 | Haskell et al. | 348/409 |
| 5,193,003 | 3/1993 | Kondo | 348/409 |
| 5,214,507 | 5/1993 | Aravind et al. | 348/415 |
| 5,227,878 | 7/1993 | Puri et al. | 348/699 |
| 5,231,484 | 7/1993 | Gonzales et al. | 348/405 |
| 5,233,417 | 8/1993 | Nouso | 348/208 |
| 5,237,405 | 8/1993 | Egusa et al. | 348/208 |
| 5,237,410 | 8/1993 | Inoue | 348/417 |
| 5,267,334 | 11/1993 | Normille et al. | 382/56 |
| 5,293,229 | 3/1994 | Iu | 348/415 |
| 5,369,449 | 11/1994 | Yukitake et al. | 348/416 |
| 5,404,174 | 4/1995 | Sugahara | 348/700 |

OTHER PUBLICATIONS

B. Girod, "The information theoretical significance of spatial and temporal masking in video signals," in SPIE Conf. Human Vision, Visual Processing, and Digital Display, vol. 1077, pp. 178–187, 1989.

W. G. Owen, "Spatio-temporal integration in the human peripheral retina," Vision Research, vol. 12, pp. 1011–1026, 1972.

D. Kahneman, "Time intensity reciprocity under various conditions of adaption and backward masking," Journal of Experimental Psychology, vol. 71, pp. 543–549, 1966.

A. J. Seyler and Z. L. Budrikis, "Detail perception after scene changes in television image presentation," IEEE Trans. Inform. Theory, vol. IT–11, No. 1, pp. 31–43, Jan. 1965.

R. N. Haber, The Psychology of Visual Perception, pp. 124–134, Holt, Rinehart and Winston Inc., 1973.

D. A. Robinson, "The mechanics of human smooth pursuit eye movement," J. of Physiology, No. 180, pp. 569–591, 1965.

B. Girod, "Eye movements and coding of video sequences," SPIE Conf. Vis. Commun. and Image Proc., vol. 1001, pp. 398–405, 1988.

M. J. Swain and D. H. Ballard, "Color indexing," Int. J. of Computer Vision, vol. 7, No. 1, pp. 11–32, 1991.

V. Seferidis and M. Ghanbari, "Image sequence coding using temporal co-occurrence matrices," Signal Processing: Image Commun, vol. 4, No. 3, pp. 185–193, 1992.

G. Karlsson and M. Vetterli, "Three Dimensional Subband Coding of Video," Proc. ICASSP 88, pp. 1100–1103, Apr. 1988.

Y. Q. Zhang and S. Zafar, "Motion Compensated Wavelet Transform Coding for Color Video Compression," IEEE Trans. Circuits Syst. Video Technol., vol. 2, pp. 285–296, Sep. 1992.

D. LeGall and A. Tabatabai, "Subband Coding of Digital Images using Symmetric Kernel Filters and Arithmetic Coding Techniques," Proc. ICASSP 8, pp. 761–763, Apr. 1988.

Jungwoo Lee and Bradley W. Dickinson, "Seene Adaptive Motion Interpolation Structures Based on Temporal Masking in Human Visual Perception," Proc. SPIE Conf. on Visual Communication and Image Processing, Boston, SPIE Proceedings 2094, pp. 499–510, Nov. 9–11, 1993.

Jungwoo Lee and Bradley W. Dickinson, "Motion Interpolation using Optimally Spaced Temporal Segmentation Based on Temporal Masking in Human Visual System," Proc. Eighth IEEE Workshop on Image and Multidimensional Signal Processing, Cannes, France, pp. 228–229, Sep. 8–10, 1993.

Jungwoo Lee and Bradley W. Dickinson, "Image Sequence Coding using Temporally Segmented Motion Interpolation Based on Temporal Masking in Human Visual System," Proc. 1993 IEEE Asia-Pacific Conf. on Communications, Taejon, Korea, pp. 73–76, Aug. 25–27, 1993.

PCT Notification Of Transmittal Of The International Search Report, dated Jun. 19, 1995; and PCT International Search Report From Corresponding PCT/US95/00773 (7 pages).

Patent Abstracts Of Japan; Yasuoka Masahiro et al.; JP5122684; May 18, 1993. "Dynamic Image Encoding System"; Abstract—Kimura Junichi et al; JP6054319; Feb. 25, 1994; Inter-Frame Encoder.

Abstract—Kosugi Yasuhiro et al; JP63232691; Sep. 28, 1988; "System For Encoding Image".

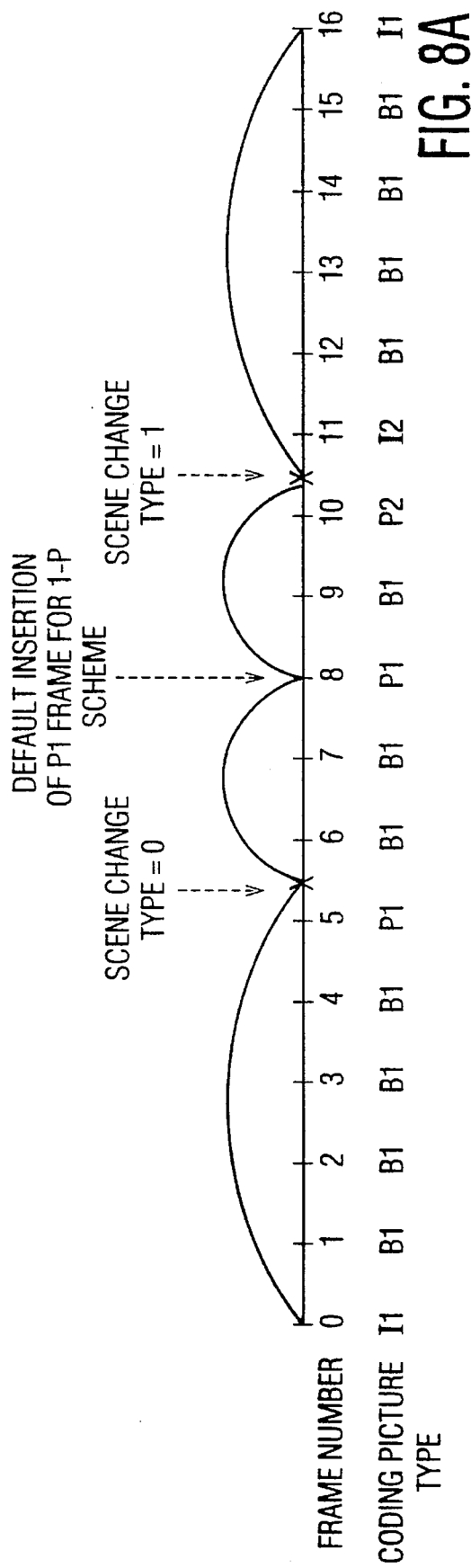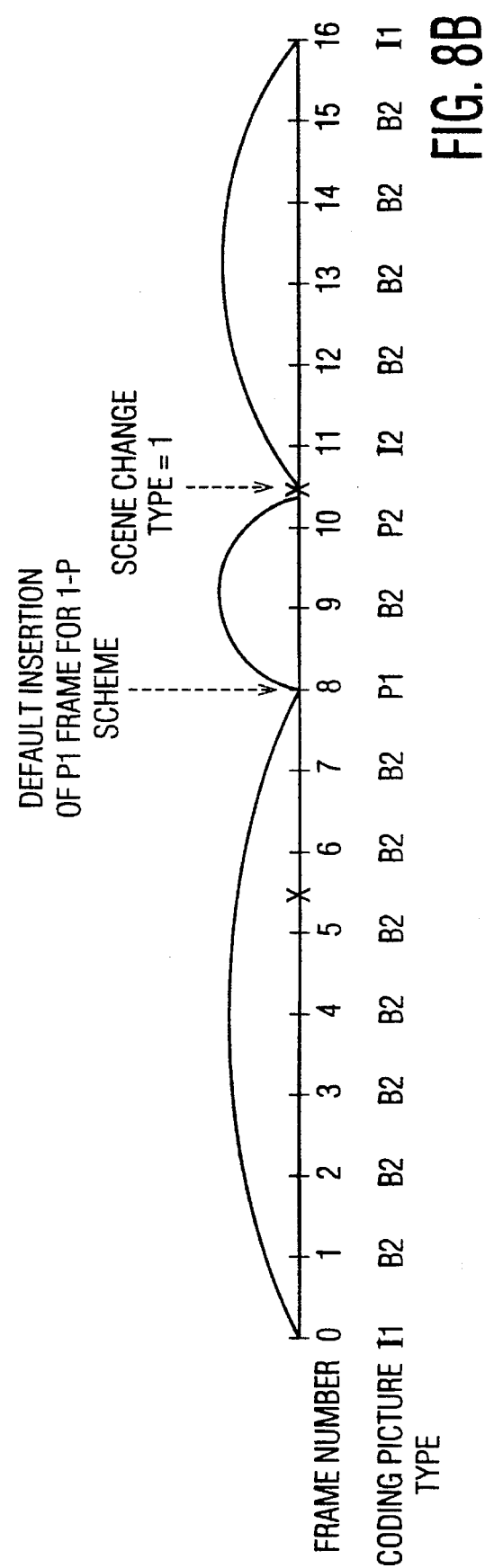

| STATISTICS | FIXED | 0-P | 1-P | 2-P | 3-P |
|---|---|---|---|---|---|
| TARGET BITS | 24.55 | 24.55 | 24.55 | 24.55 | 24.55 |
| AVERAGE BITS USED | 24,783 | 26,070 | 26,368 | 24,561 | 24,664 |
| AVERAGE SNR(Y) | 33.47 | 34.40 | 34.51 | 34.03 | 33.88 |
| AVERAGE SNR(U) | 39.37 | 40.57 | 40.45 | 39.93 | 39.28 |
| AVERAGE SNR(V) | 38.48 | 39.04 | 39.27 | 38.95 | 38.90 |

FIG. 20

| STATISTICS | FIXED | 0-P | 1-P | 2-P | 3-P |
|---|---|---|---|---|---|
| TARGET BITS | 24.55 | 24.55 | 24.55 | 24.55 | 24.55 |
| AVERAGE BITS USED | 25,902 | 26,503 | 26,432 | 26,177 | 24,446 |
| AVERAGE SNR(Y) | 32.45 | 32.65 | 32.97 | 32.69 | 32.46 |
| AVERAGE SNR(U) | 39.26 | 40.24 | 40.10 | 39.68 | 39.45 |
| AVERAGE SNR(V) | 38.12 | 38.47 | 38.59 | 38.37 | 38.20 |

FIG. 21

| STATISTICS | FIXED | 0-P | 1-P | 2-P | 3-P |
|---|---|---|---|---|---|
| TARGET BITS | 10.00 | 10.00 | 10.00 | 10.00 | 10.00 |
| AVERAGE BITS USED | 9,557 | 10,705 | 10,708 | 9,827 | 9,887 |
| AVERAGE SNR(Y) | 29.30 | 30.12 | 30.47 | 30.09 | 30.03 |
| AVERAGE SNR(U) | 36.43 | 37.50 | 37.61 | 37.25 | 37.16 |
| AVERAGE SNR(V) | 35.53 | 35.64 | 36.12 | 35.91 | 35.94 |

| FRAME RANGE | DOH | | HOD | | BH | | BV | | MCE | |
|---|---|---|---|---|---|---|---|---|---|---|
| | SNR | BIT | SNR | BIT | SNR | BIT | SNR | BIT | SNR | BIT |
| 89-149 | 34.29 | 27238 | 34.43 | 27362 | 34.39 | 27486 | 34.26 | 26994 | 34.40 | 27450 |
| 120-180 | 32.91 | 26510 | 32.77 | 26692 | 32.89 | 26527 | 32.81 | 26462 | 32.93 | 26932 |
| 0-60 | 31.42 | 27139 | 31.28 | 27080 | 31.32 | 27293 | 30.66 | 27942 | 31.38 | 27760 |
| AVERAGE | 32.87 | 26962 | 32.82 | 27044 | 32.86 | 27102 | 32.57 | 27132 | 32.90 | 27380 |

FIG. 27

| FRAME RANGE | DOH | | HOD | | BH | | BV | | MCE | |
|---|---|---|---|---|---|---|---|---|---|---|
| | SNR | BIT | SNR | BIT | SNR | BIT | SNR | BIT | SNR | BIT |
| 89-149 | 34.41 | 27018 | 34.48 | 26956 | 34.56 | 27137 | 34.49 | 26908 | 34.35 | 28333 |
| 120-180 | 32.94 | 25915 | 32.88 | 26805 | 32.94 | 26360 | 32.79 | 26283 | 32.97 | 26902 |
| 0-60 | 31.49 | 27519 | 31.27 | 27097 | 31.40 | 27289 | 30.60 | 27548 | 31.88 | 27754 |
| AVERAGE | 32.95 | 26817 | 32.87 | 26952 | 32.96 | 26928 | 32.63 | 26913 | 32.90 | 27663 |

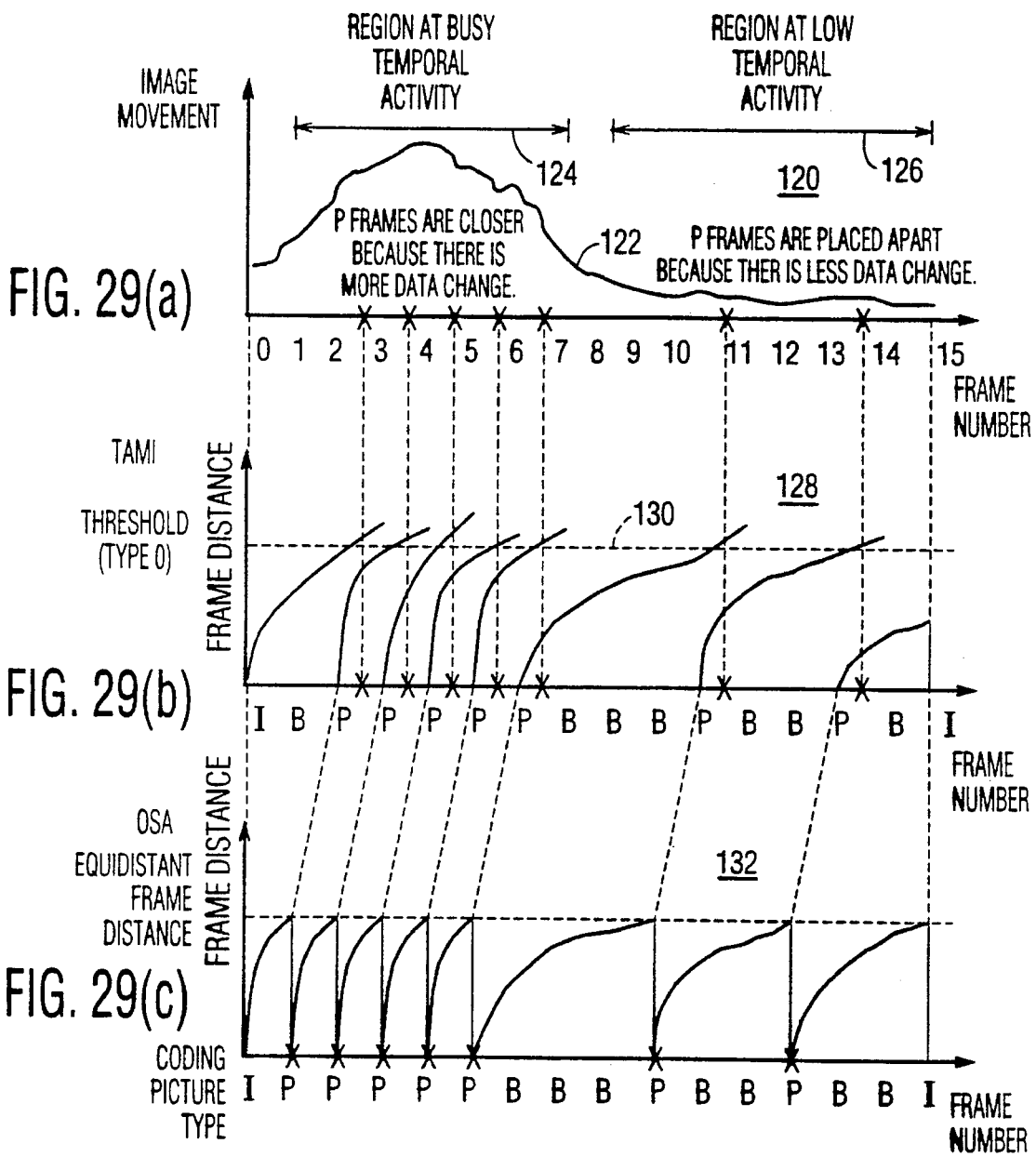

| PMS | PMODE | IMODE | BMODE |
|-----|-------|-------|-------|
| 0,1 | I1,I2 | 1 | 0 |
| 2,3 | P1,P2 | 0 | 0 |
| 4,5 | B1,B2 | 0 | 1 |

| STATISTIC | FIXED | | TAMI | |
|---|---|---|---|---|
| | YSNR | BIT | YSNR | BIT |
| TENNIS | 30.41 | 33,302 | 31.34 | 34,031 |
| FOOTBALL | 29.43 | 33,925 | 30.12 | 33,696 |
| AVERAGE | 29.92 | 33,614 | 30.73 | 33,864 |

FIG. 58 ns bandwidth for a video transmission by only transmitting encoded digital signals representing the changes between successive frames, or groups of frames. To achieve high
METHOD AND APPARATUS FOR VIDEO DATA COMPRESSION USING TEMPORALLY ADAPTIVE MOTION INTERPOLATION

FIELD OF THE INVENTION

The field of the present invention relates generally to digital data compression, and more particularly relates to the coding of successive frames of video data in a selective manner providing enhanced data compression.

BACKGROUND OF THE INVENTION

The availability of high speed digital devices and large, fast memories has made it possible to give practiced expression to an old idea of more efficiently utilizing a given bandwidth for a video transmission by only transmitting encoded digital signals representing the changes between successive frames, or groups of frames. To achieve high compression, one must resort not only to redundancy reduction but also to irrelevancy reduction, coarse coding that exploits characteristics of human visual perception. Spatial limits in human vision have been exploited extensively in many systems, especially in adaptive quantization using the discrete cosine transform (e.g., in the DCT quantization matrix), and in other techniques such as subband coding, and multiresolution representation. Temporal data reduction is based upon the recognition that between successive frames of video images there is high correlation. However, there has been very little work on applying temporal characteristics of human vision to image coding systems, except in the most basic ways such as determining a frame rate, e.g. 24–60 frames/secs. This is partly because of the anticipated higher complexity of temporal processing than of spatial processing, and the difficulty of including the temporal dimension in defining a standard measure of perceptual quality for video sequences.

In a standard promulgated in November 1991 by the Motion Picture Expert Group, MPEG identified as (ISO-IEC/JTC1/SC2/WG12), the sequence of raw image data frames are divided into successive groups known as GOP's (group of pictures), respectively, and the coded GOP is comprised of independent frames I, predicted frames P and bidirectionally predicted frames B in such manner that GOP may be comprised, for example, as follows:

I, B, B, P, B, B, P, B, B, P, B, B, P, B, B.

The first P frame is derived from the previous I frame, while the remaining P frames are derived from the last previous P frame. The I and P frames are reference frames. Since each B frame is derived from the closest reference frames on either side of it, the pertinent P frames must be derived before the prior B frames can be derived.

The high definition independent frames I at the beginning of each GOP are required because of the use of frame differential encoding to avoid accumulated error. The purpose of quantizing is to control the number of bits used in representing the changes between the frames. The corresponding portions of frames are conveyed by motion vectors indicating where blocks in the reference frames may be located in the frame being derived. Since differences generally arise from motion and there is likely to be more motion between P frames than between a P and a B frame, more bits are required to derive a P frame from a P frame than in deriving B frame from P frames on either side of it.

In typical MPEG systems, the three frame spacing of reference frames utilizing high numbers of bits is required in order to adequately convey motion. If, however, there is little or no motion, the number of bits devoted to representing these frames is excessive.

SUMMARY OF THE INVENTION

One object of the invention is to provide an improved method and apparatus for video compression.

Another object of the invention is to provide an improved method and apparatus for motion compensated interpolation coding for video compression, which is compatible with present video coding standards.

In one embodiment of the invention, temporal segmentation is used to dynamically adapt motion interpolation structures for video compression. Temporal variation of the input video signal is used for adjusting the interval between reference frames. The bit rate control for the dynamic group of pictures (GOP) structure is based upon the temporal masking in human vision. In a preferred embodiment, the spacing between reference frames is based upon different temporal distance measurements, through use of an algorithm for temporally adaptive motion interpolation (TAMI). These and other embodiments of the invention are summarized in greater detail in the following paragraphs.

Instead of rigidly locating reference frames within a GOP as in a conventional MPEG system, their location and the number of bits used depends in this invention on the amount of global motion between frames. Global motion as used in the invention, is defined as the motion between frames as a whole, and it can be measured in a number of known ways such as the difference of histogram, the histogram of difference, block histogram difference, block variance difference, and motion compensation error.

In the following description, frames corresponding to I, P, and B frames of the MPEG are designated as I1, P1, and B1 frames.

If there is no frame in a GOP where the global motion between it and the I1 or first frame exceeds an empirically determined value, $T_0$, all of the remaining frames are of the B Type and are derived from the I1 frame of that GOP and the I1 of the next GOP. Thus no P1 type frame is used and many bits are saved, in this embodiment of the invention.

Should the global motion between a frame and a previous reference frame exceed $T_0$, the previous frame is designated herein as a P1 frame. Thus, a P1 frame is used wherever necessary to adequately convey the motion.

The global motion between adjacent frames is also measured. If it exceeds an empirically determined value of $T_1$, it is an indication that an abrupt change of scene has occurred between the frames. In this case the later frame is designated as an I2 frame that is independently processed with fewer bits than the I1 frame, and the immediately previous frame is designated as a P2 frame that has fewer bits than a P1 frame in this embodiment of the invention. The relative coarseness of the P2 frame is not observed by the eye because of a phenomenon known as backward masking, and the relative coarseness of the I2 frame is not observed by the eye because of a phenomenon known as forward masking.

It is apparent in both a conventional MPEG system and the system of this invention that reference frames must be processed before the B or B1 frames between them can be processed.

The method of operation just described uses bits only as required by global motion and is referred to infra as temporally adaptive motion interpolation, TAMI.

When the system is used with a transmission channel such as used in digital television, the bit rate may be controlled by loading the processed bits into a buffer and controlling the number of levels used in the quantizer so as to keep a given number of bits in the buffer. In the event that two or more successive frames have global motion in excess of $T_0$ so that the frames just prior to them are designated as good resolution P1 frames, it is possible that controlling the bit rate may cause a second P1 frame to be processed with fewer bits than desired. In such a case, only the first P1 frame is processed, and the frames between it and the next reference frames are processed as B1 frames even though they may qualify as P1 frames, in another embodiment of the invention.

Another way of controlling the quantizer so as not to exceed a fixed bit rate is to look at the total number of bits called for in a GOP if the nominal numbers of bits are used for processing the designated frames, and if it calls for a bit rate in excess of the fixed bit rate, the nominal numbers of bits are lowered proportionately as required. Thus, if there are too many P1 frames, the quantized levels are reduced so that fewer bits are used in processing all of them, in another embodiment of the invention.

If the coding system of this invention is coupled to a distribution system, such as one using the asynchronous transfer mode (ATM), concept of a broadband integrated services digital network (ISDN), in another embodiment variable bit rate (VBR) coding can be used with TAMI to form a VBR-TAMI system because of the very wide effective bandwidth of such a channel. This system is different from TAMI only in the fact that the number of P1 frames is not limited.

In fixed bit rate TAMI (FBR-TAMI), there is as in any block motion compensation coding system, a tendency for reference frames to be too far apart e.g. when there is no global motion in excess of $T_0$, so as to produce perceptually displeasing coding errors at moving edges.

Furthermore, the longest encoding delay in FBR-TAMI or VBR-TAMI is equal to the duration of a GOP, which in the case of a GOP of fifteen frames is one half a second, and thus may be too long.

In order to alleviate these problems, N-P1 reference frames are inserted into the GOP structure by default i.e. they are not called for by the global motion involved, in yet another embodiment of the invention. This divides the GOP into N+1 segments that may be processed in sequences so as to reduce the time between reference frames and provide better motion representation as well as to reduce the processing time. As N increases the coding delay is reduced but so are the bit rate savings.

If no frame in a GOP is designated as a P1 frame because global motion from I1 did not exceed $T_0$, a P1 frame is replaced by a B1 frame so that |P1|-|B1| extra bits are available for processing a B type frame. (The absolute value notation is used to denote the number of bits allocated to a frame.) A B Type frame with the extra bits is called a B2 frame, in this embodiment of the invention. The relation between |B1| and |B2| is given by the following expression:

$$|B2| = |B1| + \frac{|P1| - |B1|}{M - N - 1}$$

where M is the GOP size and N is the number of injected P1 frames.

After the frames of a GOP have been designated as P1, and B1 or B2 frames in any system or embodiment of the invention, the calculations required for the interpolations of the B1, or B2 frames may be accomplished by the usual motion compensation encoder, but it is preferable to use an encoder that uses telescopic motion vector searching as well as a different bit rate control system.

In a preferred embodiment of the invention P1 frames are located so as to have as close to the same amount of motion between them as possible rather than being located at a frame having a motion with respect to the previous reference frame that exceeds $T_0$. Differences in motion for each frame are generated, and as before, I2 and P2 frames are designated at a scene change when the motion between them exceeds $T_1$. A number N of P1 frames to be used is assumed, and calculations are made of the temporal distances between them and the reference frames on either side for all combinations of N positions, and the positions closest to the mean of all these measurements are selected. This embodiment of the invention is designated as OSA, for optimal spacing algorithm.

In another embodiment of the invention the most advantageous number, N, of P frames is determined on a dynamic basis from the frame designations in each GOP.

Another embodiment of the invention applies TAMI to subband video coding. In view of the fact that highly accurate motion vector information is not required in carrying out the algorithms associated with the various embodiments of the invention, the number of computations can be reduced by using pixel subsampling in both spatial directions and more reduction in calculations can be achieved by using backward telescopic searches rather than forward telescopic searches.

BRIEF DESCRIPTION OF THE DRAWINGS

Various embodiments of the present invention are described below with reference to the drawings, in which substantially similar components are identified by the same reference designation, wherein:

FIG. 8A illustrates a GOP structure for a 1-P scheme with scene changes of Type 1 and Type 0, in one embodiment of the invention.

FIG. 8B illustrates a GOP structure for a 1-P scheme with a scene change of Type 1 only, and no detection of Type 0 scene changes.

FIG. 20 is a table showing the performance of different interpolation schemes for images with little motion activity at average bit rates of 736.5Kbit/sec, for conventional fixed 4-P, and inventive 0-P, 1-P, 2-P, and 3-P embodiments, respectively.

FIG. 21 is a table for showing the performance of different interpolation schemes for images containing a scene change at an average bit rate of 736.5Kbit/sec.

FIG. 22 shows a table for illustrating the performance of different interpolation schemes for images with little motion activity at an average bit rate of 300Kbit/sec.

FIG. 26 shows a table for tabulating the results of SNR and bit-rate results using the OSA embodiment of the invention without B2 frames for the five different distance measurement methods, and for three different frame number ranges.

FIG. 27 shows a table for tabulating SNR and bit-rate results using the OSA embodiment of the invention with B2 frames for the five different distance measures, and for three different frame number ranges.

FIG. 29 shows a composite of curves for comparing the TAMI and OSA embodiments of the invention.

FIG. 47 shows a truth table for a switch control block or module of the motion compensation shown in FIG. 46.

FIG. 58 shows a table of performance comparisons between various embodiments of the invention.

DETAILED DESCRIPTION OF THE PREFERRED EMBODIMENTS OF THE INVENTION

One of the perceptual factors exploited in one embodiment of the present coding scheme is temporal masking, which is closely related to but different from temporal summation in low level perception. There has been little prior work in exploiting temporal masking for image coding.

Temporal summation has been known for over a century as Bloch's law. The law says that below a critical time period or duration (T), about 100ms (milliseconds), luminance perception by the human eye is constant as long as the product of time duration (T) and intensity (I) is kept constant, namely:

$$I \times T = k \qquad (1)$$

Figure 1:
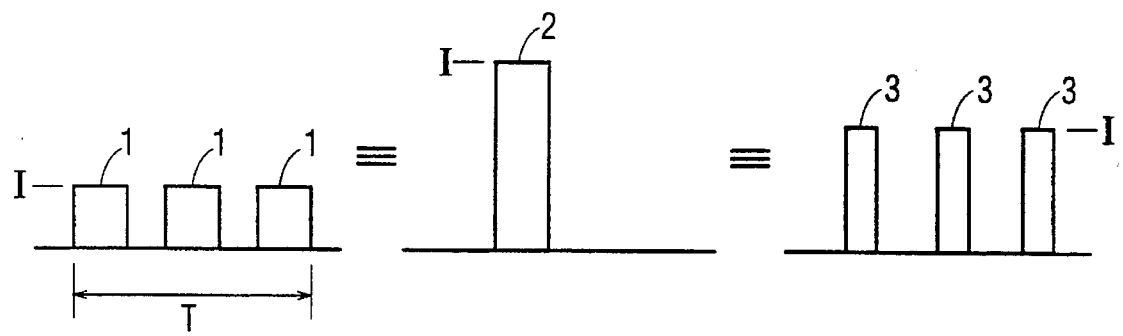
FIG. 1 shows equivalent intensity pulses illustrating luminance perception by the human eye under Bloch's law.

This describes a kind of temporal summation (integration) occurring in the human visual system. FIG. 1 illustrates the temporal summation effect, in which luminance perception depends only on the total area of the pulses 1, 2, or 3 regardless of the durations and the intensities of individual pulses. It is known that temporal summation is a neural phenomenon and that it does not occur at the photoreceptor level, but researchers still do not know whether it occurs at the ganglion cell level, the lateral geniculate nucleus (LGN), or the cortex. The critical duration is about 100ms when a spot of light is seen against a black background (scotopic conditions). Under natural viewing conditions (photopic conditions), the critical duration is much shorter, on the order of 20ms. For a task involving perception of image content, such as being able to tell object orientation in a test image, the critical duration can be as long as several hundred milliseconds. Because of this summation process, human vision has limited temporal resolution, and the critical duration is generally not less than 20 to 100ms. This is the main psychophysical factor that influenced the choices of frame rates for movies and television.

The present invention is concerned with the temporal masking aspect of vision. A simple low pass filter model is used to characterize the phenomenon. It is adequate to model human temporal processing as a leaky integrator, i.e., a first-order low pass filter.

The temporal transfer function expressed as a Laplace transform, can be modeled by:

$$H(s) = \frac{1}{1 + sT} \qquad (2)$$

where T is recovery time (critical duration), which is about 100 to 200ms. The frequency response, expressed in terms of a Fourier transform, is given by:

$$|H(j\omega)| = \frac{1}{\sqrt{1 + \omega^2 T^2}} \qquad (3)$$

Figure 2A:
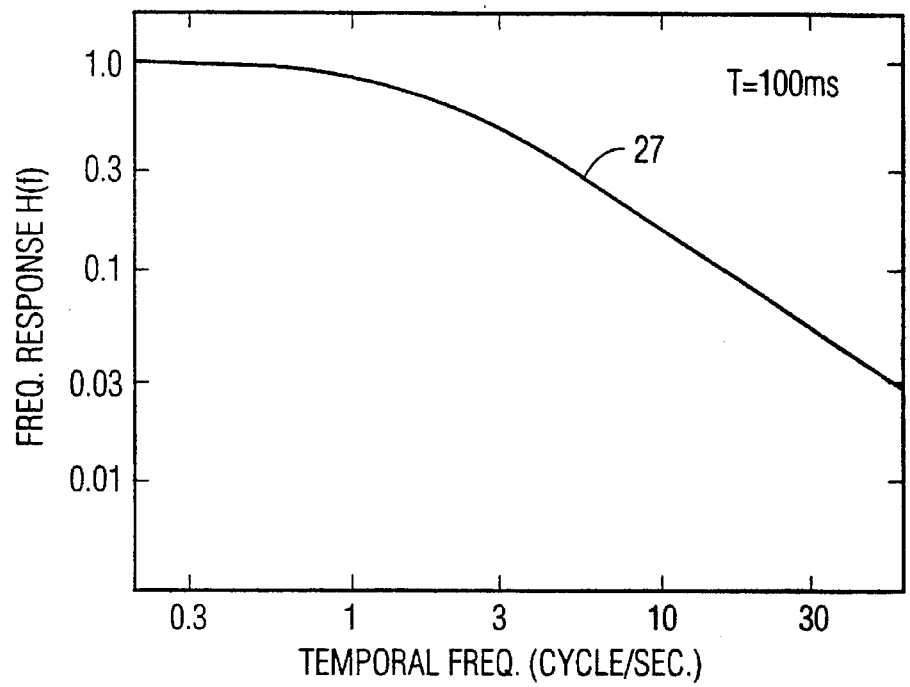
FIG. 2A shows a plot of the frequency response function of a first order low pass filter model of the temporal frequency response of the human eye.
Figure 2B:
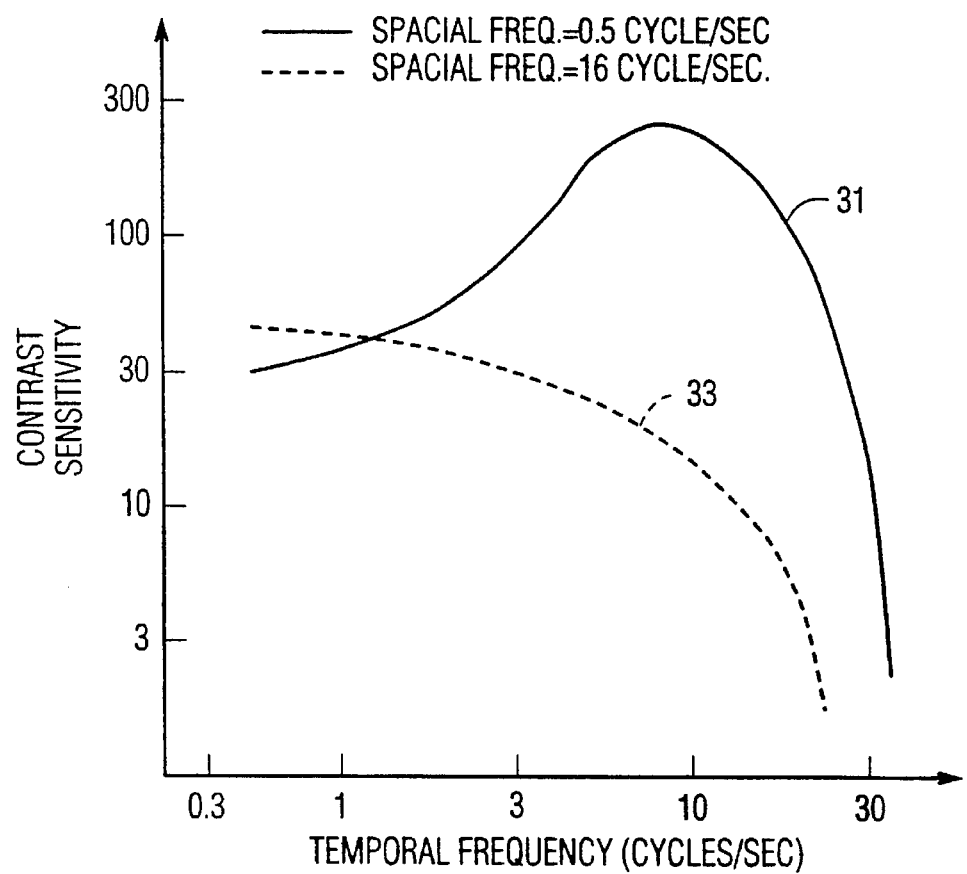
FIG. 2B is a curve showing the contrast sensitivity versus the temporal frequency for a typical temporal modulation transfer function.

This response roughly reflects the temporal modulation transfer function (MTF), which is defined as the reciprocal of the just visible sine wave modulation amplitude. It is a sensitivity response function of the eye with respect to temporal frequency of the stimulus. FIG. 2A shows a frequency response curve 27 of the leaky integrator model, and FIG. 2B the frequency response curves of a typical temporal MTF, with curves 31 and 33 having spatial frequencies of 0.5 cycles/degree and 16 cycles/degree, respectively.

There are two kinds of temporal masking, forward and backward. It is forward masking when arriving stimulus acts forward in time to effect one which comes later, and backward masking when the stimulus arriving later effects one which has already come and gone. Because of these effects in the coding scheme the immediate past frame at a scene change can be coarsely coded, as can the following frame. This effect was verified in an experiment, in which any difference of perceptual quality between the original frames and the frames with a coarsely coded immediate past frame was detected. Little perceptual difference was detected even when the frame is coded with as few as 20% of the number of bits of a regular frame.

In general, these forward and backward masking effects can be explained by two underlying processes in temporal masking. One is masking by light, which occurs when there is a drastic change in luminance. This effect is believed to be caused by lateral inhibition in the retina. The other is masking by visual processing noise, which occurs when there is an abrupt change in visual patterns. This can be explained by the degradation of spatial contrast by temporal summation. The combined effect of these two masking processes produces the forward and backward masking effects when there is a scene change.

Temporally Adaptive Motion Interpolation(TAMI) Algorithm Fixed Bit Rate Coding(FBR-TAMI):

The present new motion interpolation coding techniques adopt some terminology from the MPEG standard, including I (intra frame), P (predicted frame), and B (bidirectional interpolated frame), and are generally compatible with apparatus following present video coding standards. In one embodiment of the invention, a temporally adaptive motion interpolation algorithm (hereinafter referred to as TAMI algorithm) was developed. One variation of this algorithm uses fixed bit rate coding, providing a FBR-TAMI, which is discussed below.

In the TAMI algorithm, the interval between two reference frames is adapted according to the temporal variation of the input video, and the bit rate control takes advantage of temporal masking in human vision. The crucial issue in this approach is the bit rate control problem because the group of pictures (GOP) structure is dynamically changing. When a scene change occurs, it is desirable to code the first frame after the scene change as an I or intra frame, which might be impractical because the bit rate would increase drastically if there were many such scene changes in one GOP.

This problem can be resolved by coarsely quantizing the new I or intra frame with the same number of bits as used for a regular B frame. This does not degrade the picture quality when the sequence is continuously displayed because of the forward temporal masking effect. It is known that if the bit rate (bandwidth) of frames following a scene change is gradually increased back to full bit rate (bandwidth), then the degradation of the frames following a scene change is not perceptible.

Using a poor quality intra frame after a scene change directly affects the picture quality of the following frames until a new intra frame is used, with the quality of the following frames becoming better over successive frames. This gradual improvement in quality is thereby achieved without a complex scheme for explicitly controlling bit allocation on a frame-by-frame basis.

To detect significant temporal variations of the input video, different temporal distance measures were considered in developing the present invention. These distances are actually a measure of the amount of global motion between frames. These motion measures can be determined by the difference of histogram (DOH), histogram of difference (HOD), block histogram (BH), block variance (BV), and motion compensation error (MCE), respectively. They are described in detail below. In the present TAMI algorithm, six different frame Types, I1, I2, P1, P2, B1, and B2 are used. Frame Types I1, P1, and B1 are the same regular frame types as defined in the MPEG standard. Frame Types I2 and P2 have the same bit allocation as B1 frames; thus I2 and P2 are very coarsely quantized intra and predicted frames, respectively. On the other hand B2 is an interpolation frame with more bits than a regular B1 frame, and generally fewer bits than a P1 frame. An I1 designated frame is a full frame, and is finely quantized.

In one embodiment for TAMI, an I1 frame is always the first frame designation for each GOP. When the cumulative motion or measured distance from an immediately preceding reference frame and a successive frame in a GOP exceeds a Type 0 threshold, the immediately prior frame to the successive frame is designated as a P1 frame. When the motion or measured distance between two successive frames exceeds a Type 1 threshold, the first or immediately prior frame is designated as a P2 frame, and the second or immediately past frame as an I2 frame. I1, I2, P1, and P2 frames are reference frames used in interpolating B1 and B2 frames. In a GOP where Type 0 scene changes occur, B1 frames are designated between reference frames. In a GOP where no Type 0 scene changes occur, B2 frames are designated between reference frames, for example, as described below in greater detail. In other words, B2 frames are used when no Type 0 scene changes are detected in a GOP, whereby no P1 frames other than possible default P1 frames result. Accordingly, the bits saved by not requiring additional P1 frames may be distributed among B1 frames to cause them to become B2 frames with greater resolution. Accordingly, the B2 frames are basically B1 frames with slightly higher bit allocation.

In another embodiment of the invention, in a GOP a first occurring P frame is predicted from the immediately previous I frame. A subsequently occurring P frame is predicted from the immediately previous P frame or I2 frame, whichever is closest.

Figure 3:
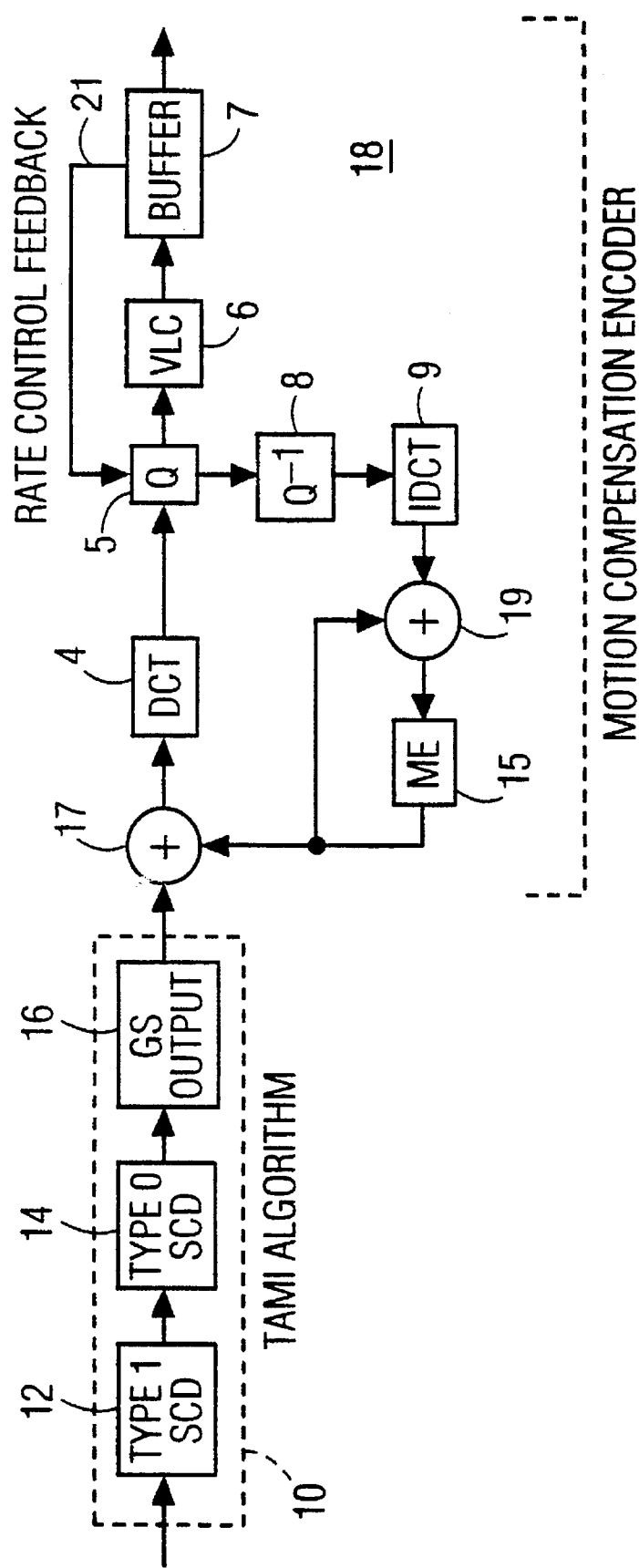
FIG. 3 shows a block diagram of a video encoder providing temporally adaptive motion interpolation (TAMI) of a group of pictures (GOP), for one embodiment of the invention.

FIG. 3 shows the block diagram 10 for the TAMI algorithm. The TAMI algorithm first looks at all the frames in the current GOP, detects scene changes of Type 1 (using a Type 1 scene change detector or SCD 12), and detects scene changes of Type 0 (using a Type 0 scene change detector or SCD 14). The next steps determine the positions of P and B frame in the GOP or group of pictures structure (using a GS output detector 16). Then using the positions of P and B frames, the frames are processed by a motion compensated interpolation encoder 18, which is similar to a typical motion compensation encoder except that it uses telescopic motion vector search and a different bit rate control mechanism, in this example. As shown, encoder 18 includes a discrete cosine transform (DCT) module 4, a quantizer (Q) 5, a variable length code generator 6, a buffer 7, an inverse quantizer ($Q^{-1}$) 8, an inverse discrete cosine transform module (IDCT) 9, a motion estimator (ME) 15, and first and second summing junctions 17 and 19. Note that DCT 4 converts data from the time domain into the frequency domain, as is known in the art.

Figure 4:
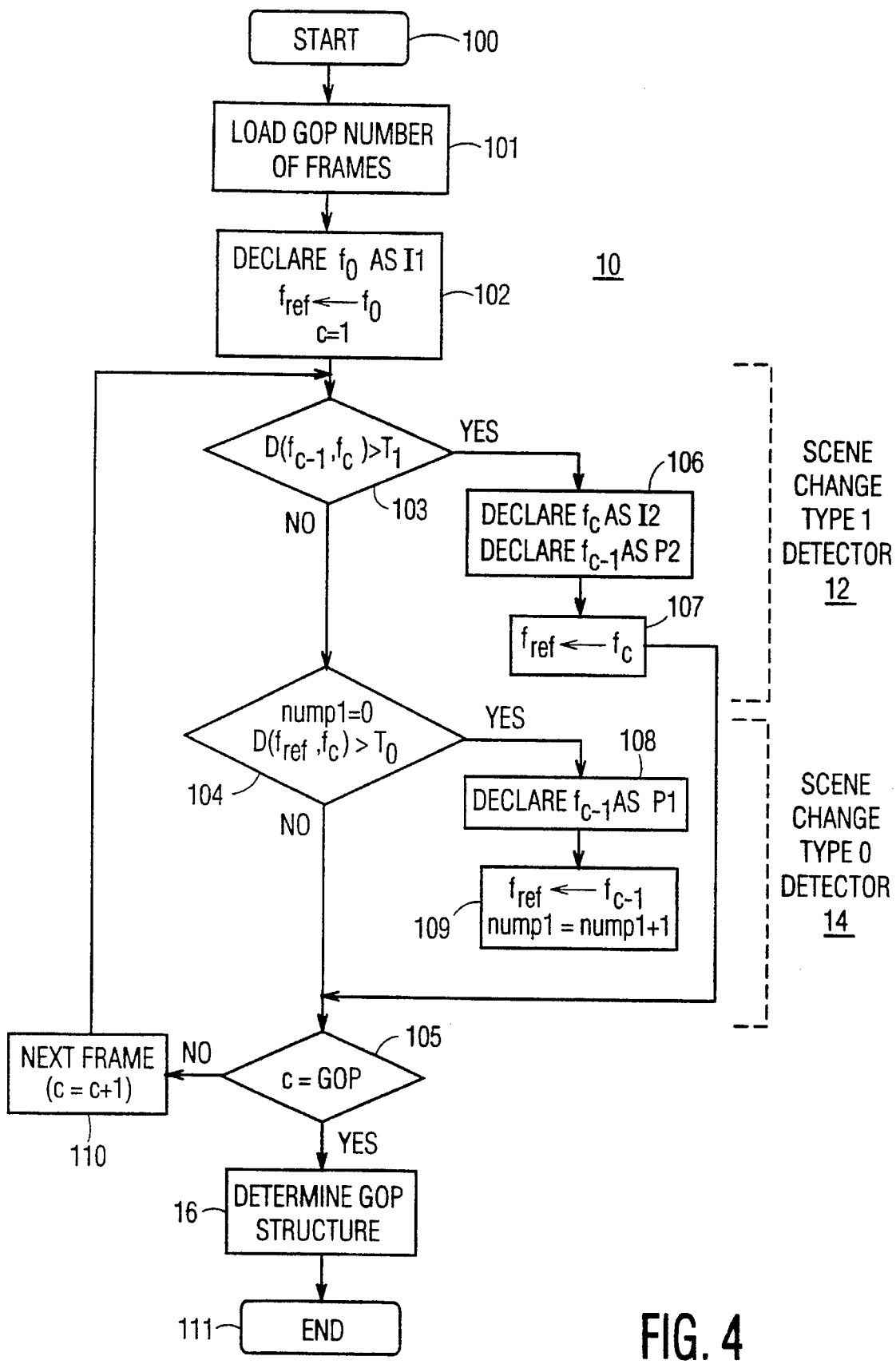
FIG. 4 shows a flowchart for the TAMI programming or algorithm associated with the encoder of FIG. 3, for one embodiment of the invention.

The flowchart 10 of the TAMI algorithm is illustrated in FIG. 4, including details of the programming for scene change detectors 12 and 14. The algorithm 10 includes steps 100 through 110, and 16, for programming a microprocessor, for example, to take the following generalized steps, using one GOP as a processing unit:

A. It loads frames from one GOP into an associated frame memory included in the microprocessor (steps 101 and 102).

B. It detects the positions of scene change of Type 1 via the Type 1 SCD 12 (steps 103, 106, and 107).

C. It detects the positions of scene change of Type 0 via the Type 0 SCD 14 (steps 104, 108, and 109).

D. It determines the GOP structure, i.e., the positions of all I, P, B frames via GS 16 (steps 105 and 16).

E. It outputs the information generated in step "D" to the motion compensating encoder 18.

Two types of scene detectors 12 and 14 are required for processing the algorithm, as shown. In FIG. 4, the first detector 12 declares a scene change of Type 1 for the current frame when the distance or relative movement measure between the current frame $f_c$ and the immediate past frame $f_{c-1}$ is above a threshold $T_1$ (step 103). This type of scene change corresponds to an actual scene content change; it is coded as an I2 frame (very coarsely quantized intra frame), and the immediate past frame $f_{c-1}$ is coded in step 106 as a P2 frame (very coarsely quantized predicted frame). The I2 frame coding exploits the forward temporal masking effect, and the P2 frame coding takes advantage of the backward temporal masking effect.

The second detector 14 detects scene changes of Type 0. This implements a temporal segmentation algorithm for processing. This algorithm, as shown in FIG. 4, declares the current frame $f_c$ as a scene change of Type 0, when the distance or relative movement measured between the current frame $f_c$ and the last reference frame $f_{ref}$ is above a threshold $T_0$ (see step 104). This time the immediate past frame $f_{c-1}$ becomes a P1 frame which is a regular predicted frame. The bit allocation strategy for the temporal segmentation is that every end frame of temporal segments should become a P1 frame, and that the frames in between should be B1 or B2 frames depending on whether the extra P1 frame is being used or not.

As a result of experimentation, one modification was made. The number of extra P1 frames was set to one because more than two extra P1 frames was found to cause quality degradation, while zero extra P1 frames means no adaptability. The reason for the degradation when using many P1 frames is explained as follows. Since fixed bit rate coding with a feedback loop 21 between the Buffer 7 and the quantizer (Q) 5 is being used (see FIG. 3), the bit rate for successive P1 frames is gradually reduced (i.e., coarsely quantized) by the feedback loop 21. However, use of the coarse P1 frame produces adverse effects. It degrades not only the quality of the P1 frames but also the B frames in between. It is preferred to limit the number of coarsely quantized P1 frames in high-motion segments, whereby the P1 frames eliminated are replaced by B1 frames. The degradation effect with many or unlimited P1 frames can be easily seen in FIG. 5, in comparison with the limited P1 scheme, relative to curves 23 and 25, respectively.

Two different bit allocation schemes may be used. The first scheme is a constant bit allocation scheme where the bit allocation for each picture type except B is always constant from GOP to GOP regardless of the number of detected SSPs (scene segmentation points, i.e. scene changes of Type 0). The constant bit allocation scheme is more suitable for some applications for two reasons. First, the picture quality of I and P frames varies more than the quality of a B frame does when a variable bit allocation scheme is used. Second, since an I frame is repeated every 15 frames (every ½ sec), a problem of 2 Hz blinking may be encountered if the I frame bit allocation is allowed to vary. The second scheme is a variable bit allocation scheme where the bit allocation for each picture type is allowed to change from GOP to GOP according to the number of detected SSPs, but the ratio of bit allocations between different picture types is always constant. When the constant bit allocation scheme is used, one cannot afford high variability of the number of P frames because of the constrained bit budget (fixed bit rate coding or constant bit rate coding). Hence, to have some adaptability, in one embodiment the variation of the number of P frames is limited to 1, which can easily be implemented by using two different bit allocations for B frames (B1 and B2 frames), i.e., B1 frames are used if an extra P frame is used and B2 frames are used if not. The variable bit allocation scheme is used in the adaptation of the number of P frames, as described later, to allow a variable number of P frames in a GOP. The following paragraphs describe constant bit rate allocations in greater detail.

Fixed Bit Rate Coding (FBR TAMI):

The present TAMI algorithm uses a simple rate control strategy which is based upon regulation of the number of bits inputted to a buffer 7 (see FIG. 3), whereby if during coding of one frame the buffer 7 begins to fill up, the system is programmed to automatically reduce the number of bits generated in coding the next frame. After the bits are allocated via GS output 16 for the different picture Types (I1, I2, P1, P2, B1, B2), the target bits for a slice are computed via encoder 18. Note that a slice is defined in the MPEG standard as a series of macroblocks (one of the layers of the coding syntax). Also, a macroblock is defined in the MPEG as "the four 8-by-8 blocks of luminance data and the two corresponding 8-by-8 blocks of chrominance data coming from a 16-by-16 section of the luminance component of the picture." At the end of each slice, the buffer 7 content is monitored. If it is above or below the target buffer content, the QP (Quantization Parameter) is reduced or increased respectively (slice level bit rate control). To be adaptive to the changing coding difficulties of an incoming video sequence, the bits produced in the current picture are used as the target bits for the next occurrence of a frame of the same picture type. When the bits produced for the previous frame are more or less than the target bits, the bit allocation for the next picture is adjusted to maintain an acceptable range of bit rate per second by the equation (frame level rate control):

$$TB = XTB \left[ \frac{TBR_{GOP}}{ABR_{GOP}} \right] \quad (4)$$

where TB is target bit allocation, $ABR_{GOP}$ is actual GOP bit rate, and $TBR_{GOP}$ is target GOP bit rate, and XTB is the target bit allocation for the previous frame.

Figure 6:
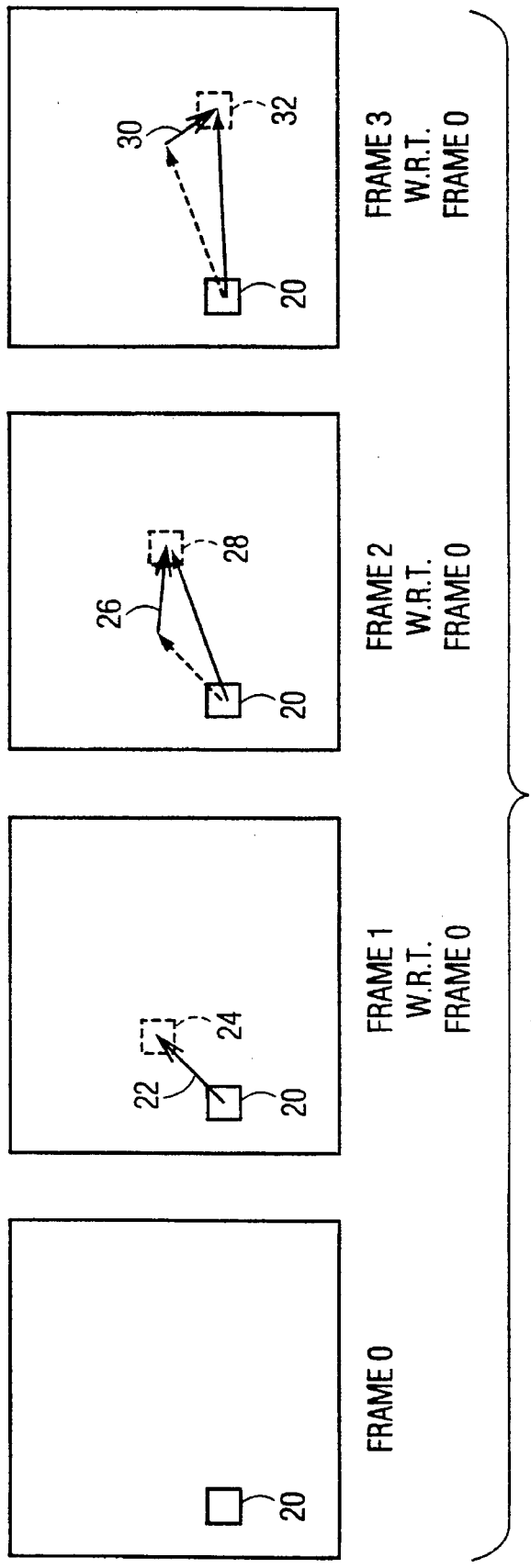
FIG. 6 illustrates a telescopic search for motion estimation between successive frames as used in one embodiment of the invention.
Figure 7A:
FIGS. 7A through 7D show default group of picture (GOP) structures for N P1 frames, for N=0, 1, 2, and 3, respectively, as used in embodiments of the invention.
Figure 7B:
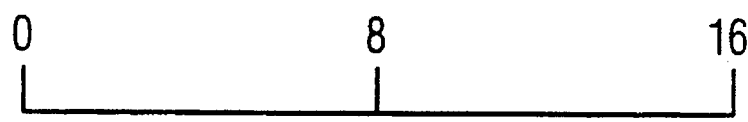
Figure 7C:
Figure 7D:

There is a difficulty with the motion estimation because the frame interval between the current and the reference frame can be as large as 15 (for GOP size 15), which means that the search region for a motion vector can be as large as 105, assuming the search region for adjacent frames is 7. Using Mean Absolute Difference (MAD) as the matching criterion for the full search, this would require about $2.5 \times 10^{11}$ operations per second for a sequence in the CIF format (352 by 240 pixels, 30 frames/sec). To reduce this computational complexity, a telescopic search as mentioned in the MPEG standard is used because it is believed to be the most suitable for the long interval between reference frames, and provides very good motion compensating performance in computer simulations. An example to search motion vectors between four frames is given in FIG. 6. The basic idea of the telescopic search is that the center position of the search window for a block in the current frame is shifted by the motion vector obtained for a corresponding macroblock in the previous frame, repeating until the last frame is reached. Accordingly, as shown, vector 22 shifts the center of the search window from the center of block 20 to the center of block 24 in Frame 1; vector 26 shifts the center of the search window from the center of block 24 to the center of block 28 in Frame 2; and vector 30 shifts the center of the search window from the center of block 28 to the center of block 32 in Frame 3.

N-P TAMI algorithm:

There are two problems in the TAMI algorithm. One is its tendency to produce longer intervals between reference frames. This promotes perceptually displeasing coding errors around moving edges, which is well known to be typically associated with any block motion compensation coding. This error occurs because a macroblock may consist of two objects (usually, one is a moving object and the other is background) which are moving in two different directions. Since each block is motion compensated by a single motion vector, this produces residuals having mainly high frequency components that are lost in the quantization stage because of coarser quantization for high frequency DCT coefficients. The other problem in the algorithm is that longer delay is inevitable because all the frames in a GOP have to be stored before the TAMI algorithm runs. The longest encoding delay in this case is one GOP size, which is usually fifteen frames, correspondingly to ½ second when the frame rate is 30 frames/sec.

To alleviate these problems, generalizations of the TAMI algorithm or programming steps were developed. To reduce the encoding delay and distances between reference frames, N P1 frames are inserted into GOP structure by default. The modified program is herein referred to as the N-P TAMI programming steps or algorithm. Note "N" is the number of default P frames. The modified program allows for the choice of N from 0 to 3, and produces four different schemes, namely, 0-P scheme (IBBBBBBBBBBBBBB), 1-P scheme (IBBBBBBBPBBBBBBB), 2-P scheme (IBBBBPBBBBPBBBB), and 3-P scheme (IBBBPBBBPBBBPBBB). For even N, the GOP size must be fifteen frames to have even spacing between reference frames. For odd N, the GOP size should be sixteen frames for the same reason. FIGS. 7A through 7D show the default GOP structures for N=0, 1, 2, and 3, respectively. Note that for N=4, this is equivalent to the conventional implementation of the MPEG standard. FIG. 8A also shows an example of the GOP structure generated by the present 1-P TAMI algorithm, when there is a scene change of Type 1, and at least one scene change of Type 0. Note that as described above, B1 frames are designated between any pair of reference frames, i.e., $I_1$, I2, P1, and/or P2, in this example. If no Type 0 scene changes are detected, as shown in FIG. 8B, for example, B2 frames are designated between reference frames, in that at least one less P1 frame is designated relative to the example of FIG. 8A, permitting more bits to be used for the B frames. As N increases, smaller encoding delay and smaller inter-reference frame intervals are encountered, but bit rate savings are reduced.

Assume that bit allocations (Kbit/frame) are |I1|=180.0, |I2|=6.75, |P1|=100.5, |P2|=6.75, |B1|=6.75. The relationship between B2 and B1 is as follows:

$$|B2| = |B1| + \frac{|P1| - |B1|}{M - N - 1} \quad (5)$$

where N is the number of P1 frames used, and M is the GOP size.

The bit rates per second, BR, for the four schemes are derived, for example, from the allocations via the following computations:

I.   Conventional fixed 4-P GOP structures
     (IBBPBBPBBPBBPBB):   BR = 1299 Kbit/sec
II.  0-P scheme:
     BR = 736.5 Kbit/sec, 56.7% of the fixed scheme.
III. 1-P scheme:
     BR = 878.9 Kbit/sec, 67.7% of the fixed scheme.
IV.  2-P scheme:
     BR = 1111.5 Kbit/sec, 88.5% of the fixed scheme.
V    3-P scheme:
     BR = 1230 Kbit/sec, 94.7% of the fixed scheme.

Variable Bit Rate Coding(VBR-TAMI):

Spurred by the recent advancement of the ATM (Asynchronous Transfer Mode) concept of B-ISDN (Broadband Channel Integrated Services Digital Network) technology, variable bit rate coding (packet video) is becoming a very promising scheme for network-oriented video transmission. This scheme relaxes the bit rate control restrictions on the encoder and enables constant picture quality transmission instead of constant bit rate.

In the above-described fixed bit rate coding embodiment for FBR-TAMI, the number of P1 frames is limited because of the fixed output bit rate constraint. As a result, the output bit rate is maintained at the cost of degradation of picture quality in intervals where there is high motion activity. If the restrictions on the number of P1 frames and the feedback loop for bit rate control are removed, the TAMI algorithm becomes a VBR (Variable Bit Rate) encoder and produces constant picture quality (perceptual picture quality, not in terms of constant SNR) by inserting more P1 frames into temporally busy regions. Hence, the VBR-TAMI encoder will compress video data much more than a conventional fixed GOP structure encoder for the FBR-TAMI encoder.

Figure 9:
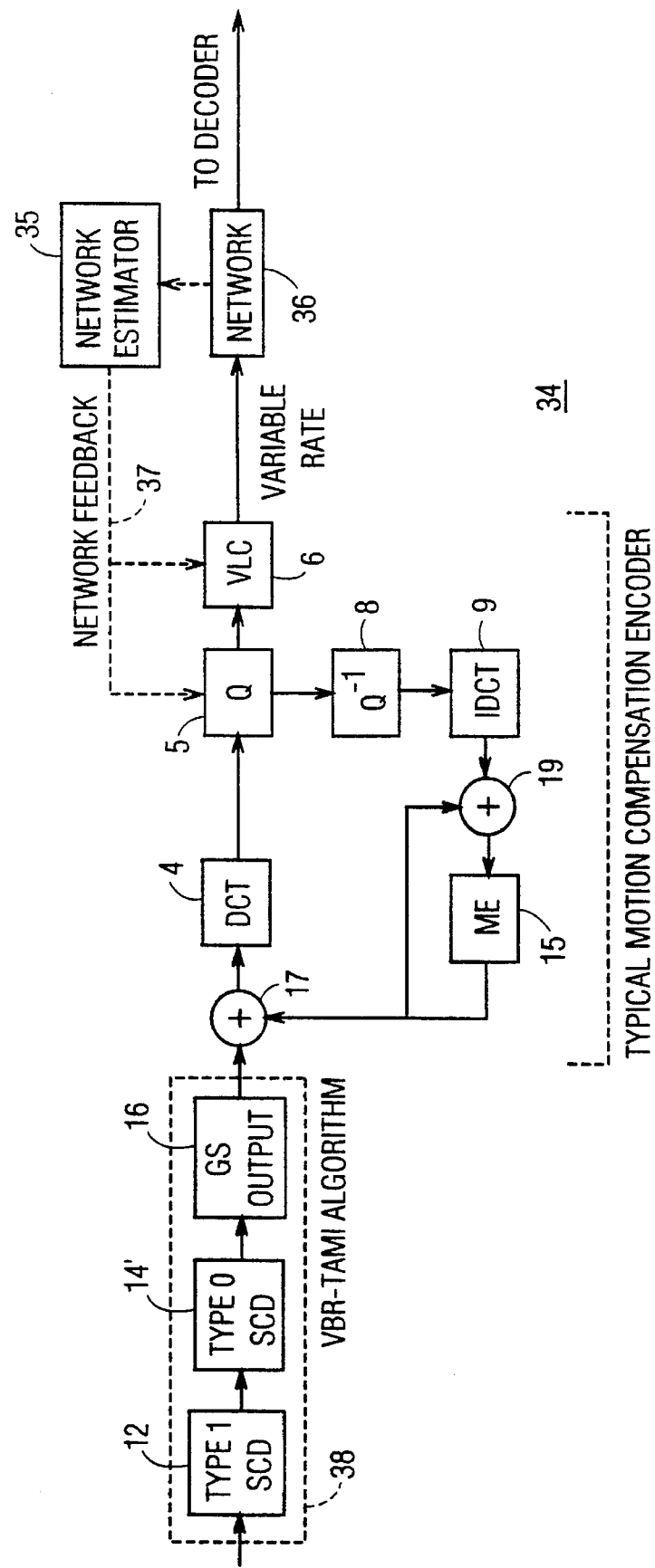
FIG. 9 shows a variable bit rate TAMI encoder for another embodiment of the invention.

FIG. 9 shows the block diagram of one embodiment of the present VBR-TAMI encoder 34. Compared to the FBR-TAMI encoder 18 of FIG. 3, the VBR-TAMI encoder 34 does not include a buffer 7, or a rate control feedback 21 for maintaining a fixed bit rate. Instead, the network 36 acts as a buffer, and a network estimator 35 is included in a network feedback loop 37 between network 36, and quantizer 5 and variable length coder 6.

Figure 10:
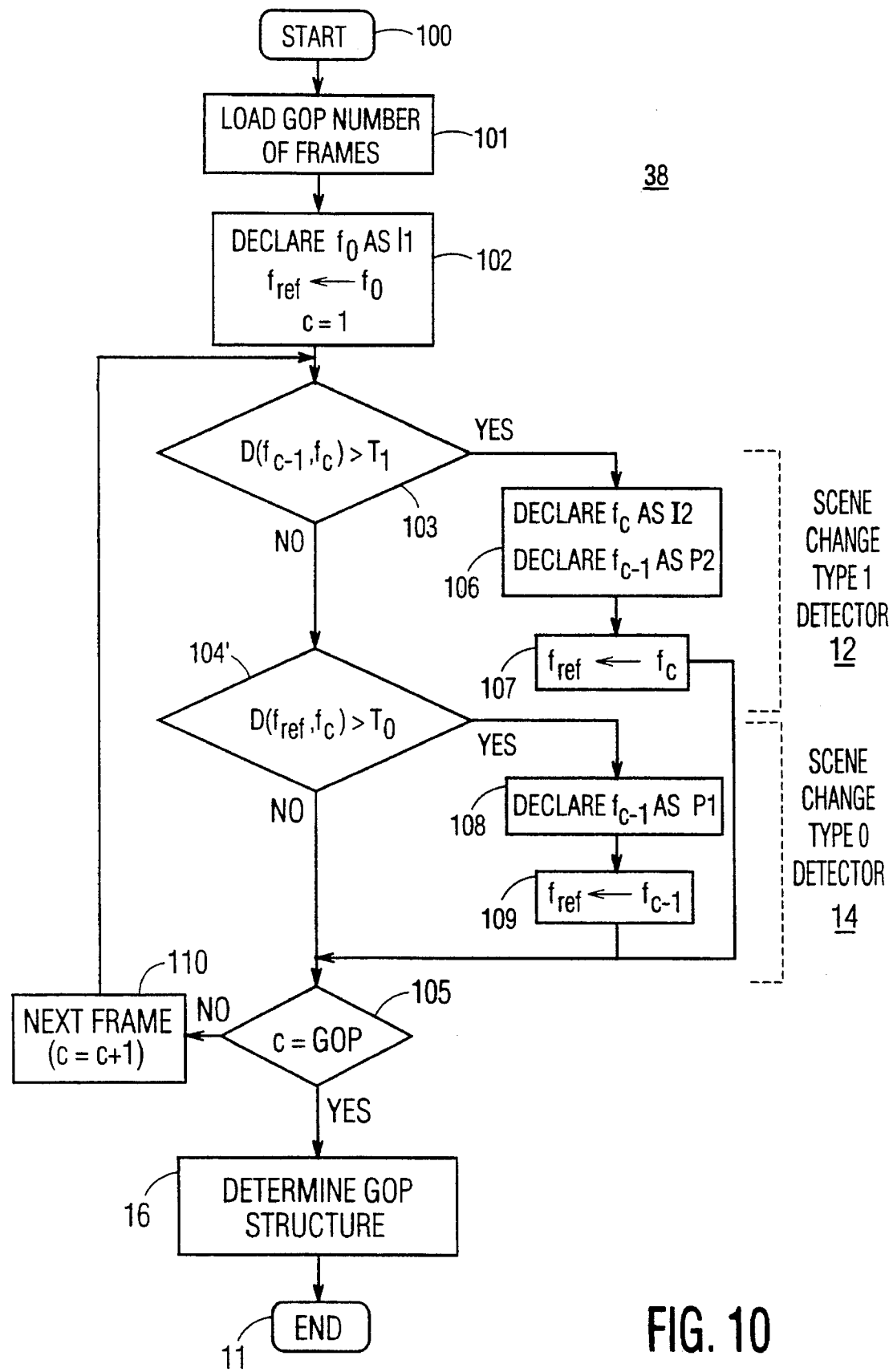
FIG. 10 shows a flowchart of a variable bit rate TAMI algorithm associated with the encoder of FIG. 9.

The flowchart for the VBR-TAMI algorithm 38 is shown in FIG. 10. The nump1 statement in step 104 of the FBR-TAMI algorithm 10 of FIG. 4, for limiting the number of P1 frames, is not required in step 104' of the VBR-TAMI algorithm 38 of FIG. 10. This is the only difference between algorithms 10 and 38. The use of B2 frames in the VBR-TAMI algorithm 38 is meaningless because use of any number of P1 frames is now allowed.

In the VBR-TAMI algorithm 38, when there is a scene change of Type 1, temporal masking is also applied to the two frames at the scene change (i.e., the preceding frame is a P2 frame and the following one is an I2 frame).

The following is a simple bit rate performance analysis for the VBR-TAMI encoder 34. For simplicity assume that the P1 event (i.e., declaration of scene change Type 0) is a Bernoulli random variable. Then the number of P1 frames in a GOP is a random variable K with a binomial distribution, as shown by the following equation:

$$P[K=k] = P_{M-1}(k) = \binom{M-1}{k} p^k (1-p)^{M-k-1} \quad (6)$$

where M is the GOP size, k is the number of P1 events, and p is the probability of having a P1 event at a frame. The mean of this distribution is $\bar{k}=E[K]=(M-1)p$. (M−1) is the number of possible positions for P1 because the first frame of a GOP always has to be an I1 frame. Although it is not exactly correct because of the exclusion of the first frame in a GOP, the interarrival distribution of P1 arrivals can be modeled by a geometric distribution as follows:

$$P(T) = p(1-p)^{(T-1)} \quad (7)$$

where T=0, 1, 2, . . . is the interarrival time between successive P1 frames. The mean of this distribution is given by E[T]=1/p, and $p=\bar{k}/(M-1)$ from the binomial distribution. From this one obtains $\bar{k}=(M-1) E[T]$.

The mean and variance of the output bit rate with $\bar{k}$ as a parameter can now easily be computed, to obtain a rough measure for motion activity in the input video. For example, assume there are kP1-frame events in a GOP. Then one will have one I1 frame, kP1 frames, and (M-1-k) B1 frames, and the bit rates are computed as follows:

$$R_{GOP}(k) = R_{i1} + kR_{p1} + (M - 1 - k)R_{b1} \quad (8)$$

$$R(k) = \frac{30}{M} R_{GOP}(k) \quad (9)$$

where $R_{GOP(k)}$ is the GOP bit rate, $R_{i1}$, $R_{p1}$, and $R_{b1}$ are bit allocations for I1, P1, and B1 frames, and R(k) is the bit rate per second. Then the mean and variance of the bit rate are given by the following equations:

$$E[R] = \sum_{k=0}^{m-1} P_{m-1}(k)R(k) = \frac{30}{M} (R_{p1} - R_{b1}\bar{k} + R_o) \quad (10)$$

$$\sigma^2[R] = \frac{30^2 (R_{p1} - R_{b1})^2}{M^2 (M-1)} \bar{k}(M-1-\bar{k}) \quad (11)$$

where $R_0 = R_{i1} + (M-1) R_{b1}$, which is the bit rate when there is no P1 frame. This shows that the mean bit rate is linearly proportional to the expected number of arrivals, and that the variance is at its maximum when the arrivals are the most uncertain (i.e., $p \approx \frac{1}{2}$).

As an example, when the M=15, $\bar{k}=2$, $R_{i1}=180$, $R_{p1}=100.5$, and $R_{b1}=6.75$, provides E[R]=924Kbit/sec and $\sigma^2[R]$ =245.5Kbit/sec. Similarly for the 1-P scheme, the following equations apply:

$$R_{GOP}(k) = R_{i1} + (k+l)R_{p1} + (M-l-1-k)R_{b1} \quad (12)$$

$$R(k) = \frac{30}{M} R_{GOP}(k) \quad (13)$$

The following expressions for mean E[R], and variance $\sigma^2$, also apply:

$$E[R] = \frac{30}{M} ((R_{p1} - R_{b1})\bar{k} + R_o(l)) \quad (14)$$

$$\sigma^2[R] = \frac{30^2 (R_{p1} - R_{b1})^2}{M^2 (M-l-1)} \bar{k}(M-l-1-\bar{k}) \quad (15)$$

where $R_o(1) = R_{i1} + lR_{p1} + (M-l-1) R_{b1}$, which is the bit rate when there are l P1 frames.

Distance Measures for Temporal Segmentation:

Five different distance measures for temporal segmentation will now be considered, as an example. First, notation must be defined. The number of pixels of an image is denoted by $N_{pix}$; the width by W; the height by H; the number of luminance levels by q; and the frame number index by n. Then an image sequence is defined by $$F = \{f_n | f_n : L_x \times L_y \to F, n = 0, 1, 2, \ldots\} \quad (16)$$

where $L_x = \{0, 1, \ldots, W-1\}$, $L_y = \{0, 1, \ldots, H-1\}$, and $F = \{0, 1, \ldots, (q-1)\}$. The corresponding histogram sequence is defined by:

$$H = \{h_n | h_n : F \to Z^+, n = 0, 1, \ldots, (q-1)\} \quad (17)$$

where $Z^+$ is a set of all nonnegative integers. The histogram operator H from an image to a histogram is defined as:

$$h_n = H f_n \quad (18)$$

where $H : F \to H$.

1) Difference of histograms (DOH): The distance measure between $f_n$ and $f_m$ is defined by l1 norm of their histogram difference as follows:

$$D(f_n, f_m) = \|h_n - h_m\|_1 = \sum_{i=0}^{q-1} |h_n(i) - h_m(i)| \quad (19)$$

Researchers have reported that the luminance histogram is a very efficient index for image content. The histogram difference between two pictures can thus be a good measure of the correlation of the content between them. Another important advantage of using DOH distance measure is its insensitivity to local motion activities, regardless of the speed of the motion (e.g., an object moving in a stationary background), compared to its sensitivity to global motion activities such as zooming, panning and scene changes, since a good temporal segmentation should effectively detect global changes and not be too sensitive to local motion activity that can be compensated for by a typical motion estimation algorithm.

The DOH is better for detecting global changes rather than for detecting local motion.

2) Histogram of difference image (HOD): The histogram of differences between two images is denoted by:

$$HOD(\cdot) = H(f_n - f_m) \quad (20)$$

where HOD is a function defined as hod:
$\{-(q-1), -(q-2) \ldots, -1, 0, 1, \ldots, \ldots, q-1\} \to Z^+$.

Note that this is essentially the same quantity as the summation of the entries of the co-occurrence matrix along lines parallel to the diagonal. If there are more pixels far from the origin of HOD, it means that there are more changes in the image. The movement criterion can be roughly defined by the ratio of the counts at nonzero positions to the total number of counts in HOD. Hence the distance measure is defined as follows:

$$D(f_n, f_m) = \frac{\sum_{i \notin [-\alpha, \alpha]} hod(i)}{\sum_{i=-q+1}^{q-1} hod(i)} \quad (21)$$

where $\alpha$ is a threshold for determining the closeness of the position to zero. This HOD measure has somewhat different characteristics than DOH. HOD is much more sensitive to local motion than DOH.

3) Block histogram difference (BH): In HOD, a problem is that local motion information is lost by computing a global histogram. This problem can be reduced by computing histograms of each block, and summing the absolute difference of each block histogram between 2 frames. Let the total number of macroblocks per frame be denoted by mbnum. For a given $b_{th}$ macroblock of frame $f_n$, the block histogram is defined as follows:

$$h_n(b, \cdot) = H_b f_n \quad (22)$$

where $H_b$ is the histogram generator for the $b_{th}$ macroblock, and $b \in [0, 1, \ldots, mbnum-1]$. The distance measure is defined by:

$$D(f_n, f_m) = \sum_b \sum_i |h_n(b, i) - h_m(b, i)| \quad (23)$$

where $b \in [0, 1, \ldots, (mbnum-1)]$ is the index number for a macroblock and $i \in [0, 1, \ldots, (q-1)]$.

4) Block variance difference (BV): The idea of using this measure is the same as for the block histogram difference except that the variance is used instead of the histogram. The distance using the sum is defined by the sum of absolute difference of the block variance between two frames, which is given by:

$$D(f_n, f_m) = \sum_b |var_n(b) - var_m(b)| \quad (24)$$

where $b \in [0, 1, \ldots, (mbnum-1)]$. Like the block histogram difference, this approach is made sensitive to local motion activities by computing the differences block by block.

5) Motion compensation error (MCE): Suppose frame $f_m$ is predicted from $f_n$ by motion estimation. Since coding difficulty is directly determined by the error between $f_m$ and $\hat{f}_m$ which is a prediction from $f_n$. This motion compensation error can provide a measure for the coding of the error image between $f_m$ and $\hat{f}_m$. Hence the distance measure using this error is defined by the following equation:

$$D(\hat{f}_n, \hat{f}_m) = \sum_{(i,j) \in L_x \times L_y} |\hat{f}_m(i,j) - f_m(i,j)| \quad (25)$$

Since this measure is computed directly from the prediction error, it is the nearly ideal measure for the coding difficulty of prediction error. However, the best measure would be the number of bits generated by this image coder, but this is a unrealizable because it would require the encoding results in the preprocessing stage. This approach using motion compensation error is near-optimal but the drawback is that it is computationally too expensive.

Optimal Spacing Algorithm:

In another embodiment of the invention, the basic TAMI algorithm was improved for the detection of scene change Type 0. It was recognized that since a fixed GOP size is being used, the basic TAMI algorithm may not produce the best possible spacing between reference frames. A description follows for the modification developed to improve the spacing, by providing an optimal spacing algorithm, in a preferred embodiment. As will shown, in using the optimal spacing algorithm (OSA), Type 0 scene change detectors are not used; only Type 1 scene changes are detected.

Figure 11:
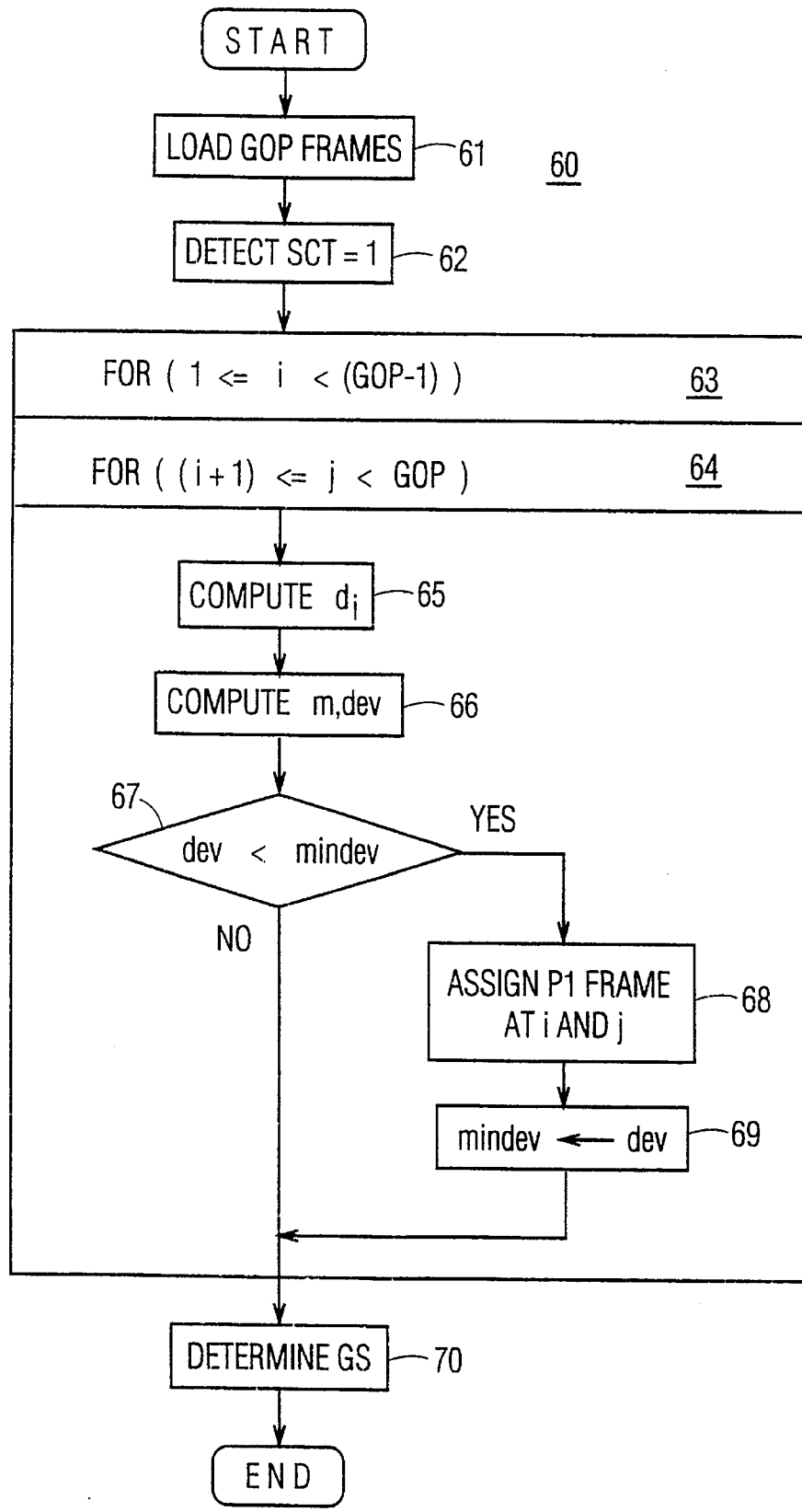
FIG. 11 shows a flowchart for providing an optimal spacing algorithm for another embodiment of the invention.

The flowchart of the OSA algorithm 60 for a 2-P scheme is given in FIG. 11. The algorithm 60 takes the following steps:

1. In step 61, GOP frames are loaded into memory, and also difference measures for each frame in a GOP are generated within step 61.

2. Using a distance measure between two adjacent frames, scene changes of Type 1 are detected in step 62. The frame just before the scene change is declared as a P2 frame, and the frame just after the scene change as an I2 frame (i.e, temporal masking is also being used in this scheme). Note that FIGS. 4 and 10 show the steps 106 and 107 for accomplishing the determination of P2 and I2 frames via a Type 1 scene change detector. The P frames corresponding to these points are not included in the total number of P frames (i.e. P1 frames).

3. An exhaustive search (steps 63–69) is used to find the best positions of P1 frames for equidistance, i.e., minimizing the deviation from the mean of the distances between the positions that include candidate P1 frames that would have been designated by Type 0 detection and the points of scene change Type 1, from which the GOP structure is determined in step 70.

The deviation from the mean in step "3" above can be defined using the following notations. Suppose that the GOP is partitioned into s segments where each segment consists of two reference frames. Define the first and the last frame numbers of the ith segment by fpn(i) and lpn(i). The distance for the ith segment can be expressed as:

$$d_i = D(f_{fpn(i)}, f_{lpn(i)}) \quad (26)$$

where D is the distance measure. Then the deviation, dev is:

$$dev = \sum_{i=1}^{s} |d_i - \bar{d}| \quad (27)$$

where $$\bar{d} = \frac{1}{s} \sum_{i=1}^{s} d_i \quad (28)$$

Figure 12:
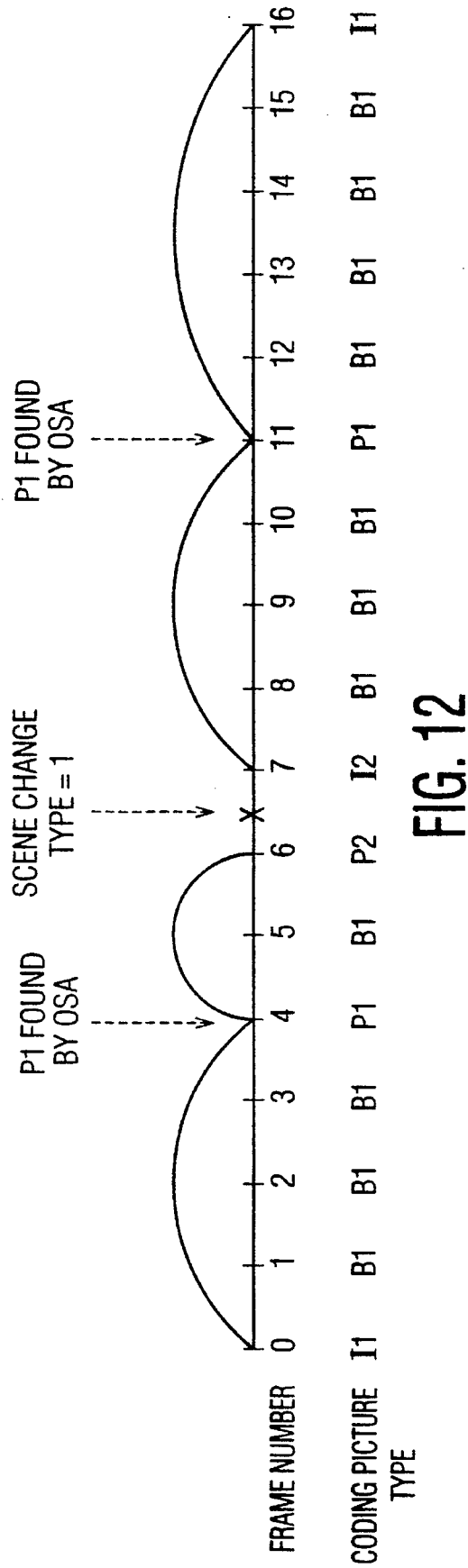
FIG. 12 shows a GOP structure using the 2-P optimal spacing algorithm of FIG. 11, when there is a scene change of Type 1.

FIG. 12 shows an example of the GOP structure using 2-P optimal spacing algorithm when there is a scene change of Type 1.

Assume that the GOP size is equal to M; the number of P1 frames used is N; the number of scene changes of Type 1 is u, and the number of adjacent pairs of scene changes of Type 1 is v. Then the number of searches S is as follows:

$$S = \binom{M - 2u + v - 1}{N} \quad (29)$$

since it searches through all combinations of N frames of P1 type. The number of positions searched is (M−2u+v−1) because the first frame is always coded as an I frame and the two neighboring frames for each scene change of Type 1 are excluded. However, if there are v pairs of scene changes there are v common neighboring frames, so the total number of exclusions due to scene changes becomes (2u−v). Since N is a fixed number, less than five, this is a polynomial-time search algorithm. The GOP size M is usually less than 20 and (2u-v) is always positive, whereby in such instances even an exhaustive search is not computationally too expensive (S is roughly on the order of 100). If there are several optimal answers, a solution is chosen where the intervals (frame number difference) between reference frames are the most evenly distributed, i.e., a solution where the deviation from the mean of interval sizes is the smallest.

The OSA algorithm (Optimal Spacing Algorithm) can in another embodiment also be improved further in its adaptivity by using one extra reserved P1 frame as in the TAMI algorithm. Here B2 frames are used depending on the local motion activity. If the average distance between reference frames is above a threshold, one more P1 frame is assigned by default (i.e., it becomes an [(N+1)-P] scheme using B1 frames). Otherwise the B2 frames are used (an N-P scheme using B2 frames). Further improvement may be obtained by adapting the number of P1 frames to a criterion of local motion activity.

In steps 61–66 (FIG. 11) of this OSA algorithm 60 the computation is not overly expensive when the distance measure uses histogram or variance approaches, i.e., the order of the number of operations per frame is $O(N_{pix}) \approx 10^5$, where $N_{pix}$ is the number of pixels, resulting in about $S \times 10^6 \approx 10^8$ operations for an OSA algorithm with 352×240 image size, where S is the number of searches given in equation 29. However, if a motion compensation error approach is used (see Equation 25 infra), the complexity becomes about $S \times 10^{11} \approx 10^{13}$, assuming S is $10^2$. Hence a fast motion vector search algorithm has to be used to make the OSA algorithm practical.

Figure 13:
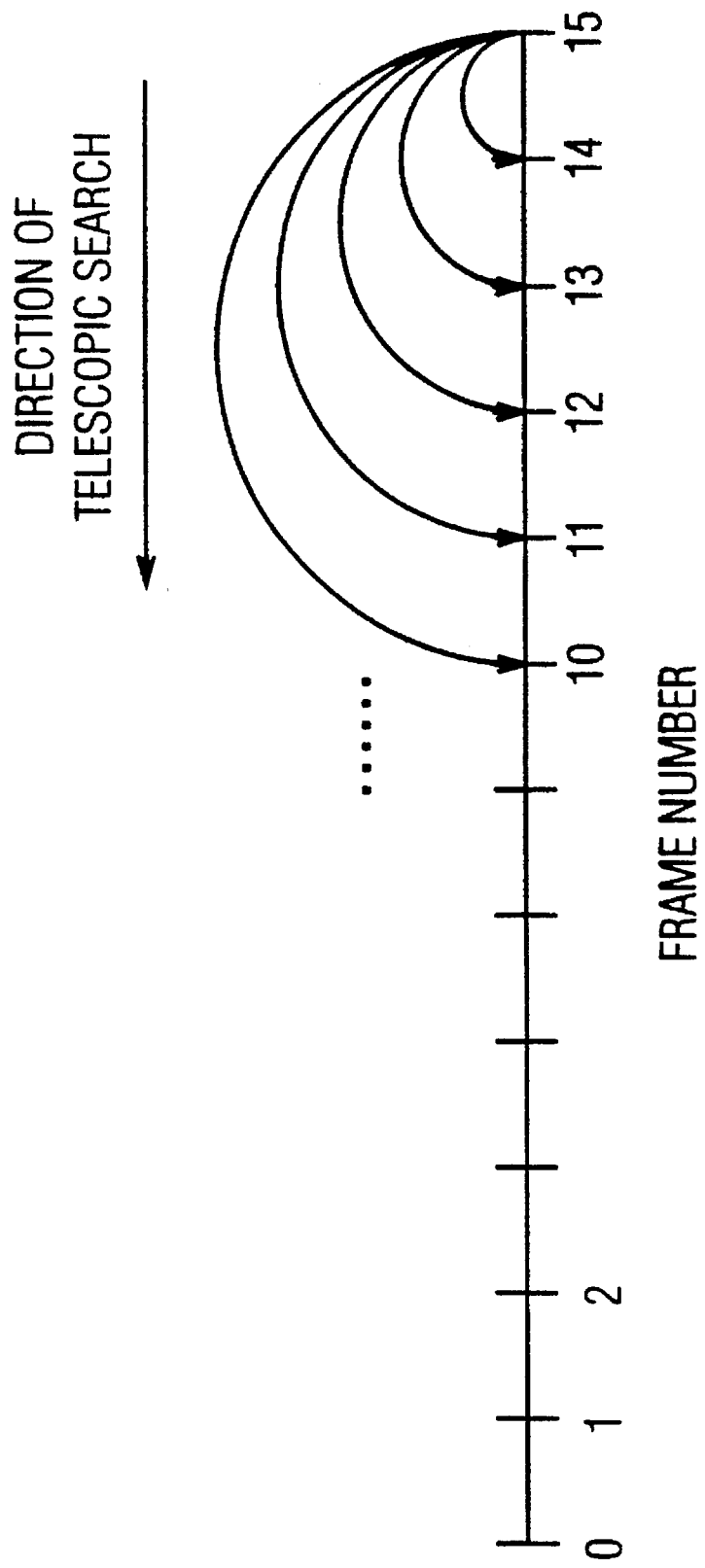
FIG. 13 illustrates a backward telescopic search for use with the optimal spacing algorithms of various embodiments of the invention.
Figure 14A:
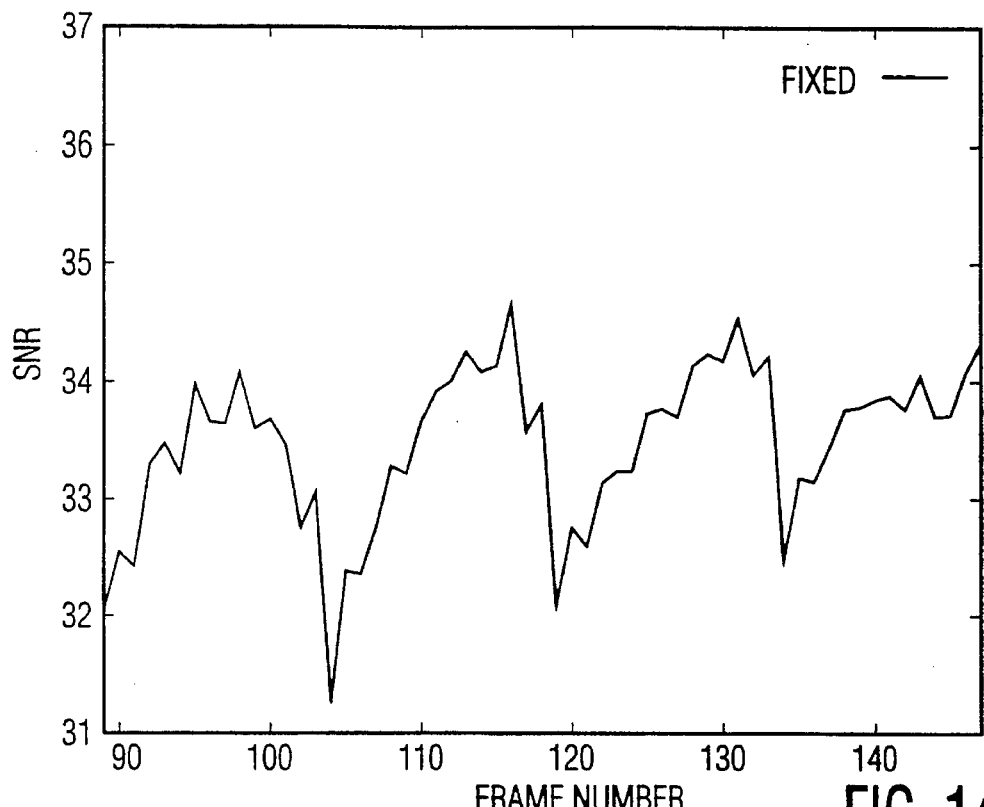
FIGS. 14(a) through 14(e) show signal-to-noise ratio (SNR) curves for images with little motion when the average bit-rate is 736.5Kbit/sec (Tennis), for comparing a conventional fixed 4-P scheme, and 0-P, 1-P, 2-P, and 3-P schemes, respectively.
Figure 14B:
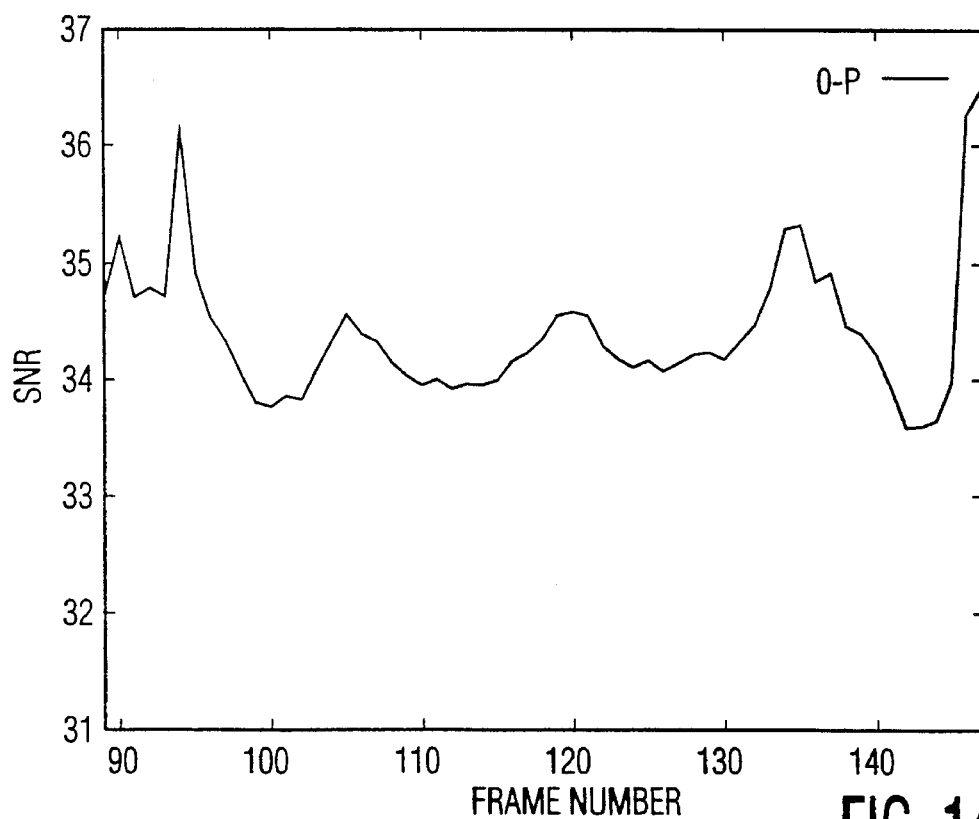
Figure 14C:
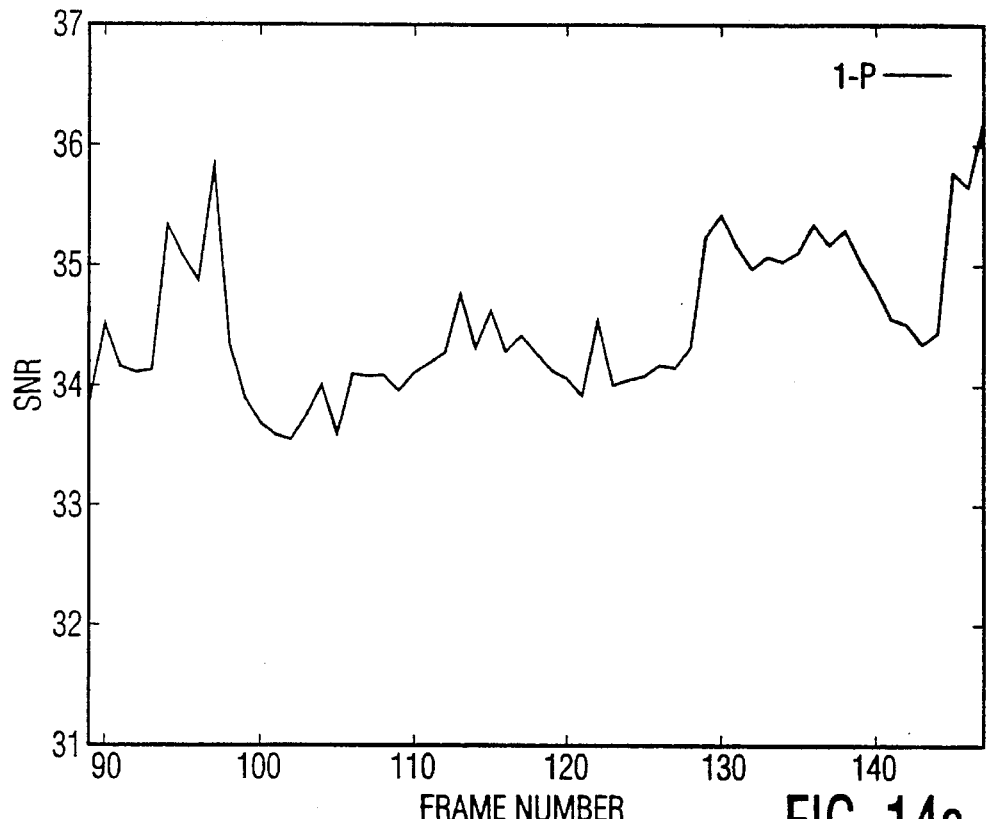
Figure 14D:
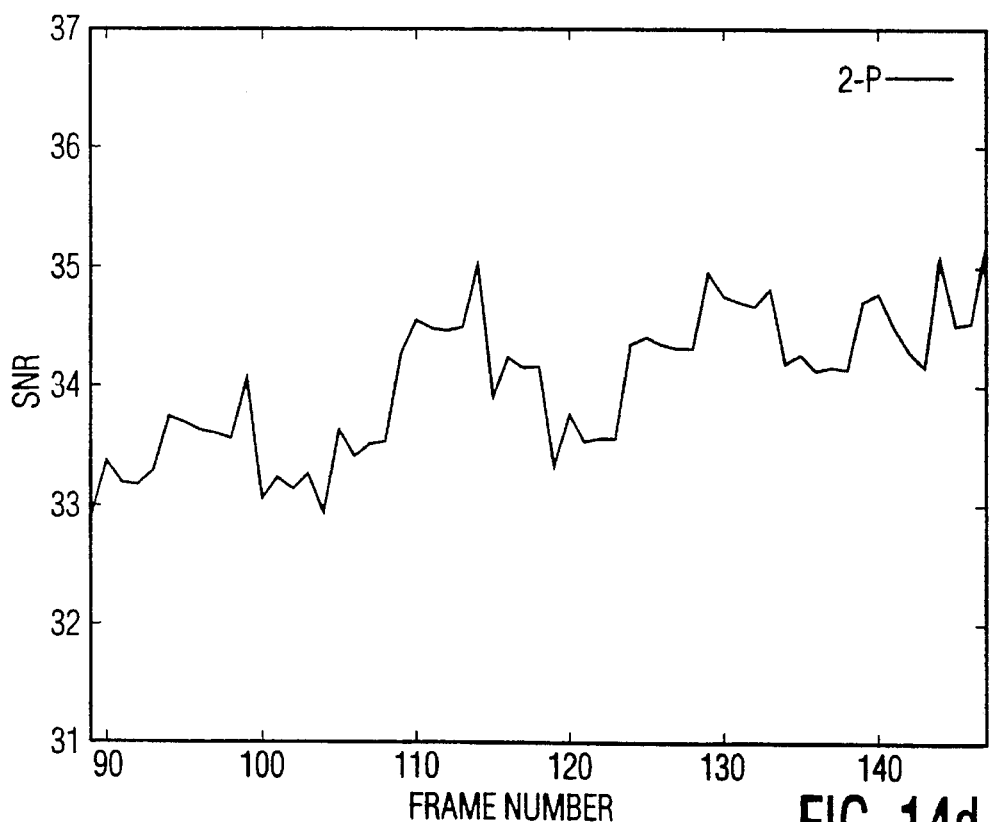
Figure 14E:
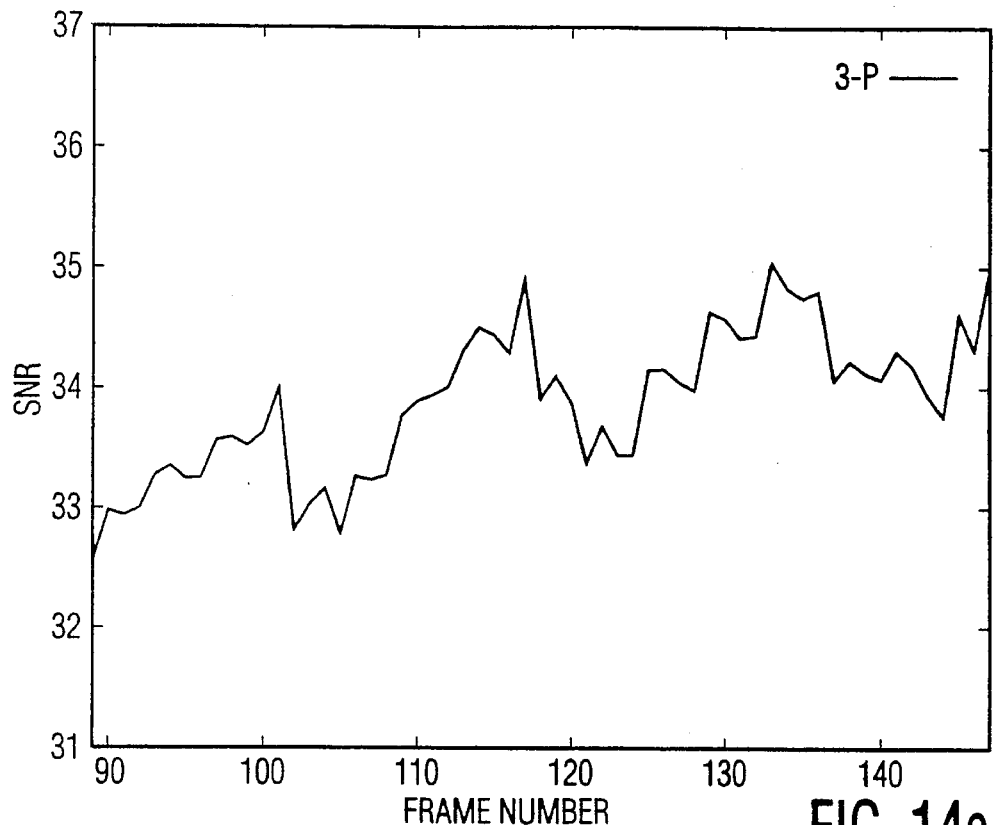
Figure 15A:
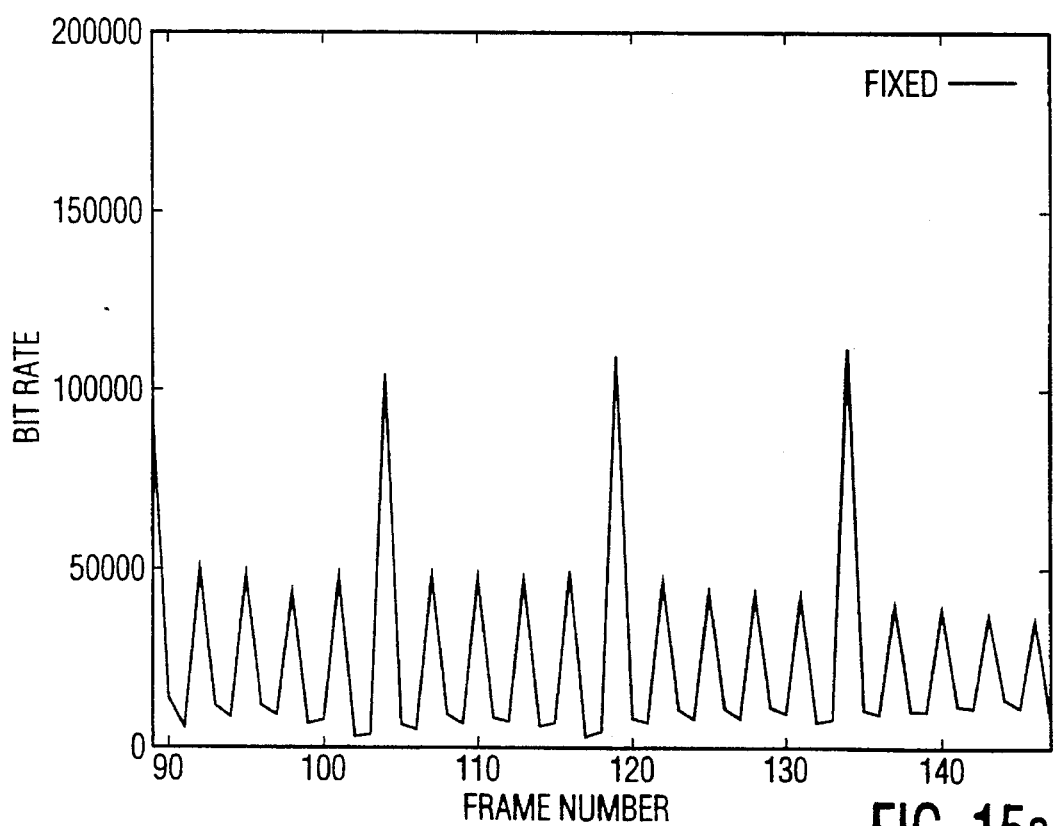
FIGS. 15(a) through 15(e) are related to the SNR curves of FIGS. 14(a) through 14(e), respectively, for showing the corresponding bit rate per frame, where the average bit rate is 736.5Kbit/sec (Tennis).
Figure 15B:
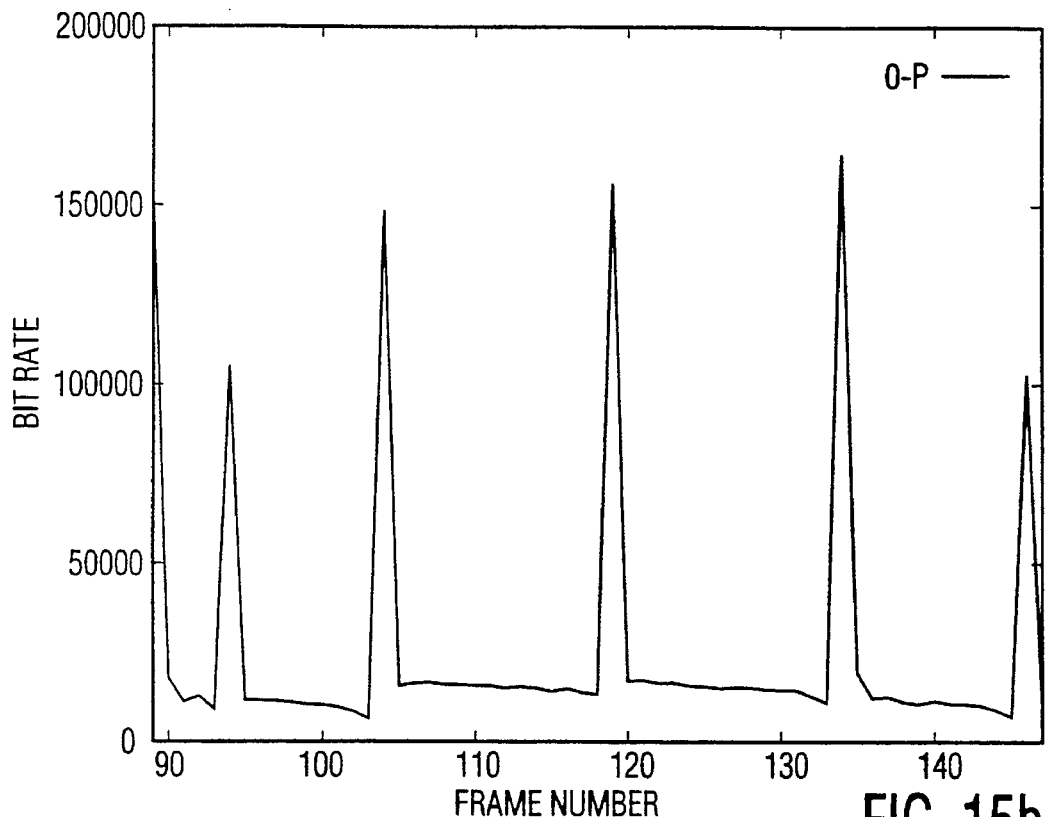
Figure 15C:
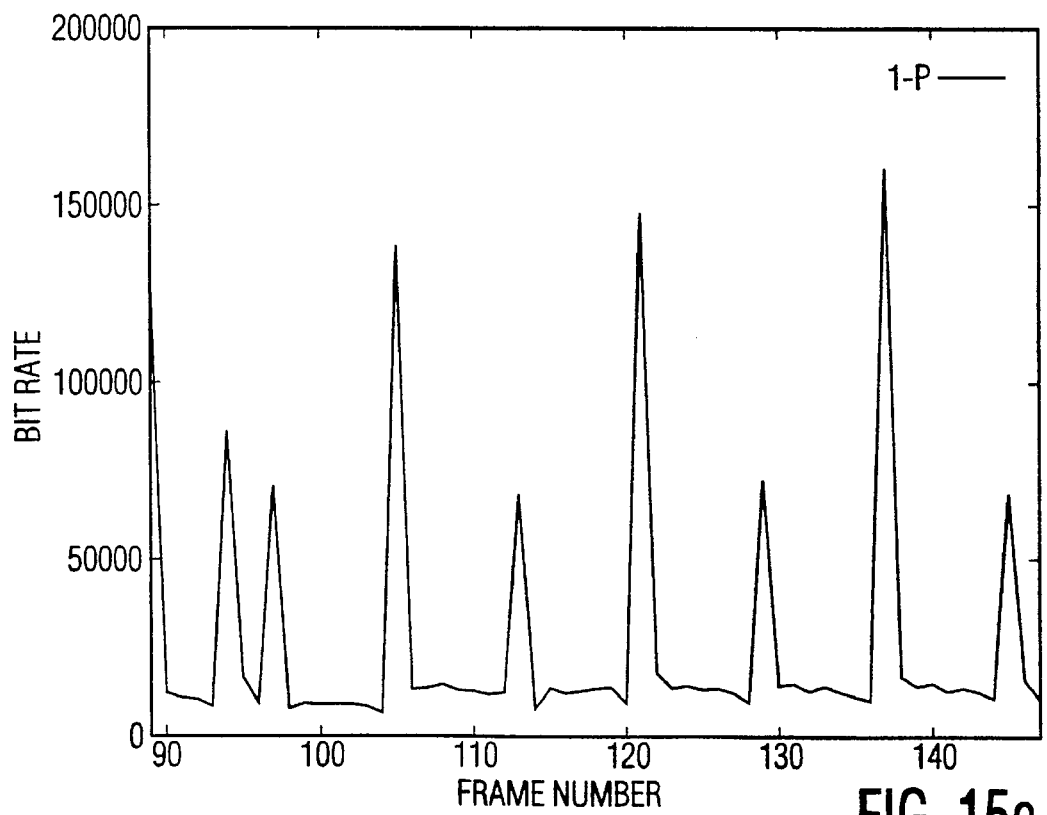
Figure 15D:
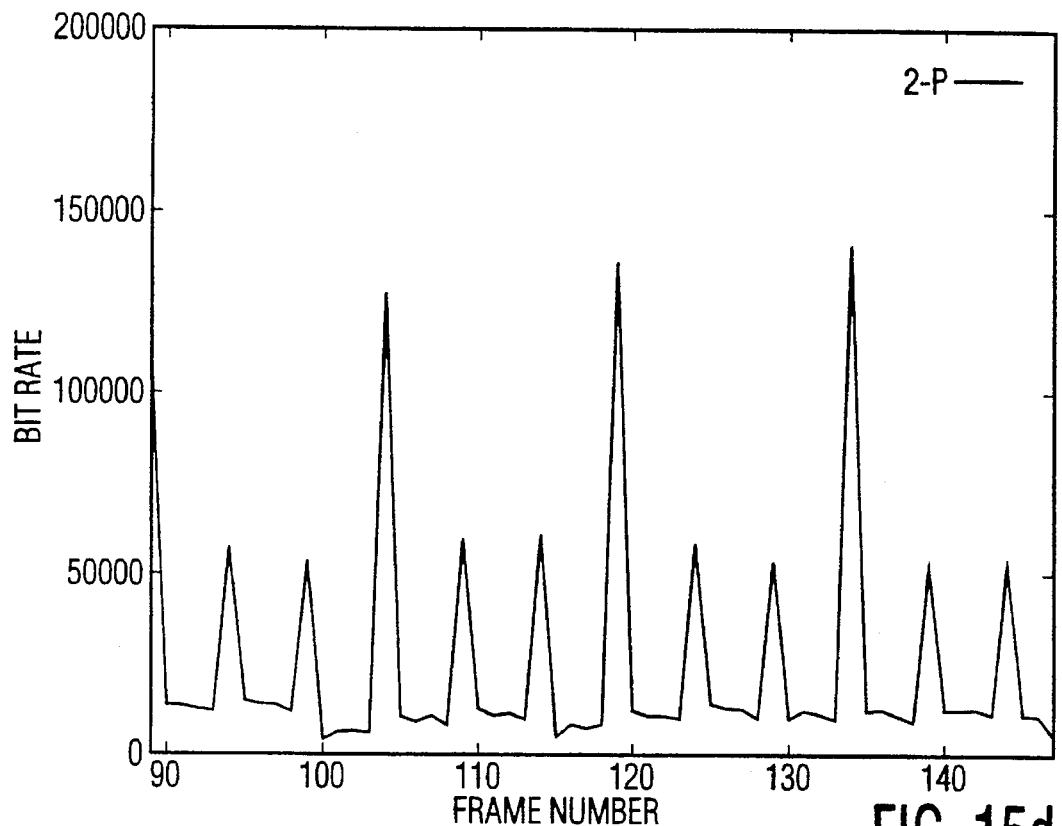
Figure 15E:
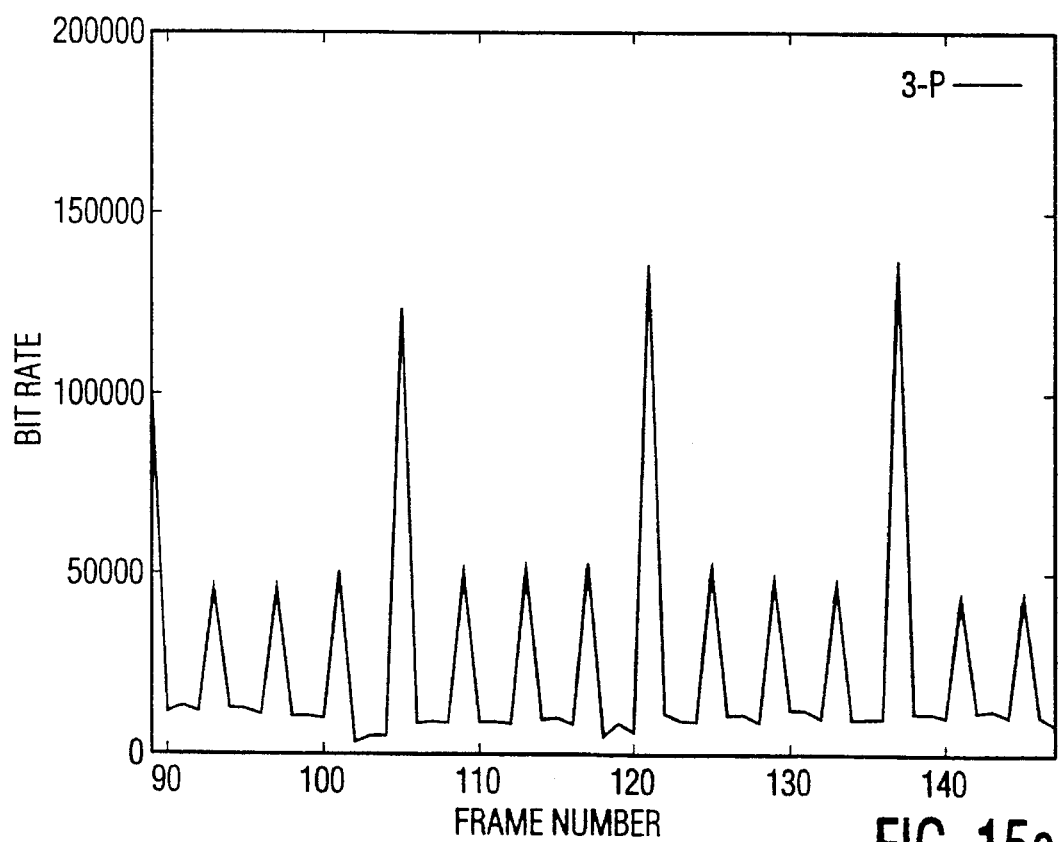

Highly accurate motion vector information for segmentation is not required, therefore the computation can be reduced by a factor of 2 in both dimensions via pixel subsampling, i.e., about ¼ computation saving is achieved. Extra savings can be obtained by using a backward telescopic search, as shown in FIG. 13, where the sequence of the search runs backward in time opposite to the direction of conventional telescopic search (see FIG. 6). Note that the accuracy of the backward motion vector is better than the usual forward telescopic search. The previous motion vector used as a prediction for a current search is more correlated to the current macroblock in the backward search than in the forward search, because the current macroblock to be matched is always fixed, whereas that of the forward search is always changing in the forward search.

Experimental Results:

FBR-TAMI algorithm:

For testing of the FBR-TAMI algorithm 10 (see FIG. 4), simulations were performed using a tennis sequence in the CIF format (352 by 240 pixels) for different N-P schemes for N=0, 1, 2, and 3. The Huffman coding tables in the MPEG standard MPEG91 were used for the variable length coding. The difference of histogram(DOH) was used for the distance measure in the simulations for the TAMI algorithm because of its simplicity.

Figure 5:
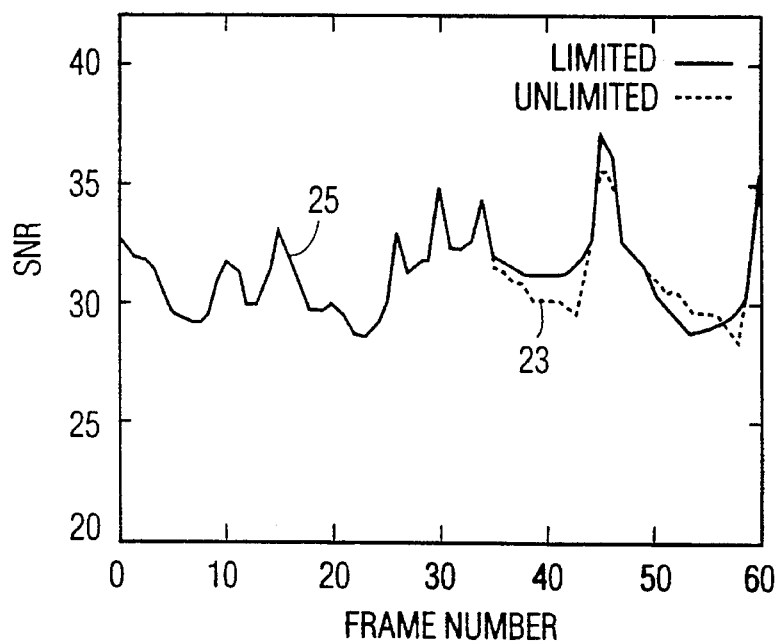
FIG. 5 shows plots or curves of signal-to-noise ratio (SNR) versus frame number for comparing 0-P processing when the number of P1 frames is not limited, versus the signal-to-noise ratio obtained when the number of P1 frames is limited, in one embodiment of the invention.
Figure 16A:
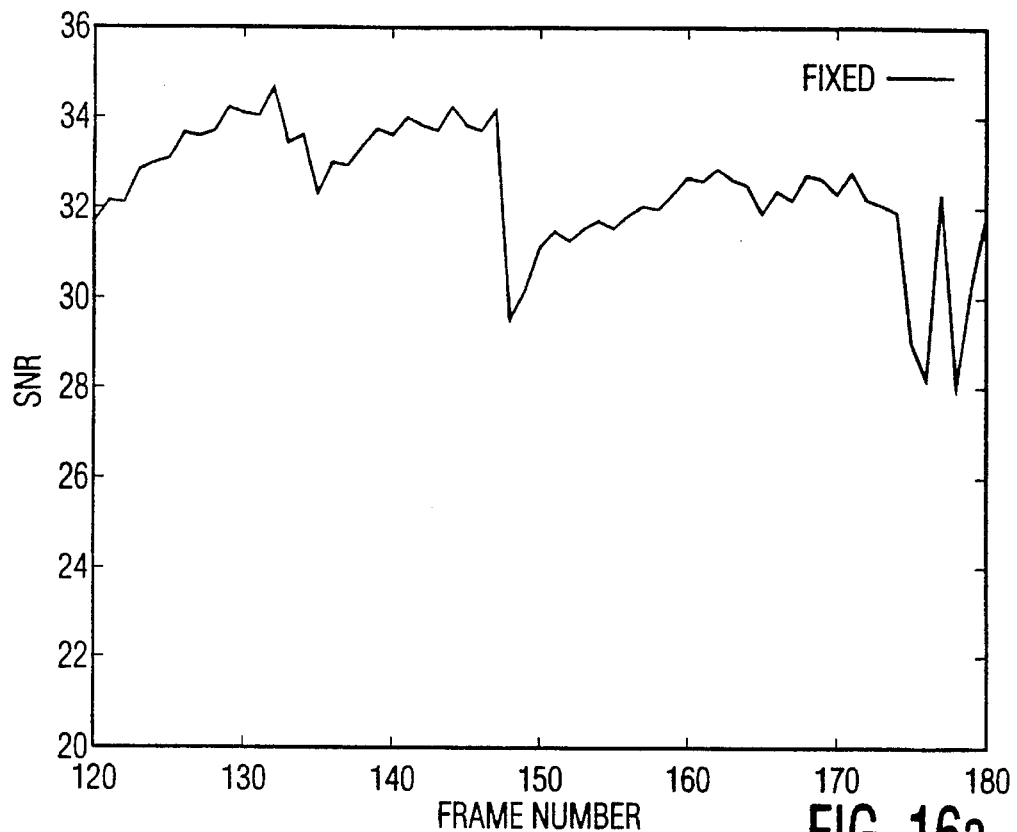
FIGS. 16(a) through 16(e) show SNR curves derived from a plurality of successive frames of a GOP with a scene change having an average bit rate of 736.5Kbit/sec (Tennis), for conventional fixed 4-P, and 0-P, 1-P, 2-P, and 3-P schemes, respectively, for an embodiment of the invention.
Figure 16B:
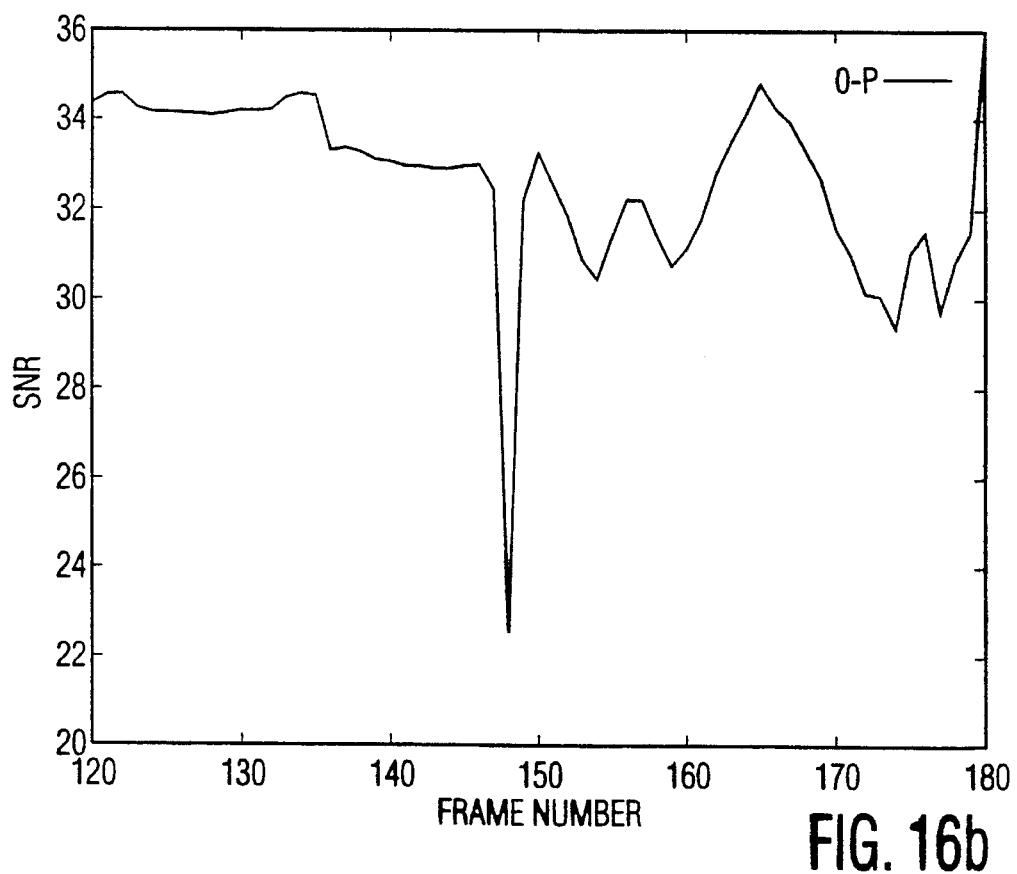
Figure 16C:
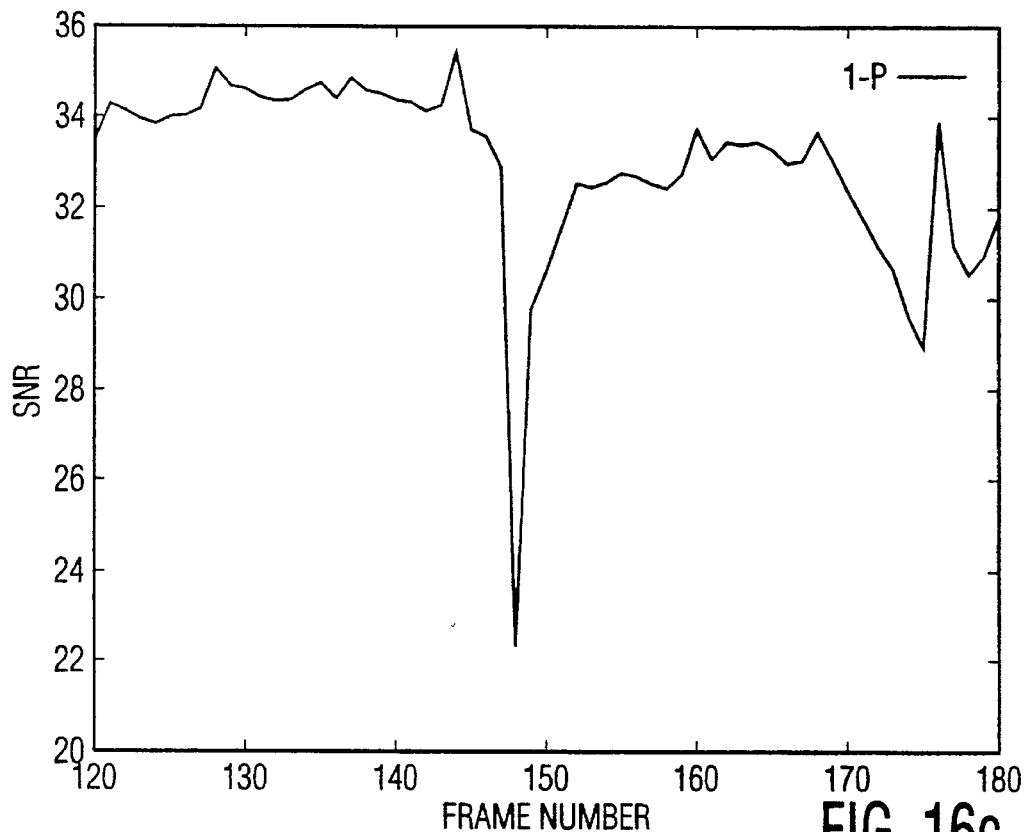
Figure 16D:
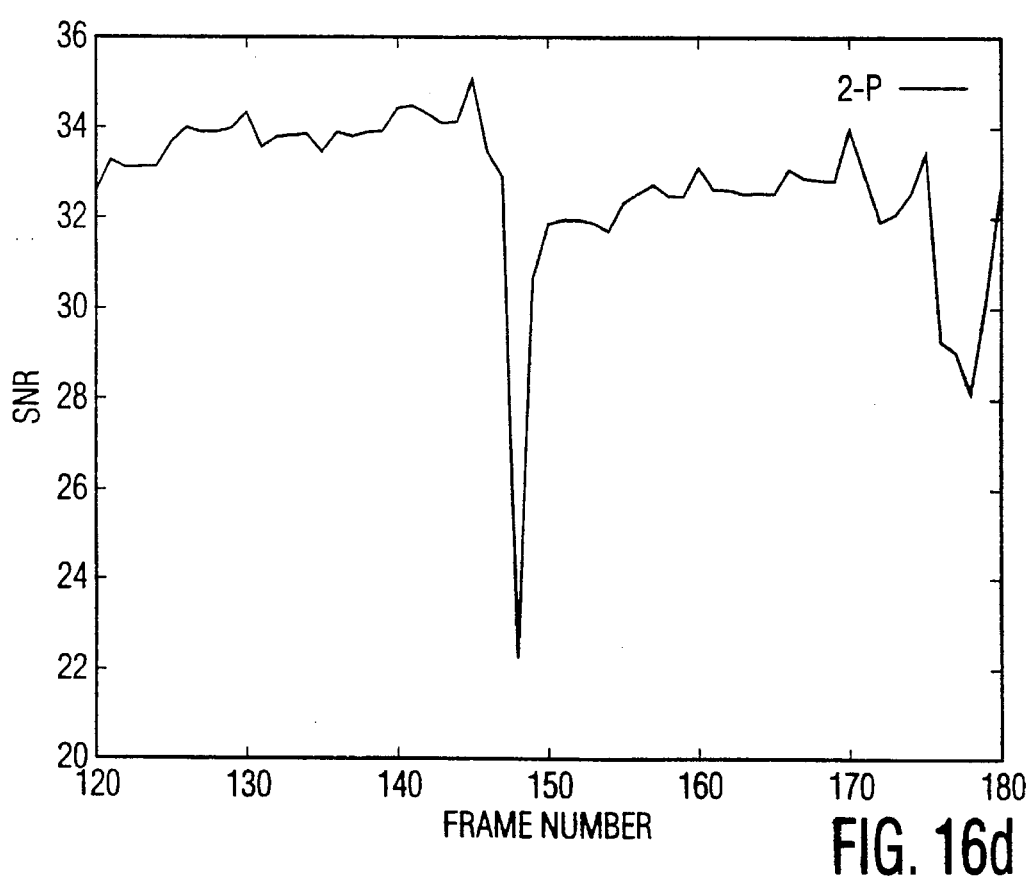
Figure 16E:
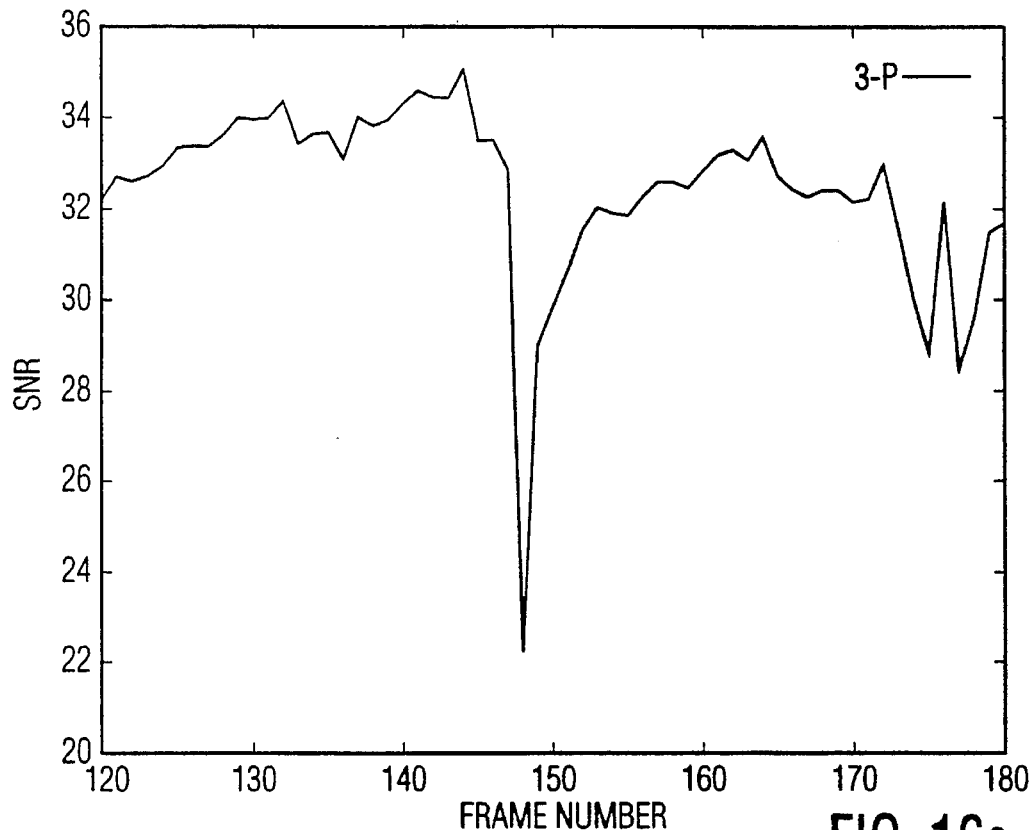
Figure 17A:
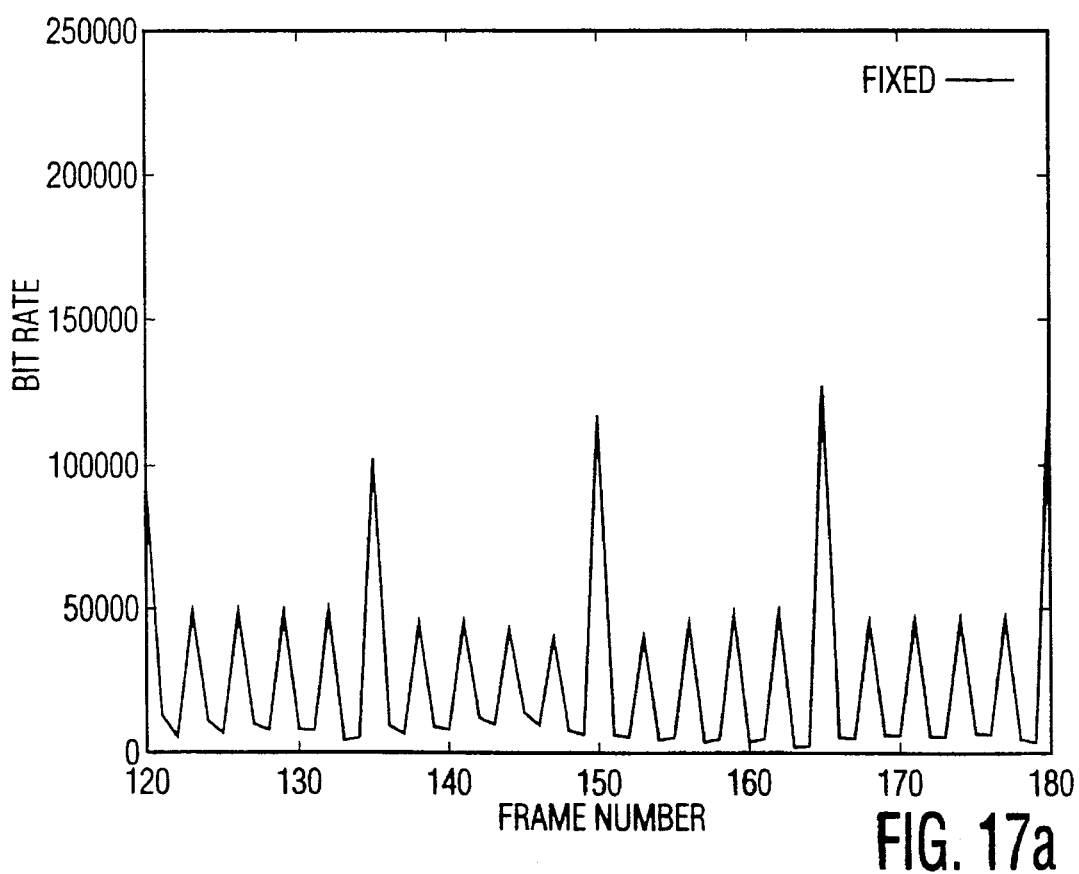
FIGS. 17(a) through 17(e) show curves for the bit rate versus successive frame numbers for high temporal activity regions with an abrupt scene change, when the average bit rate is 736.5Kbit/sec (Tennis), corresponding to FIGS. 17(a) through 17(e), respectively.
Figure 17B:
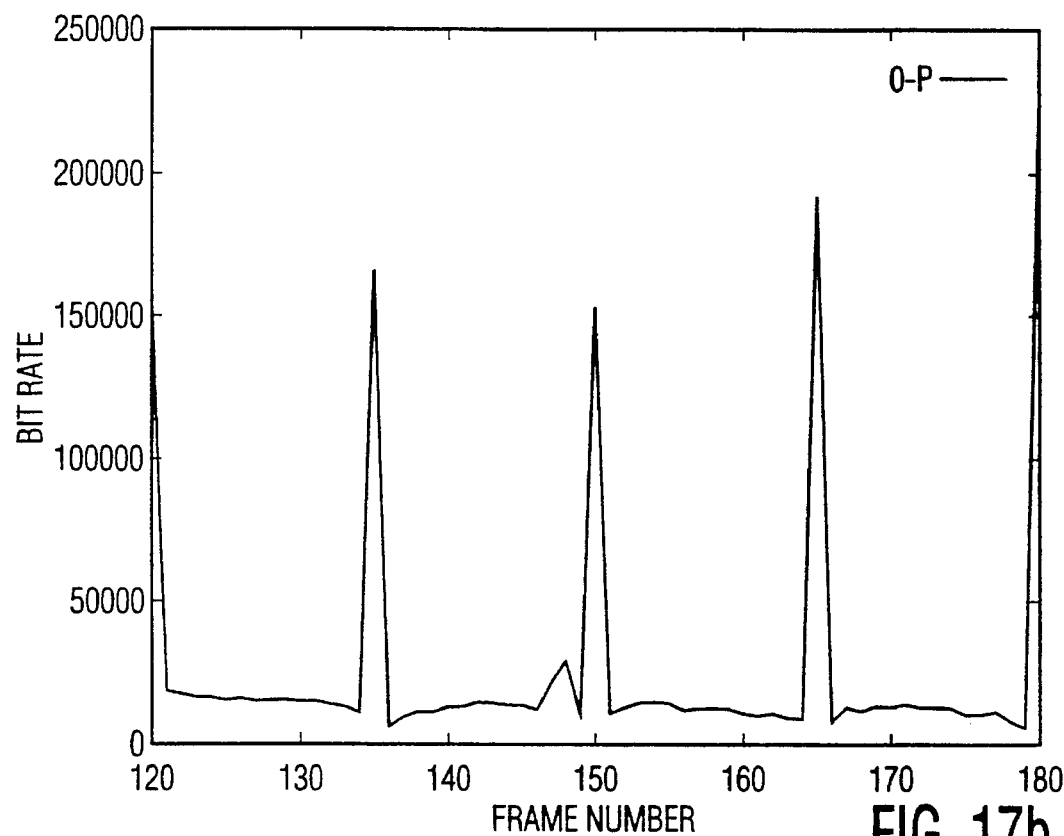
Figure 17C:
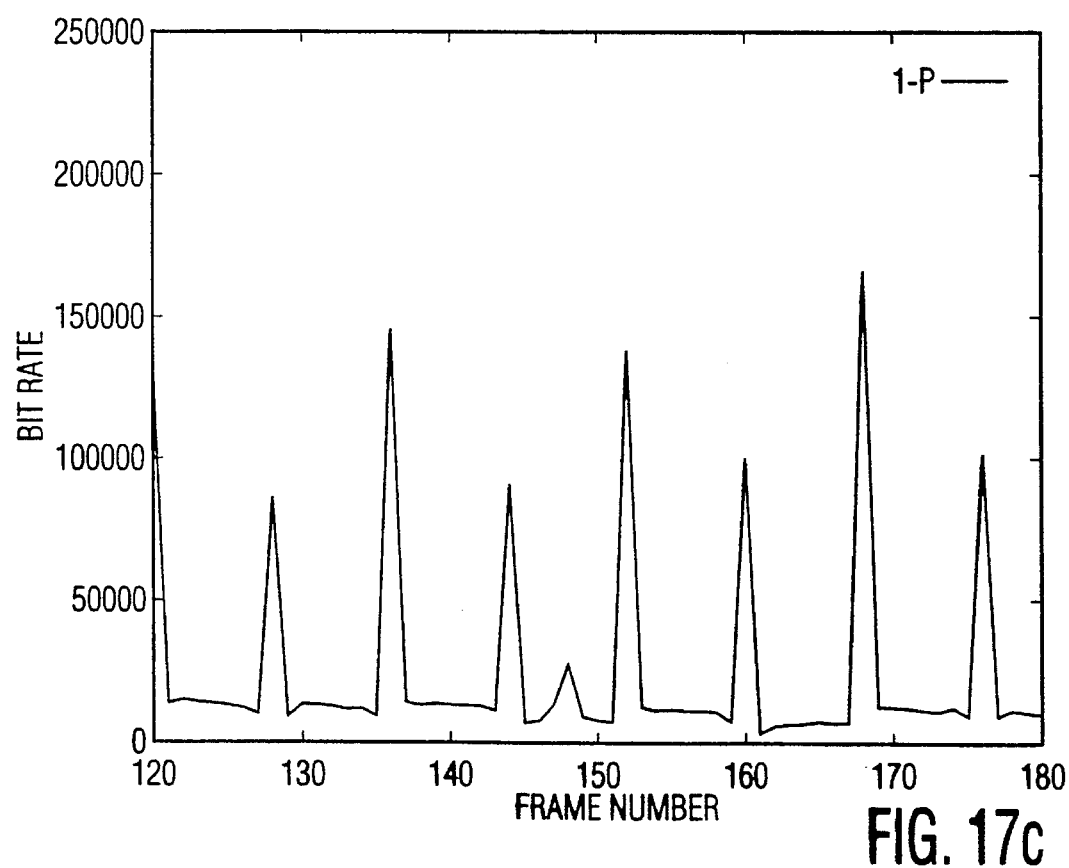
Figure 17D:
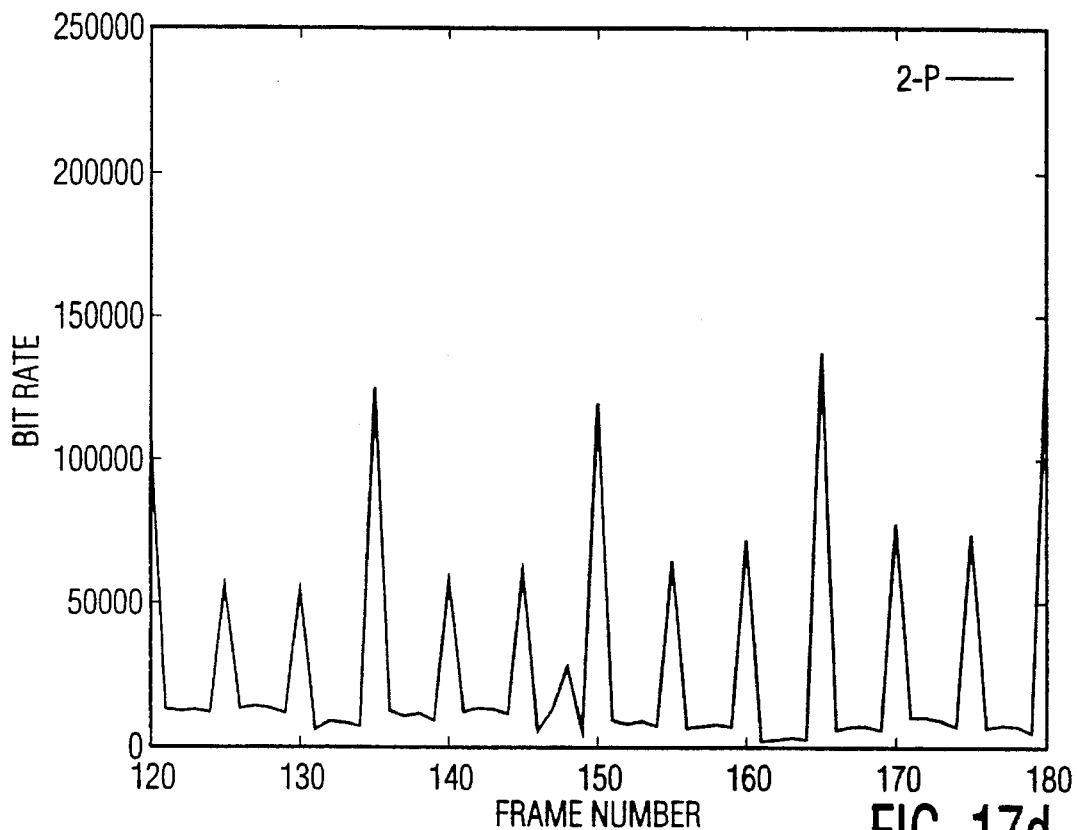
Figure 17E:
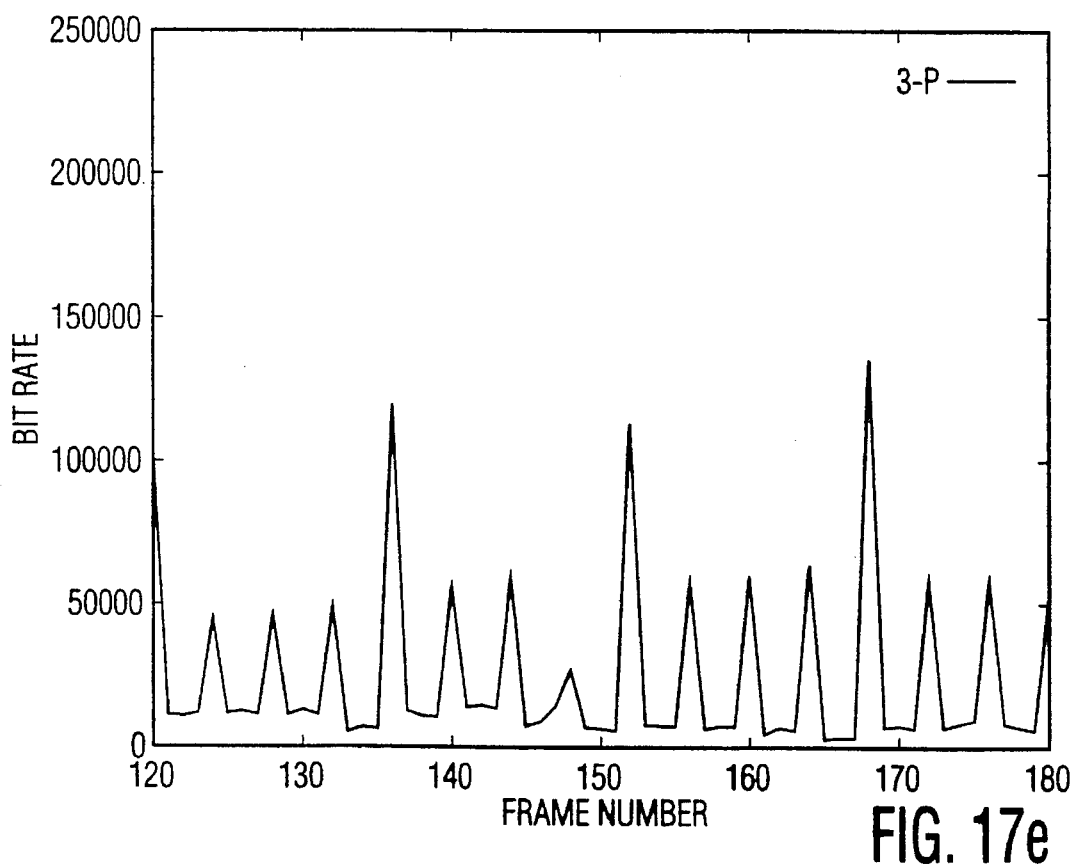
Figure 18A:
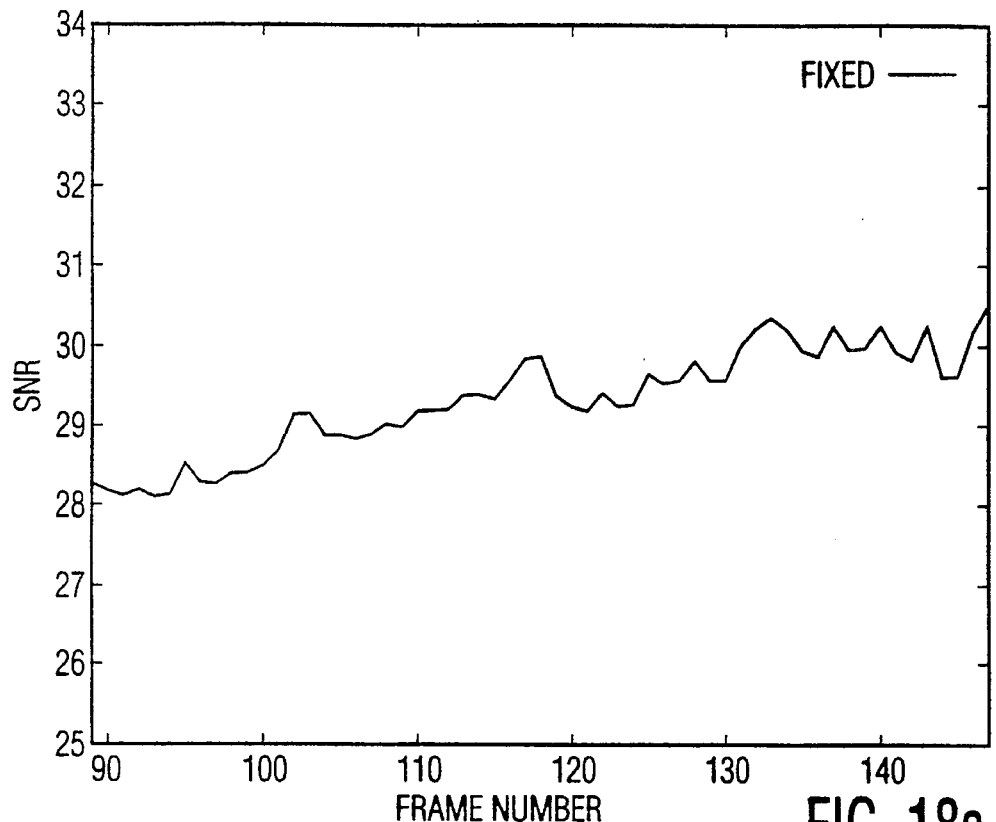
FIGS. 18(a) through 18(e) show SNR curves versus successive frame numbers for images with little motion when the bit rate is 300Kbit/sec (Tennis), for conventional fixed 4-P, and for inventive embodiments for 0-P, 1-P, 2-P, and 3-P schemes, respectively.
Figure 18B:
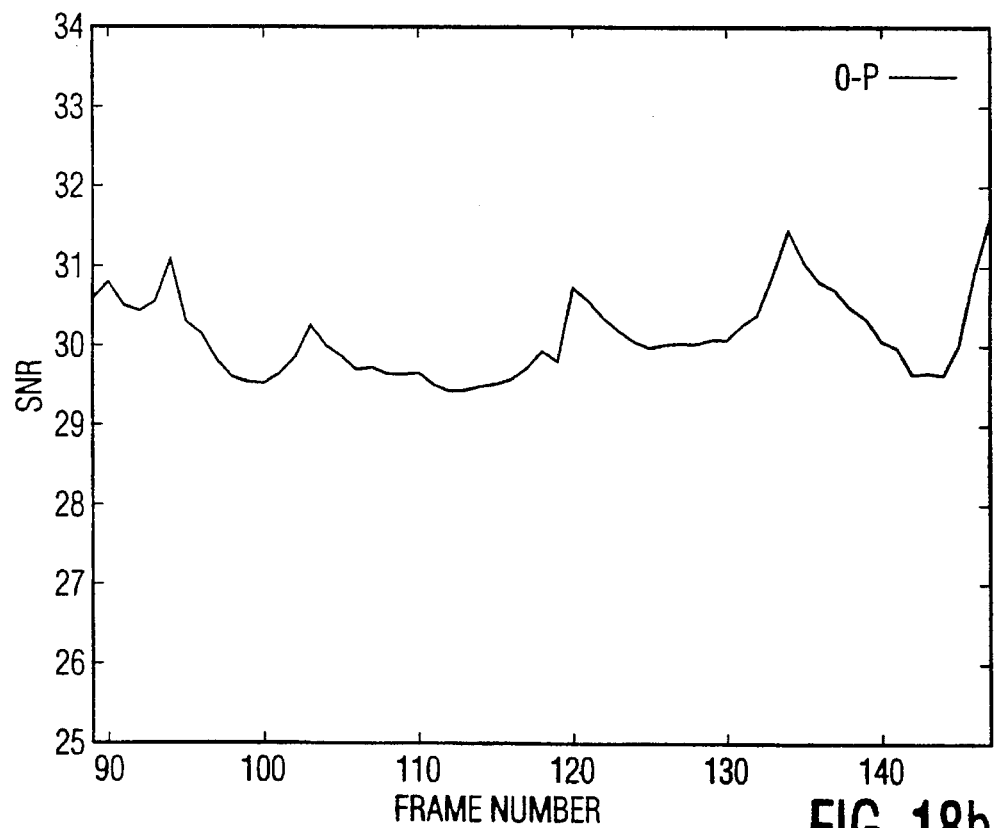
Figure 18C:
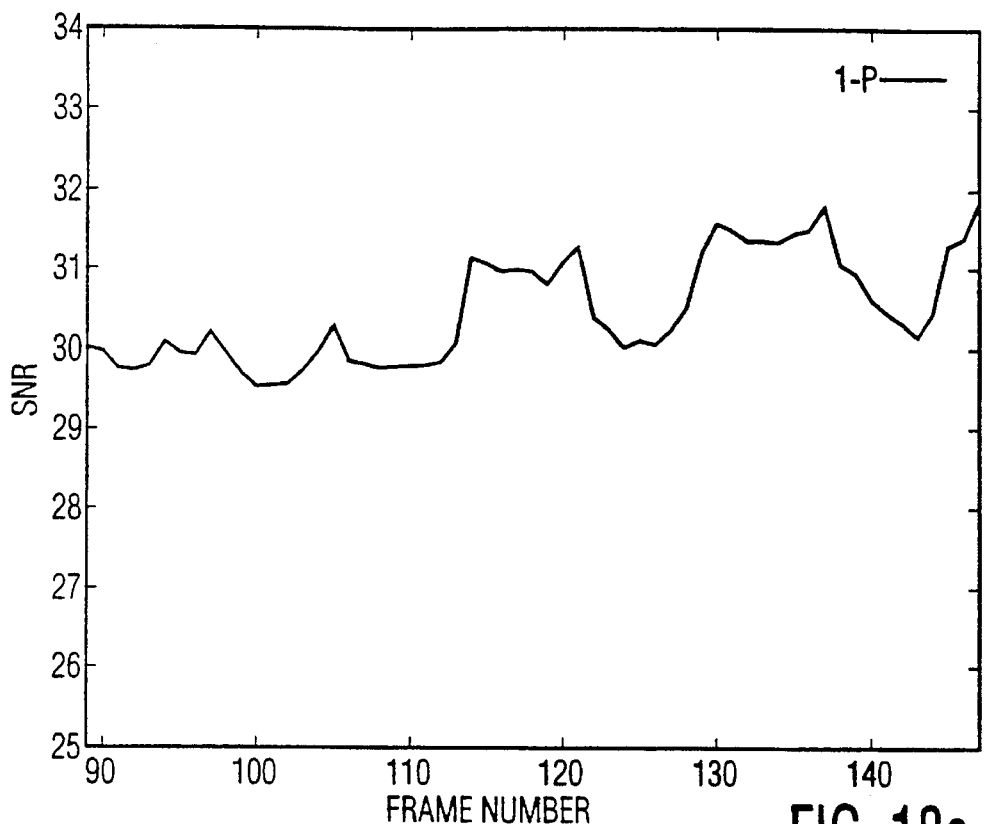
Figure 18D:
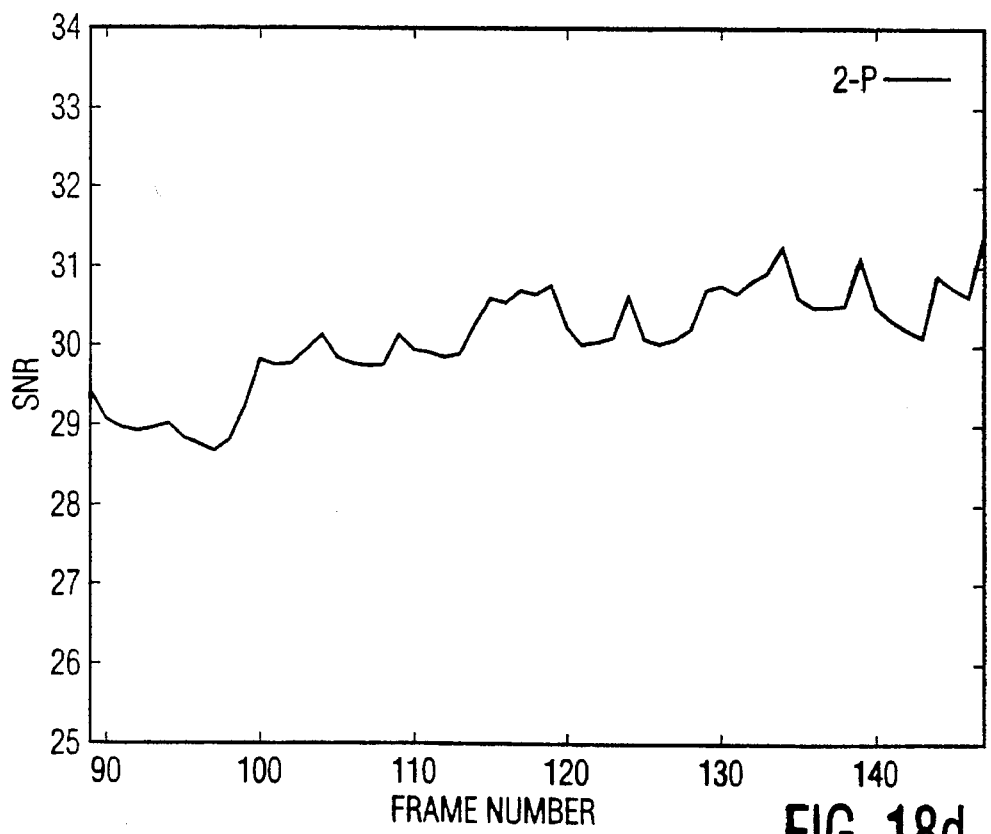
Figure 18E:
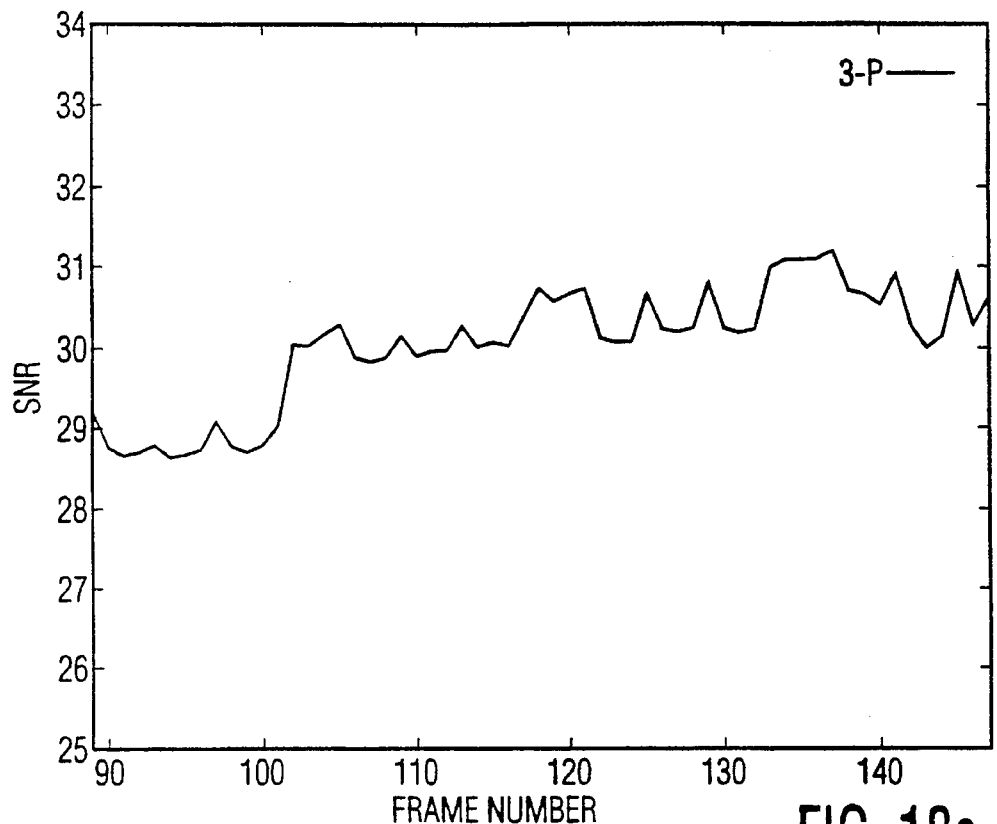
Figure 19A:
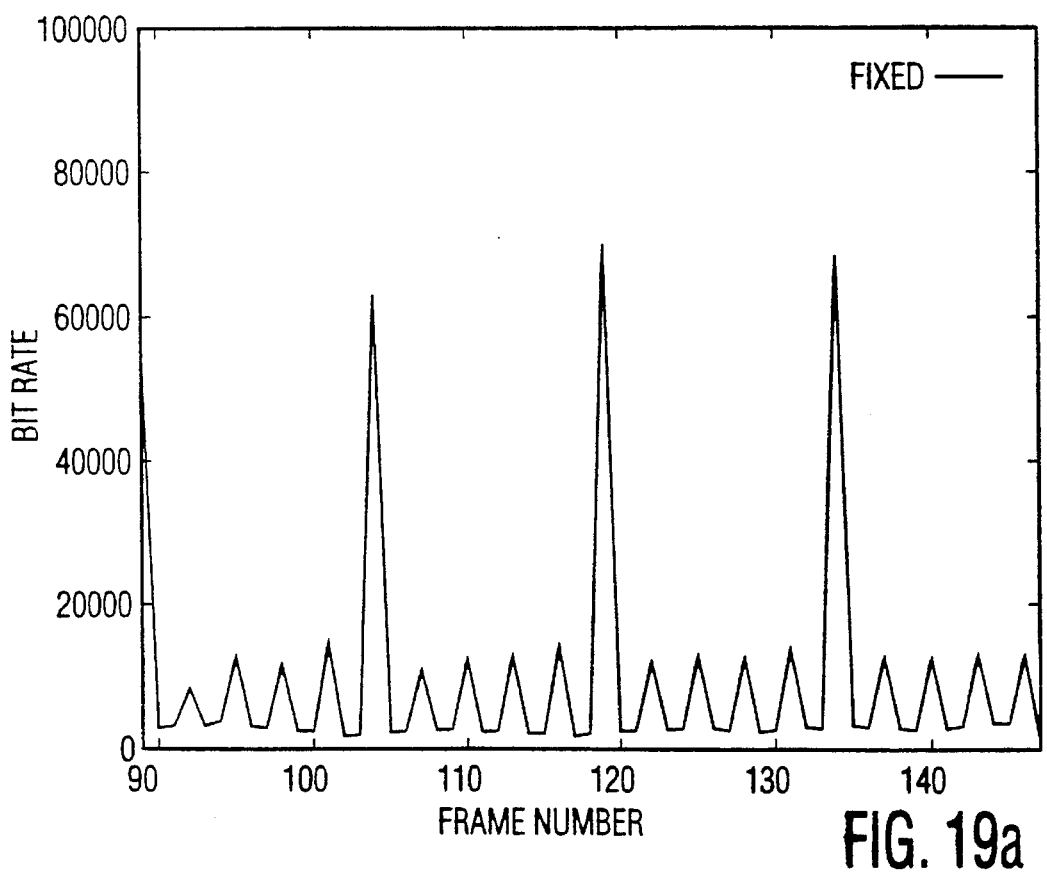
FIGS. 19(a) through 19(e) show the bit rates versus successive frame numbers corresponding to FIGS. 18(a) through 18(e), respectively.
Figure 19B:
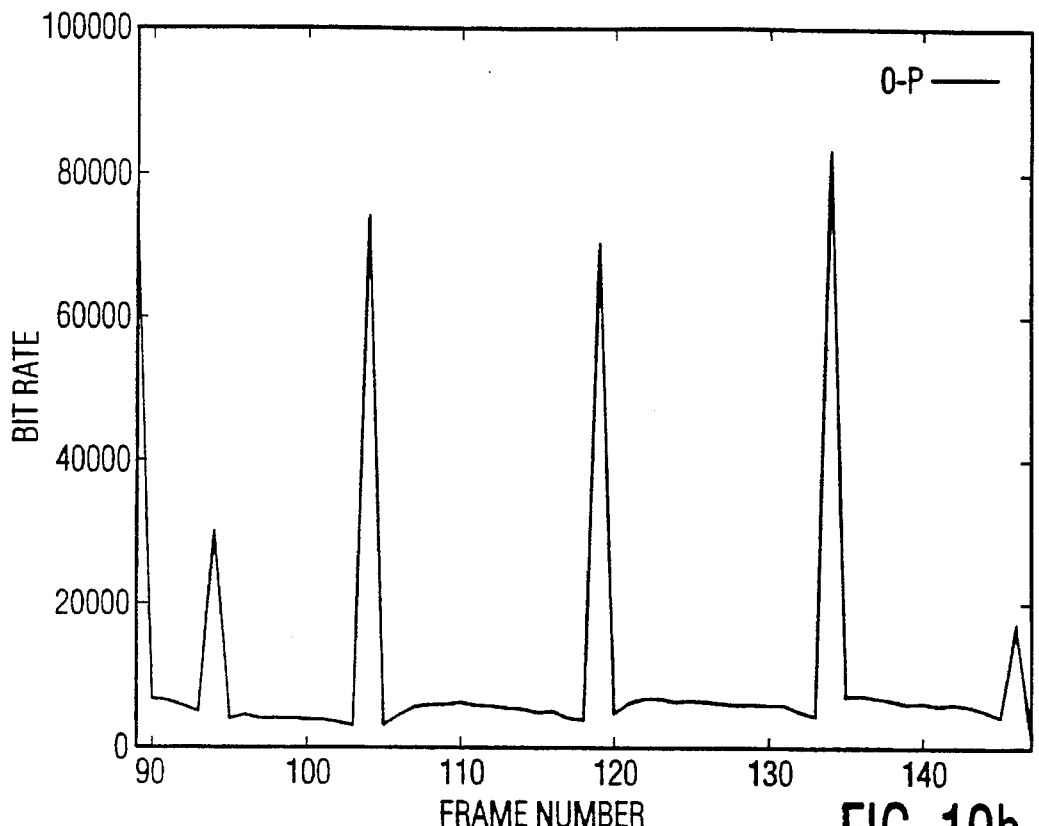
Figure 19C:
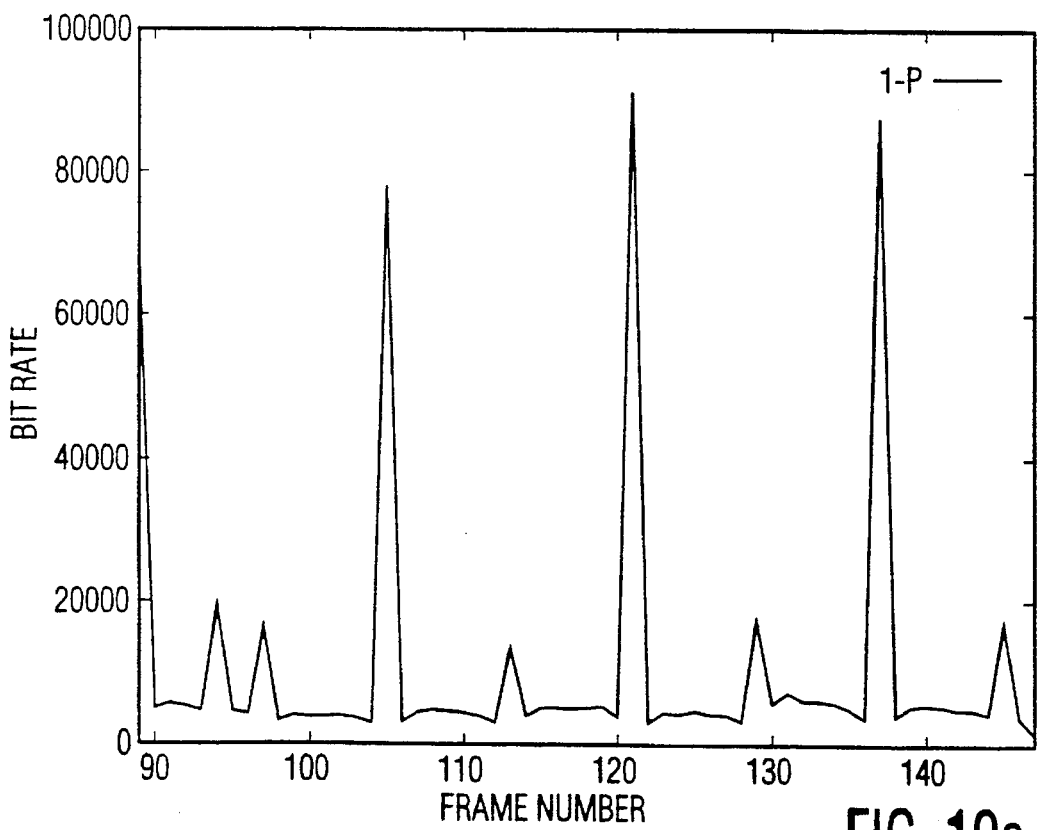
Figure 19D:
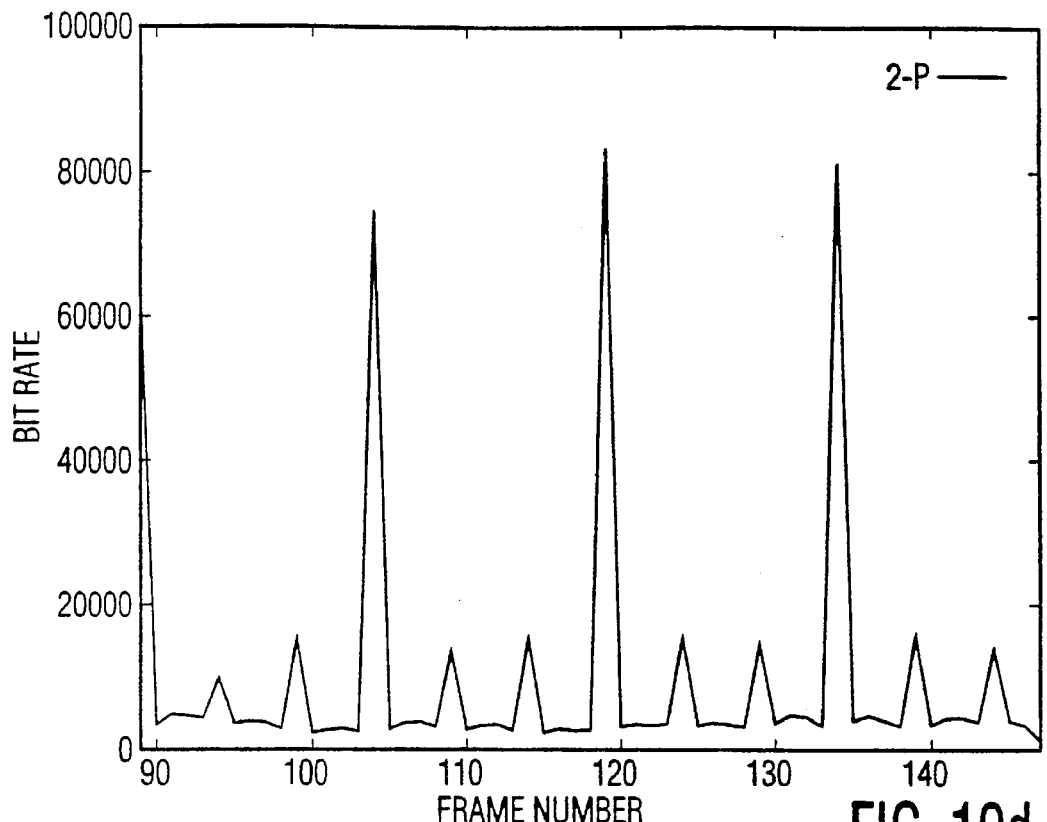
Figure 19E:
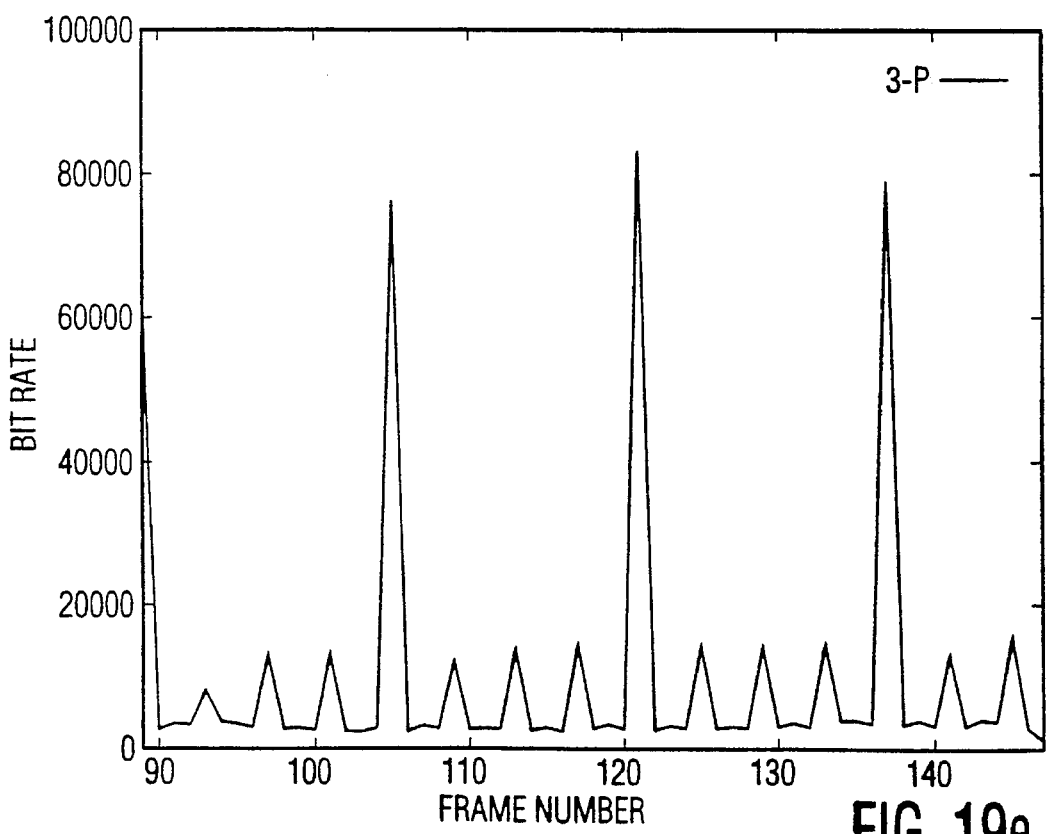

FIG. 5 shows the SNR's for the unlimited P1 (VBR TAMI) and limited P1 (fixed TAMI) embodiments. It shows that using a B1 frame is better than using a P2 frame, even when many scene changes of Type 0 are detected due to very busy motion activity. Hence for the rest of the simulations except for VBR-TAMI results, the limited P1 scheme is used. FIGS. 14(a)–14(e) show SNR results for the temporally smooth region, and its corresponding bit rate per frame is also provided in FIGS. 15(a)–15(e). More specifically, FIGS. 14(a)–14(e) show respective SNR vs. frames or images with little motion, for a tennis scene at an average bit rate of 736.5 Kbit/sec for conventional 4-P, and 0-P, 1-P, 2-P, and 3-P schemes, respectively. FIGS. 15(a)–15(e) show the bit rates for images with little motion corresponding to FIGS. 14(a)–14(e), respectively. From FIGS. 14(a) and 14(e), from amongst the several respective N-P schemes, the 1-P scheme performs the best in term of SNR and subjective quality, and its SNR is about 1dB better than the conventional 4-P fixed scheme. FIGS. 16(a) though 16(e) show the results for the high temporal activity region with an abrupt scene change, and the corresponding bit rate results are given in FIGS. 17(a) through 17(e), respectively. The SNR of the 1-P scheme is also slightly better (by 0.5dB) than that of the conventional 4-P scheme even in the case with a scene change. The decoded image quality of the 1-P scheme has been determined to compare favorably with that of the conventional method 4-P scheme. The performance improvement using the 1-P scheme is more noticeable for low bit rate coding (300 Kbit/sec - Tennis), and the SNR and the bit rate results for the target bit rate are given in FIGS. 18(a)–18(e) and FIGS. 19(a)–19(e), respectively. Averages of SNR's and bit rates for FIG. 14, FIG. 16, and FIG. 18 are given in tables shown in FIGS. 20, 21, and 22, respectively. They show that the present 1-P FBR-TAMI scheme outperforms the conventional fixed 4-P scheme in most of the cases.

Figure 23A:
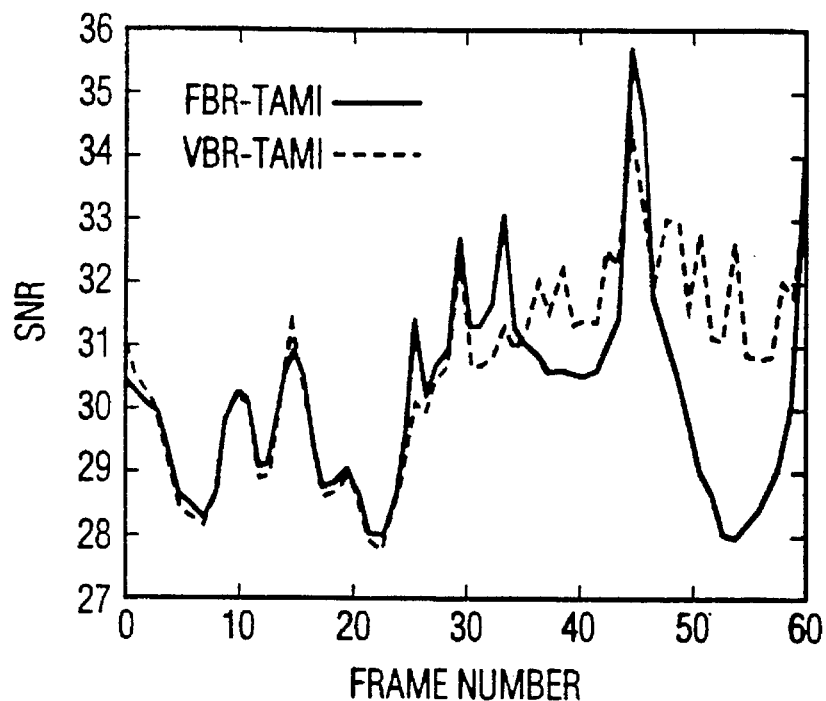
FIG. 23(a) shows SNR curves for comparing the performance of the FBR-TAMI and VBR-TAMI embodiments of the invention, respectively, having the same average bit rate of 663Kbit/sec.
Figure 23B:
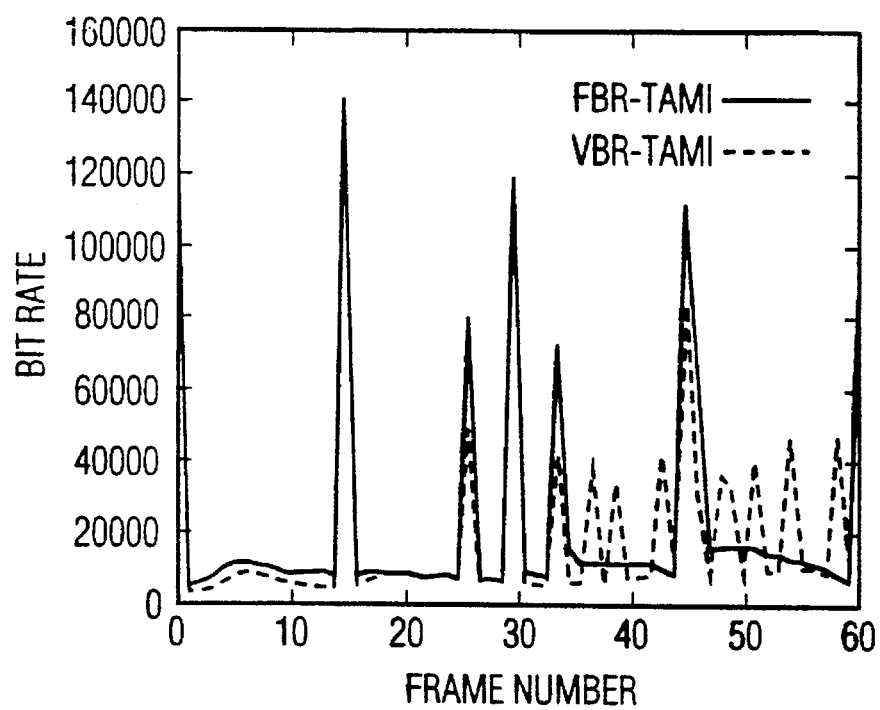
FIG. 23(b) shows the bit rates per frame for comparing curves in using FBR-TAMI, and VBR-TAMI, respectively, with the same average bit rate of 663Kbit/sec.
Figure 24A:
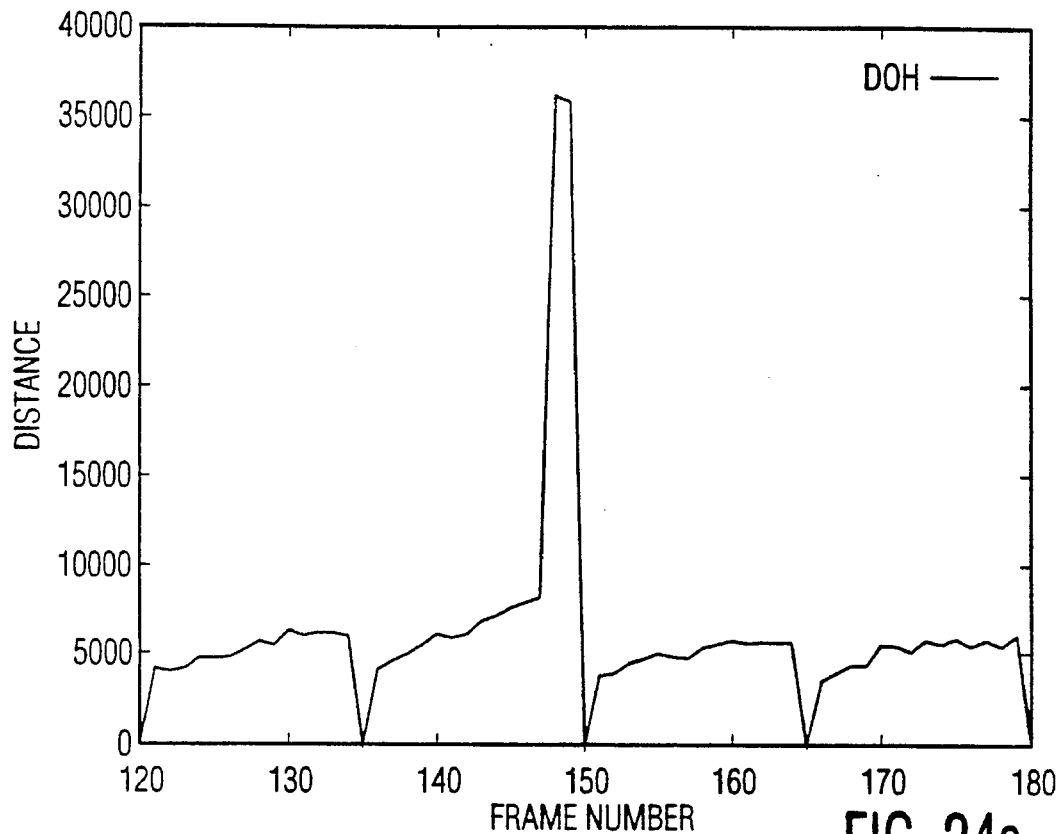
FIGS. 24(a) through 24(e) show the distances between a current frame and a first frame for frame numbers 120 through 180, using DOH, HOD, BH, BV, and MCE measurement methods, respectively.
Figure 24B:
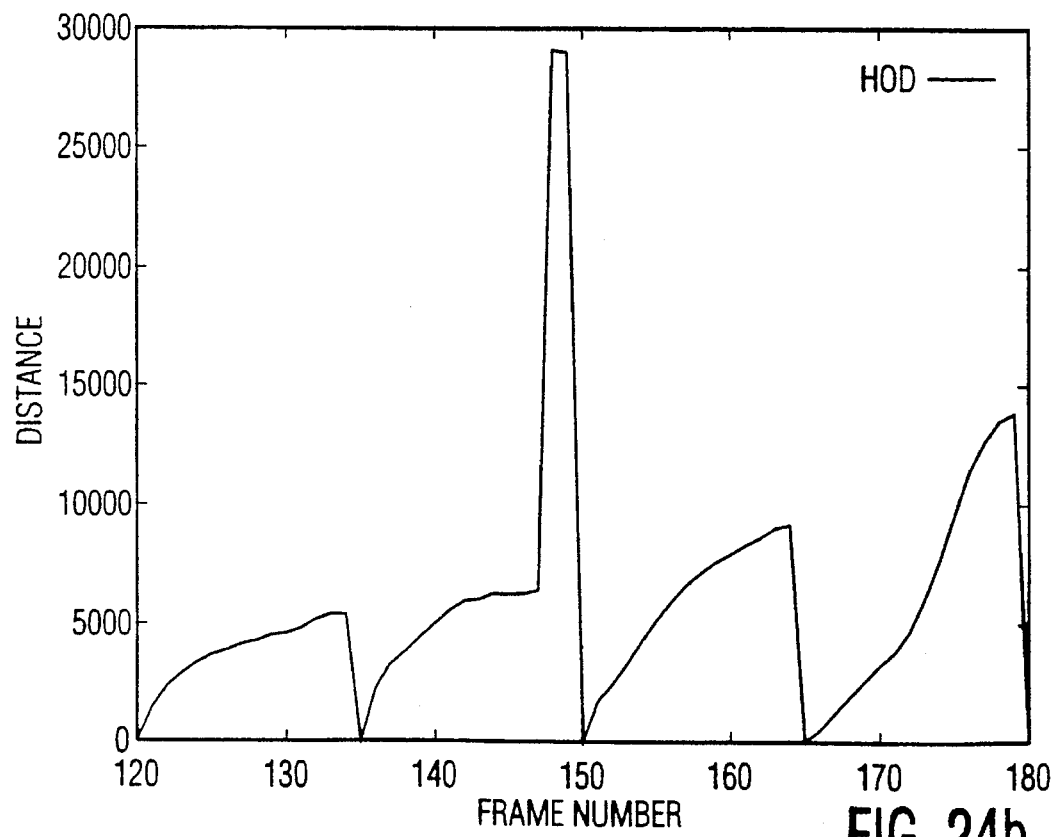
Figure 24C:
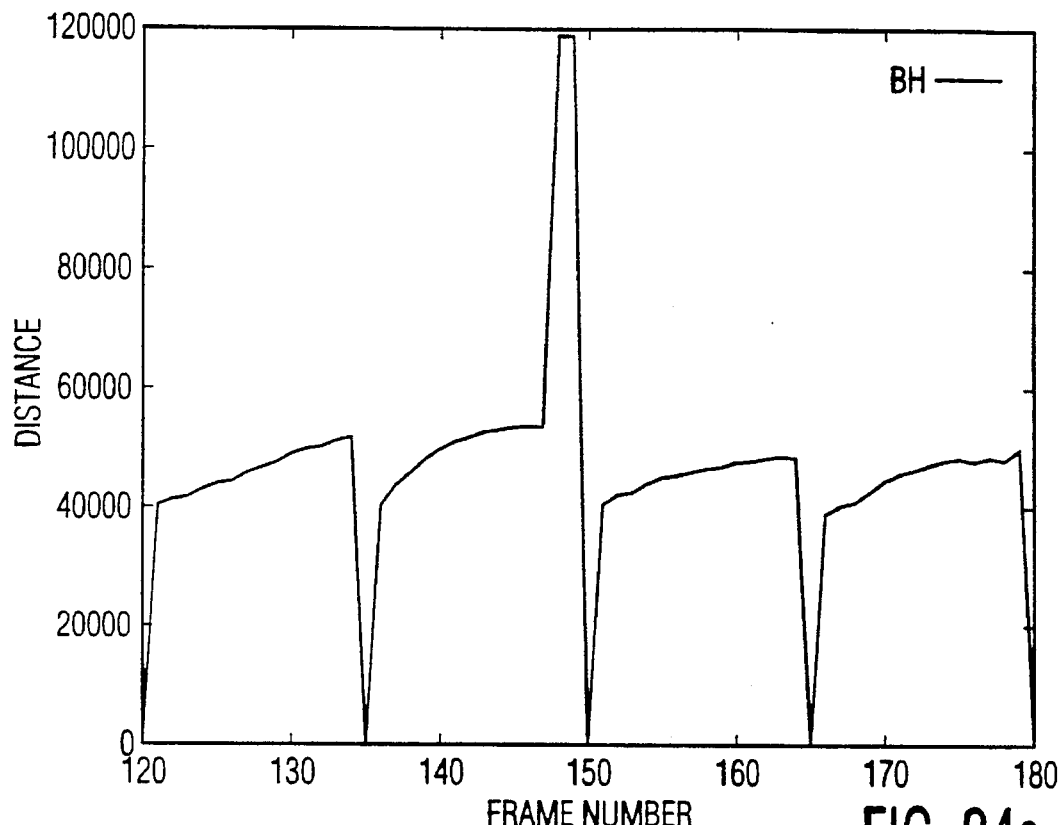
Figure 24D:
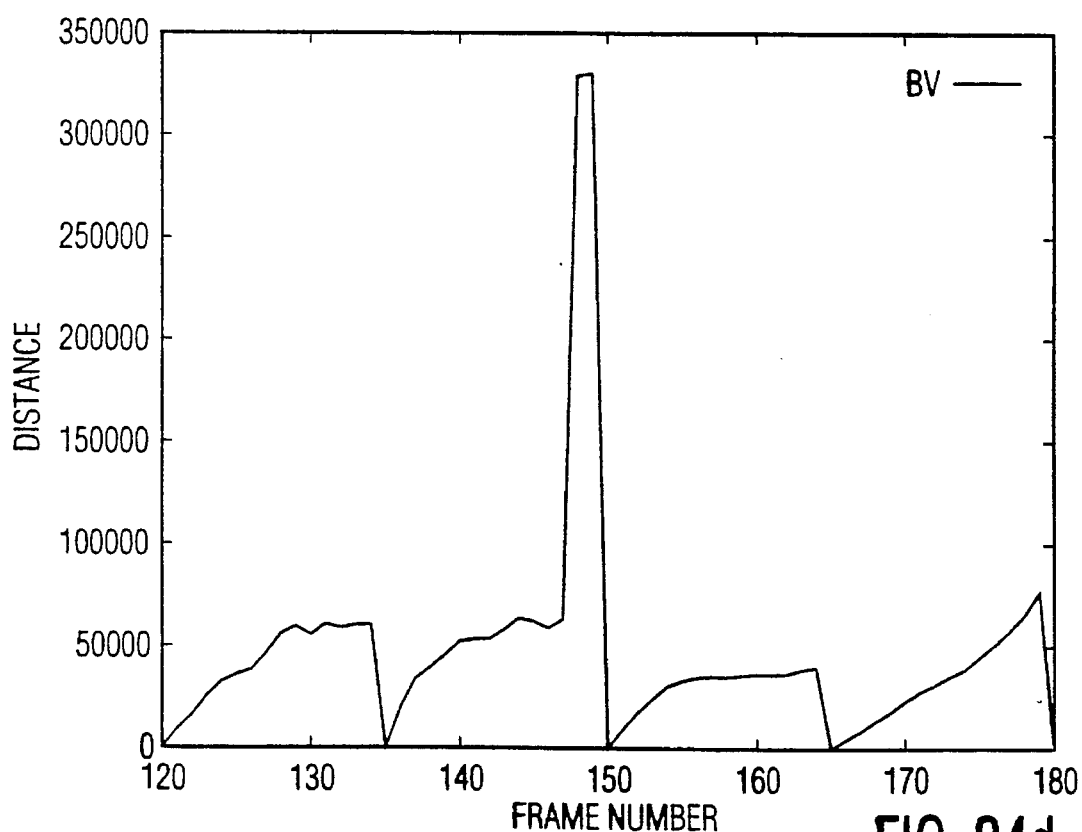
Figure 24E:
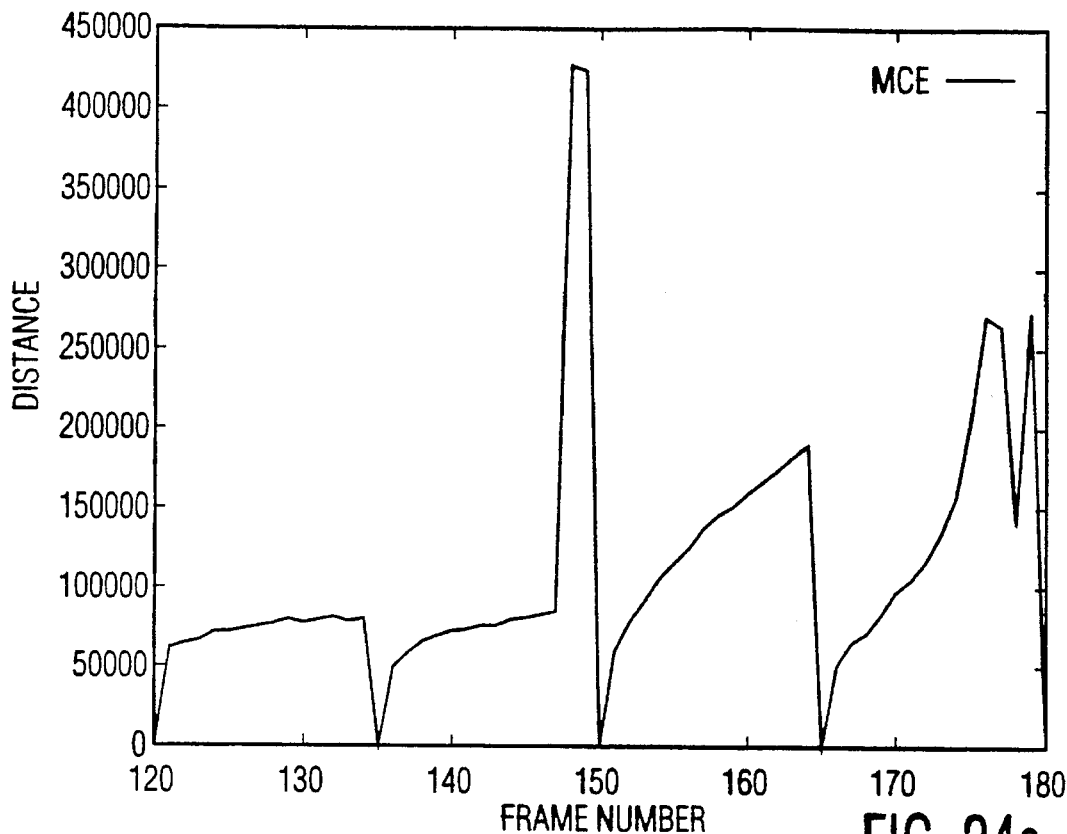
Figure 25A:
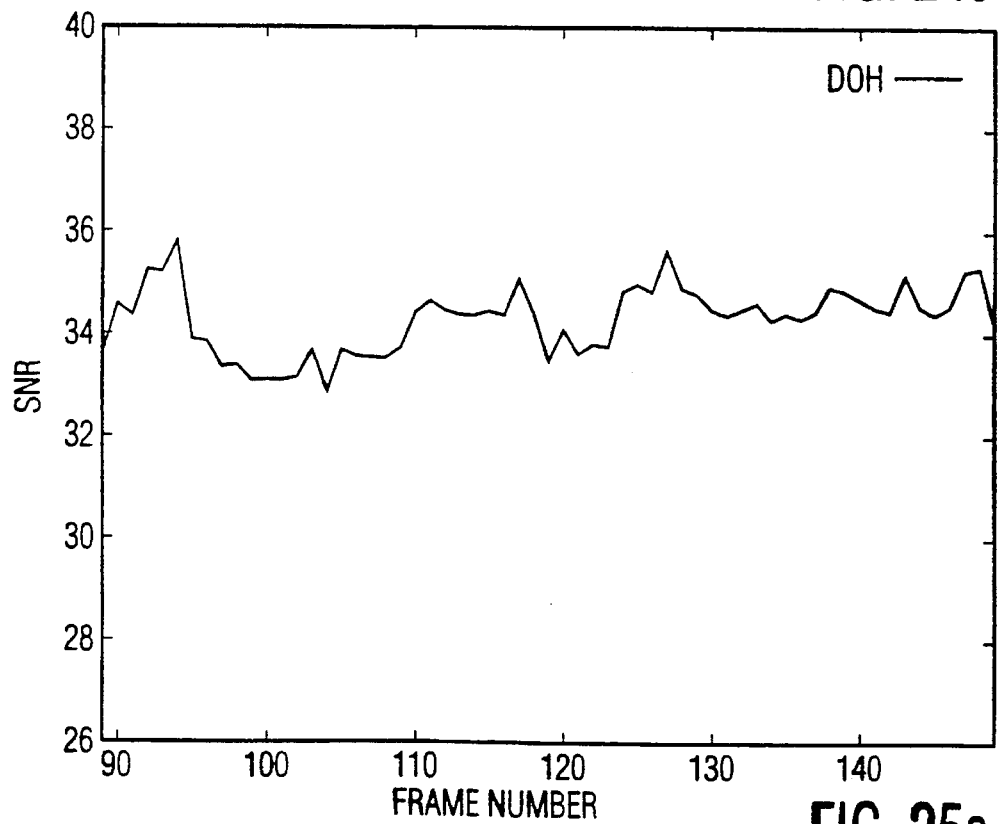
FIGS. 25(a) through 25(e) show SNR curves of an optimal spacing algorithm (OSA) of the present invention using DOH, HOD, BH, BV, and MCE measurements, respectively.
Figure 25B:
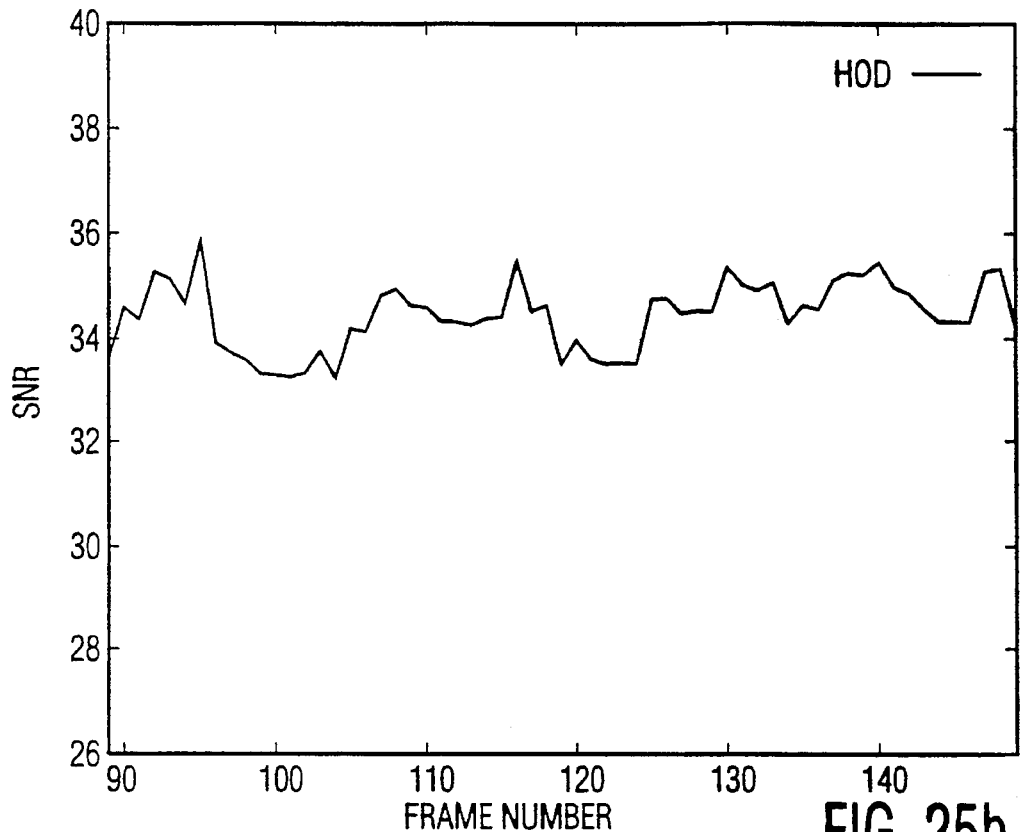
Figure 25C:
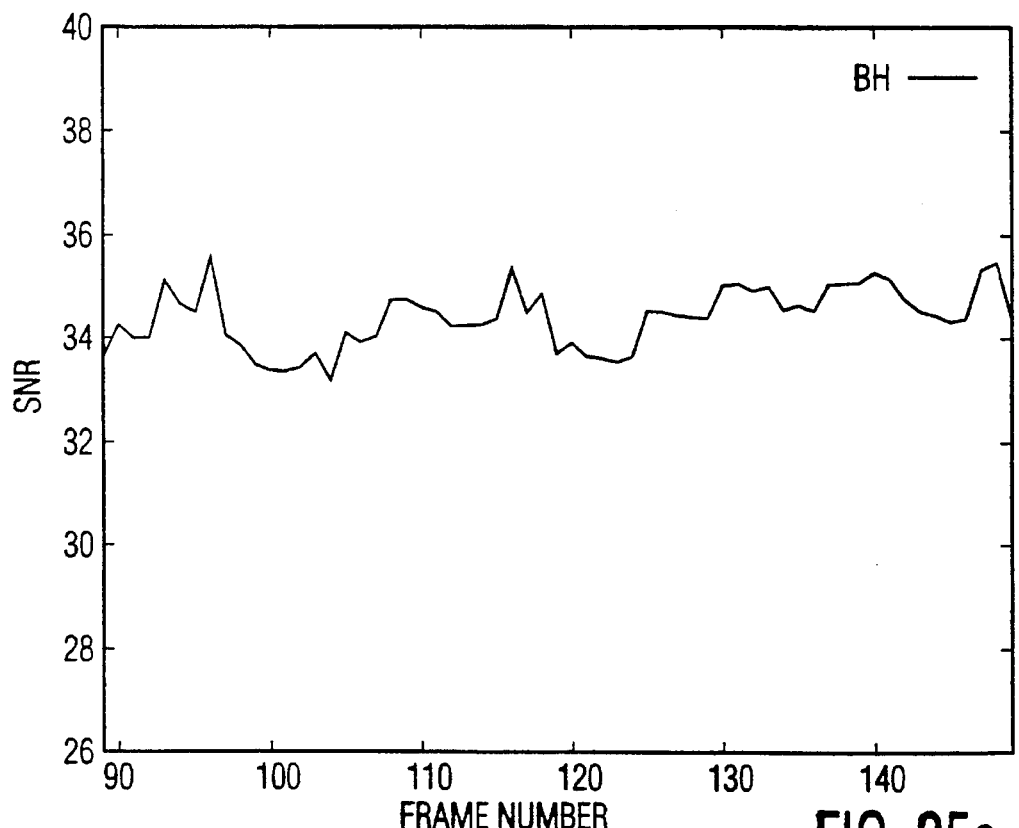
Figure 25D:
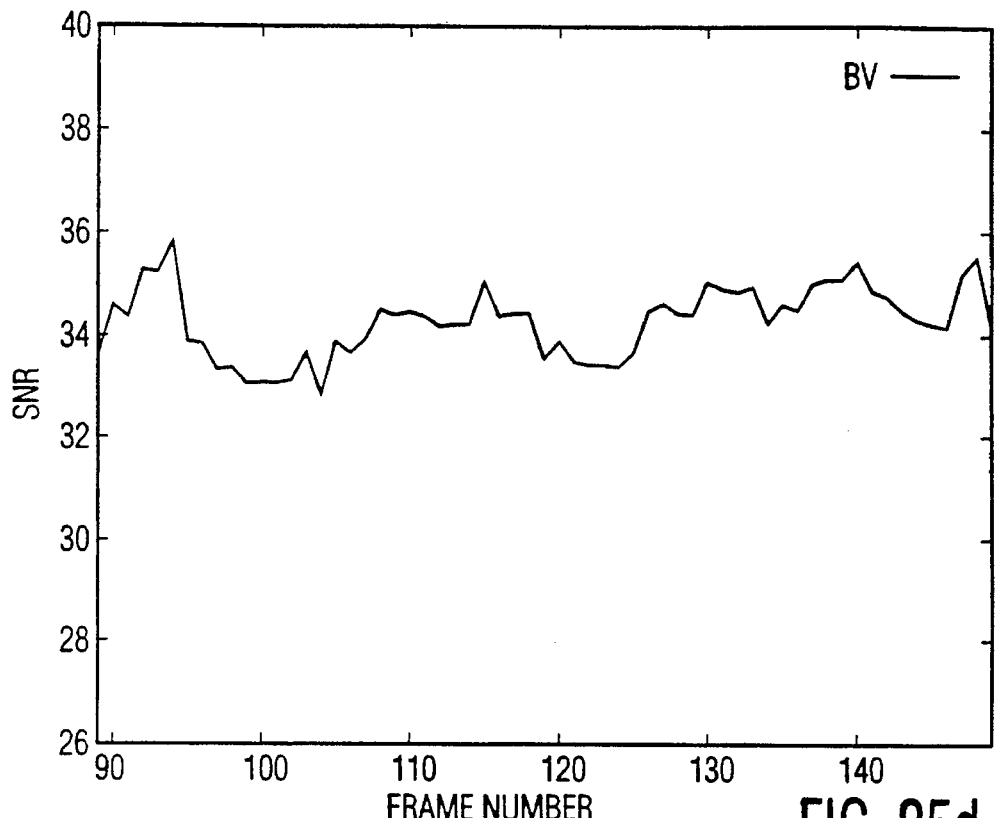
Figure 25E:
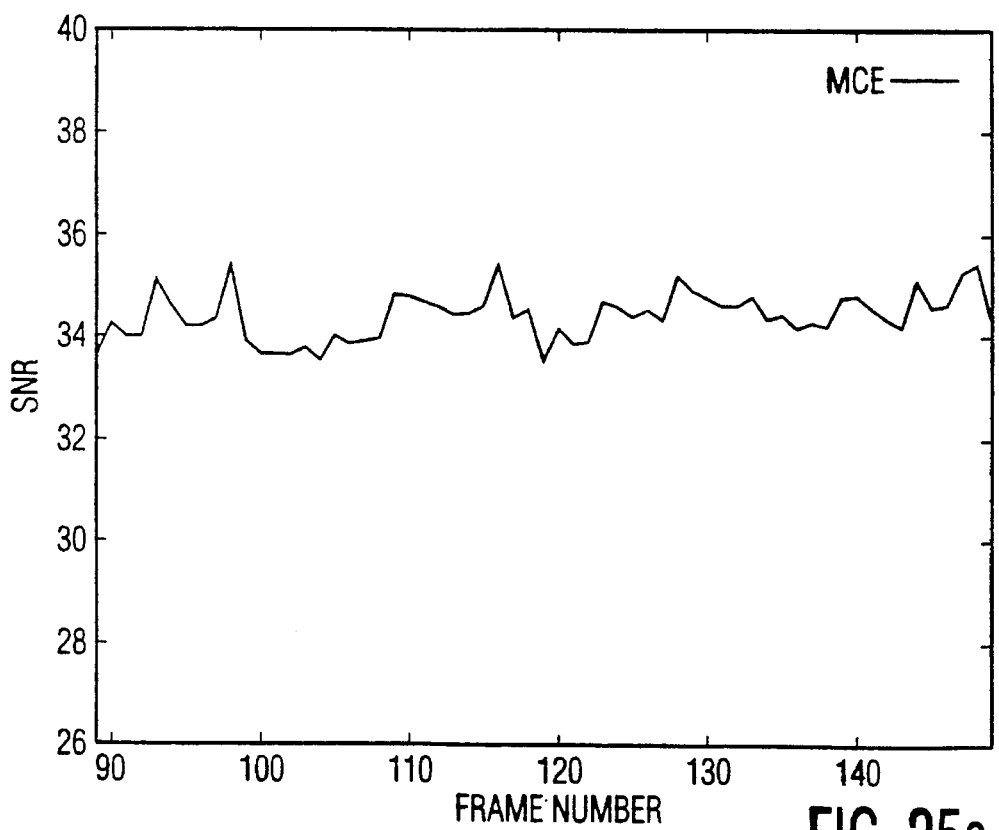
Figure 28A:
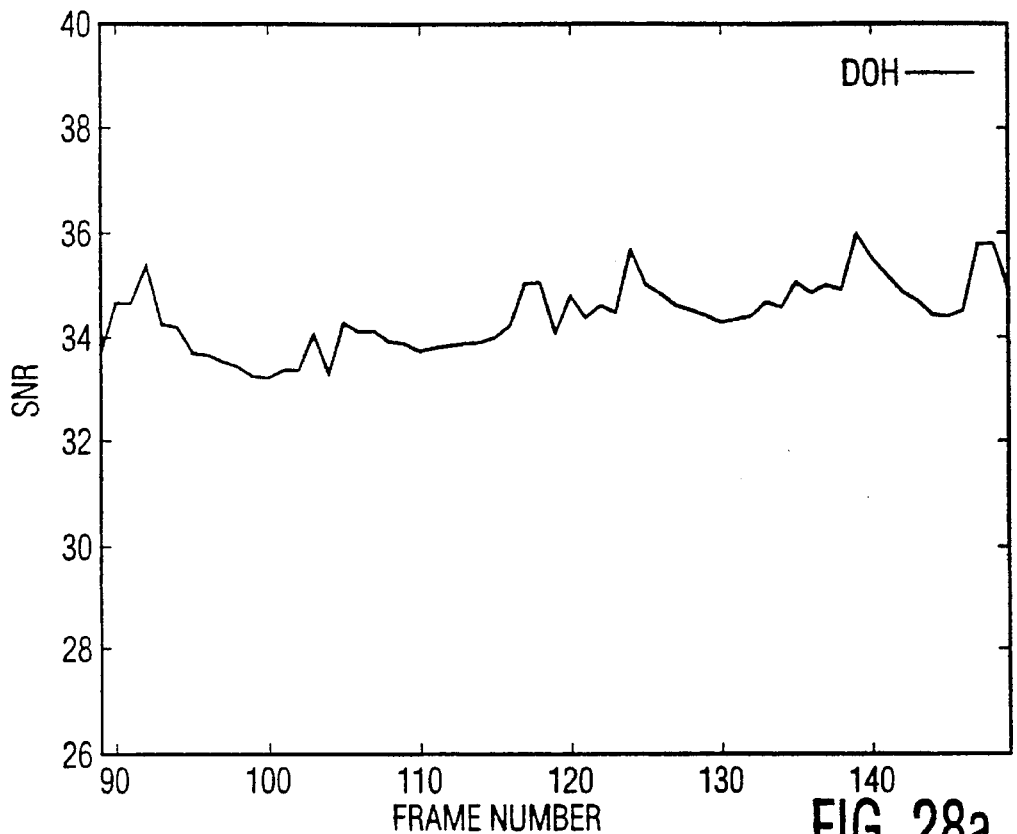
FIGS. 28(a) through 28(e) show curves of SNR versus frame numbers 90 through 150 through use of the embodiment of the invention of an adaptive optimal spacing algorithm (OSA) with B2 frames using distance measurement methods, DOH, HOD, BH, BV, and MCE, respectively.
Figure 28B:
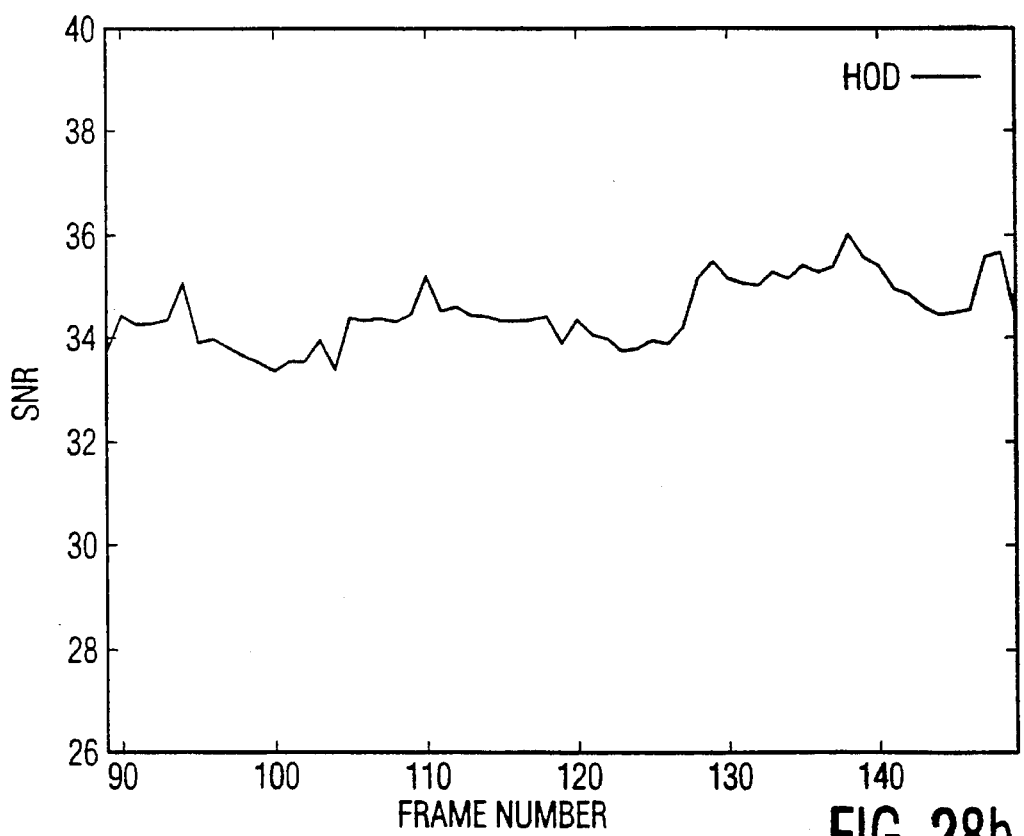
Figure 28C:
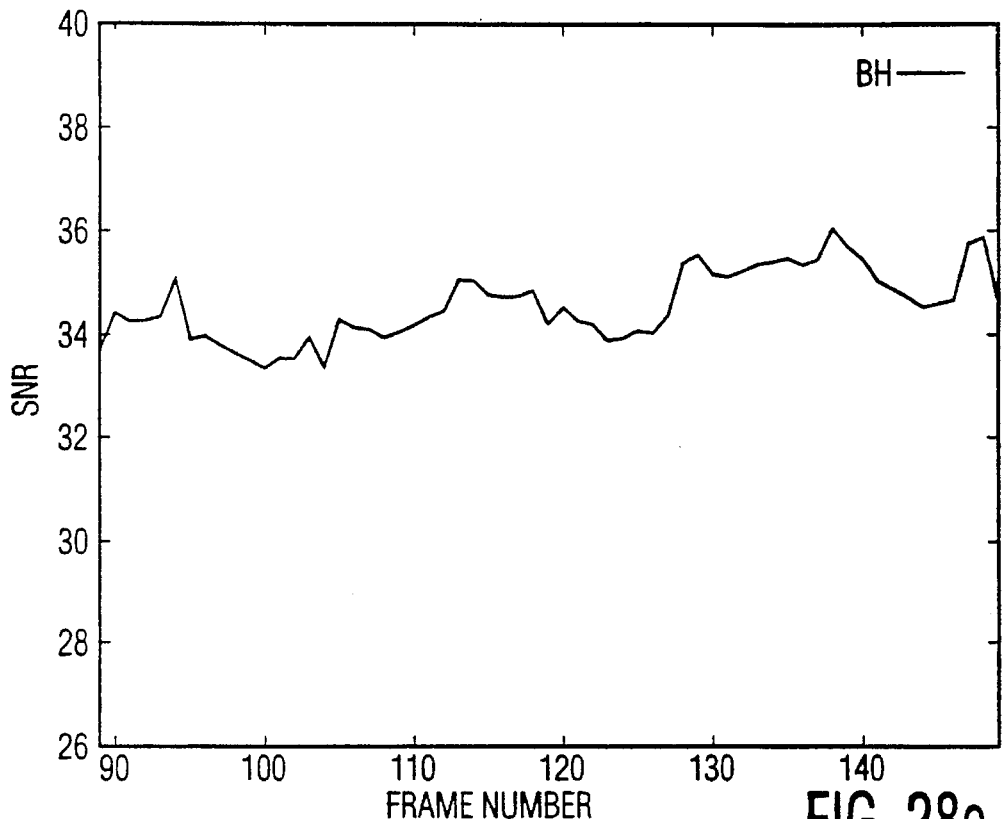
Figure 28D:
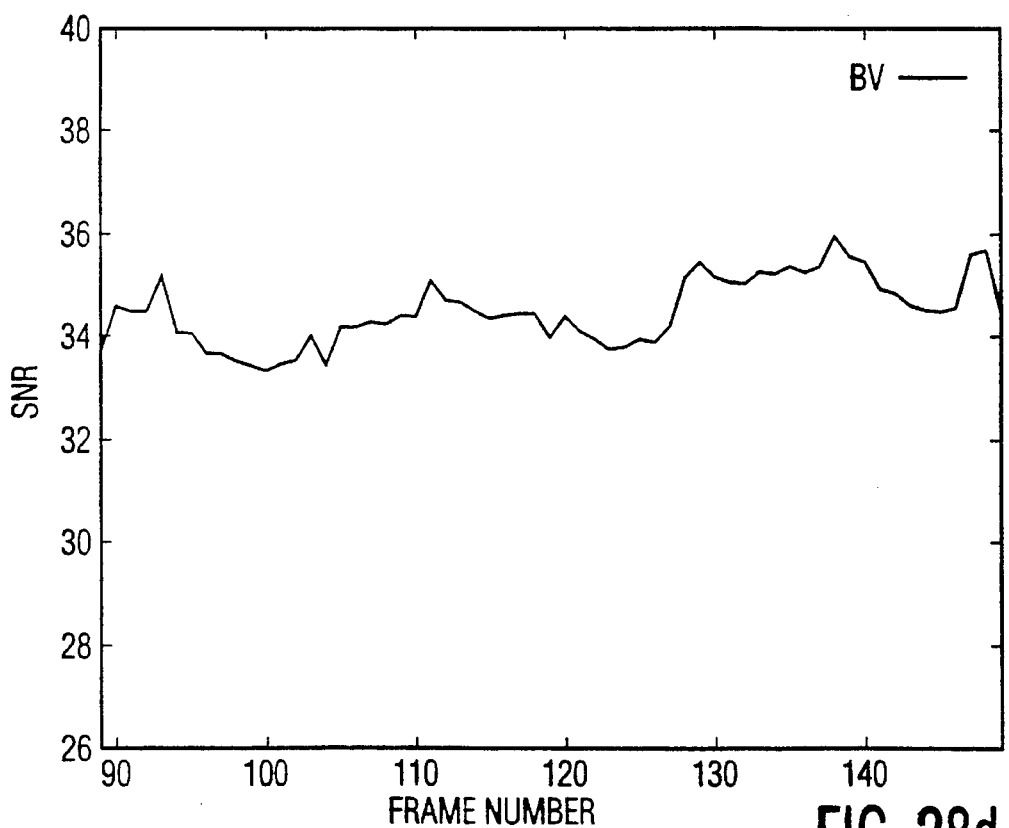
Figure 28E:
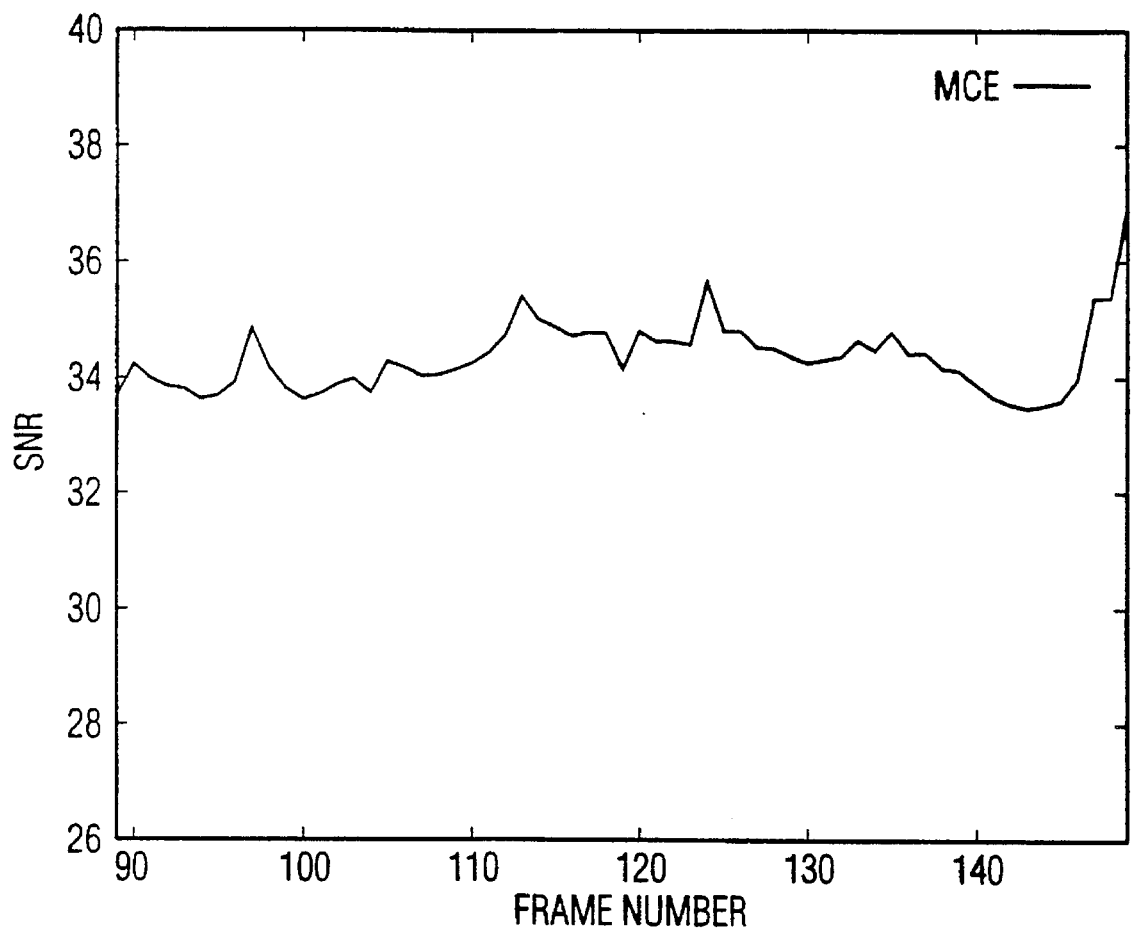

VBR-TAMI algorithm:

FIG. 23(a) and FIG. 23(b) show SNR and its bit rate comparison, respectively, between VBR-TAMI and 0-P FBR-TAMI, where they have the same average bit rate of 663Kbit/sec, in this example. Hence there is less temporal variation in the picture quality. As expected, the SNR for VBR-TAMI is more stable than FBR-TAMI. At the cost of variable bit rate output, the present VBR coding scheme can handle scenes with rapid motion without significant loss of quality.

Optimal spacing algorithm:

FIGS. 24(a)–24(e) show relative distances between a current frame and the first frame (frame 120) using the five different measurement methods, e.g. DOH, HOD, BH, BV, and MCE methods of measurement, respectively. In the plots, it can be seen that the DOH and MCE criteria are more sensitive to global motion rather than to local motion, while the other three criteria are sensitive both to global and to local motion as discussed above. More specifically, FIGS. 25(a)–25(e) show curves for SNR vs. frame number for an OSA using DOH, HOD, BH, BV, and MCE methods of distance measurement, respectively. HOD performs the best because its sensitivity to local motion is more important when there is no global motion between frames 120 and 180, only some local motion.

The table of FIG. 26 shows that the MCE criterion produces the best overall performance for various motion activities. In the table, frames 89–149 represents a scene with motion, frames 120–180 a scene with an abrupt scene change at frame 148, and frames 0–60 a scene with very high global motion (zooming out from frame 30 to 60). The good performance of MCE may be because MCE is the nearly ideal distance measure and is expected to be more robust to various motion activities.

FIGS. 28(a)–28(e) shows SNR results using the adaptive optimal spacing algorithm with B2 frames for the five different distance measures DOH, HOD, BH, BV, and MCE, respectively. BH performs the best because it is also a good measure of local motion and there is no global motion between frames 120 and 180. However, the table in FIG. 27 shows that the BH criterion produces the best overall performance for various motion activities. Comparisons between the tables of FIGS. 26 and 27, shows that the performances with different distance measures are similar with one another. Comparisons between the tables of FIGS. 20 and 27, shows that the performances of FBR-TAMI and OSA are also similar, with slight differences depending on what kind of distance measure is used.

As illustrated and described above, the present invention provides that positions of video reference frames are made adaptive to input video motion activities, and bit rate control is used to exploit masking effects in visual perception. Three major different algorithms, FBR-TAMI, VBR, and OSA, are presented, and shown to compare favorably over conventional motion interpolation coding with fixed GOP structures. Although FBR-TAMI and OSA are similar in their performances, TAMI has lower algorithmic complexity. The trade-off in this approach is that a scheme with a lower number of predicted frames has a better compression ratio at the cost of larger encoding delay. Embodiments of the present invention are expected to be useful in several different areas such as the variable bit rate coding, low bit rate coding, coding for storage on CD-ROM, and temporally adaptive 3-D sub-band coding, for example. The FBR-TAMI algorithm is suitable particularly for low bit rate coding such video conferencing or video phone where the rarity of rapid motion is very advantageous, and it is also suitable for storage application like CD-ROM where relatively large delay in encoding can be tolerated.

In FIG. 29, a composite of three curves shows a comparison between the TAMI and OSA embodiments of the invention relative to image movement. The uppermost curve 120 shows a plot of image movement versus frame number for a GOP of 15 frames. In this example, the image movement curve 122 shows a region 124 of "busy temporal activity" between frames 1 and 7, and a region 126 of "low temporal activity" 126 between frames 8 and 15. As shown, in region 124 P frames occur more frequently or are closer to one another in this region because there is more data change, that is there is greater image movement from one frame to another. Contrariwise, in region 126 where image movement is substantially less, the P frames occur less frequently, or are further apart from one another, because there is less data change or image movement from one frame to another. In the curve section 128, TAMI processing for coding frames is shown as a plot of frame distance, that is the global picture movement between frames relative to frame number. The frame distance or movement at which a Type 0 threshold is detected is shown by the broken line 130. As shown, each time the frame distance or image movement between frames exceeds the Type 0 threshold 130, the immediately previous frame from the occurrence of the Type 0 threshold is designated as a P2 frame. As previously explained, in this example, a GOP consists of 15 frames, designated by frame numbers "0" through "14", with the "15th" designated frame actually being the first frame of the next GOP. The first frame is always designated as an "I" frame. The next frames located between any two reference frames, such as P frames and I frames are designated "B" frames, as shown. Note that when using the TAMI processing as shown in curve section 128, the P frames are further apart in the region of low temporal activity 126, relative to the region of busy temporal activity 124. By using OSA processing, as shown in the curve section 132, certain of the P frames designations are changed to shift right or left for making the P frames as equidistant from one another as possible. Accordingly, as shown, TAMI designated frame 10 as a P frame, whereas through OSA processing, in this example, the P frame is shifted to the left from frame 10 to frame 9. Similarly, in TAMI curve 128, frame 13 is designated as a P frame, whereas through OSA processing, the P frame is shifted from frame 13 to frame 12, as shown in curve section 132. Also as a result of this shifting, frame 9, designated as a B frame in TAMI, is designated as a P frame in OSA, frame 10 designated as a P frame in TAMI is designated as a B frame in OSA, and frame 13 designated as a P frame in TAMI is designated as a B frame in OSA. As a result, the P frames in region 126 are more equidistantly spaced from one another, making more efficient use of bit allocations via OSA, relative to TAMI.

Adaptive selection of the number (N) of reference frames:

A bit rate control algorithm, mainly for TAMI, to allow variable N for another embodiment of the invention will now be described. Note that as indicated above, N is the number of P1 frames. One simple approach to adapt N is to use a constant threshold for detection of a Type 0 scene change, and use one P frame for each detected. To adapt N subject to a fixed bit rate constraint, a variable bit allocation as described above is used. The target bit allocations for different picture types are updated according.

To describe the algorithm, let the channel bit rate (bits/sec) be denoted by R, GOP size by M, expected GOP bit rate by G, and target bit allocation for picture Type t by $D_t$. The bit allocations for I1, I2, P1, P2, and B1 frames: $D_{I1}=C_{I1}x$, $D_{I2}=C_{I2}x$, $D_{P1}=C_{P1}x$, $D_{P2}=C_{P2}x$, $D_{B1}=C_{B1}x$, respectively, where x is a common factor and $C_{I1}$, $C_{I2}$, $C_{P1}$, $C_{P2}$, and $C_{B1}$ are constants for I1, I2, P1, P2, and B1 frames, with $C_{I2}=C_{P2}=C_{B1}$. Unlike the constant bit allocation scheme described above, x now is allowed to vary from GOP to GOP, thereby providing the present variable bit allocation scheme. Note that B2 frames that were used for a limited variation of N by 1 are not required. The common factor x is determined by the relationship, R=2G where $G=(C_{I1}+NC_{P1}+(M-N-1)C_{B1})x$. The following formula for target bit allocation results:

$$D_t = C_t \frac{R}{2(C_{I1} + NC_{P1} + (M-N-1)C_{B1})} \quad (30)$$

This bit allocation is updated by use of equation (30) at the beginning of each GOP.

A fast heuristic approach for positioning (BS E-TAMI):

Another embodiment of the invention designated BSE-TAMI (Binary Search Equidistant TAMI will now be described. Assume N SSPs (scene segmentation points or Type 0 scene changes) are detected by the scene change detection algorithm 14 (see FIG. 4) using a constant threshold. Assume that the distance measure is an integer and, as a basis for developing a heuristic, is a monotonically increasing function with respect to the time separation between two frames. HOD (histogram of difference) is used in such a simulation to measure motion by distance measurements, because it generally tends to be monotonic.

Figure 30:
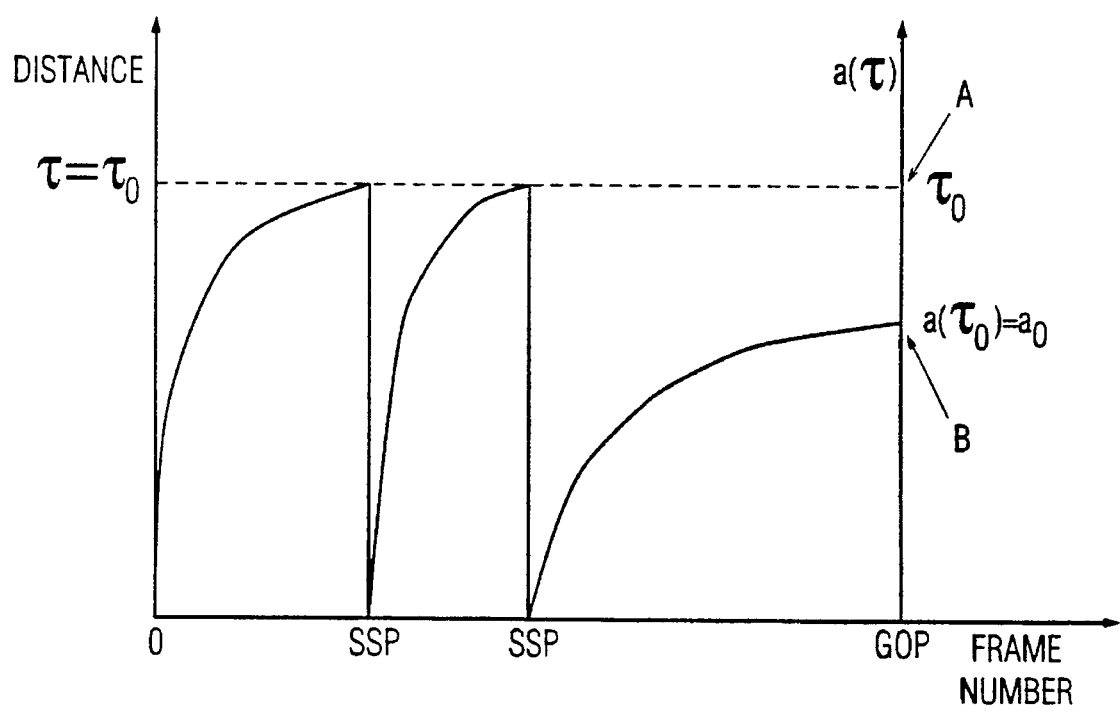
FIG. 30 shows distances between one frame and others relative to temporal segments using a Type 0 threshold set at τ.

The problem is to find nearly equidistant positions of SSPs or Type 0 scene changes. The present fast heuristic search is for positions that are close to the best positions. FIG. 30 is an example where two SSPs or Type 0 scene changes are detected by an SSP detector 14 using an initial threshold, $\tau_0$, which produces N SSPs. Denote the distance between the last SSP and the end frame of a GOP by a ($\tau$). Also denote $a_0=a(\tau_0)$. The problem is to start with $\tau_0>a(\tau_0)=a_0$ and to find the smallest $\tau$ in $[a_0, \tau_0]$ satisfying $\tau \geq a(\tau)$. Since the distance measure is assumed to be monotonic, $a(\tau)$ either increases or stays constant as $\tau$ decreases from $\tau_0$. More specifically as $\tau$ decreases from $\tau_0$, eventually $\tau \leq a(\tau)$ will be attained. In other words, point A crosses or reaches point B at some point as the threshold is decreased (see FIG. 30).

Since $\tau$ is an integer and has a finite range of $[a_0, \tau_0]$, a binary search is used for the solution $\tau_*$. In other words, $a(\tau_{new})$, is computed using the middle point $$\tau_{new} = \frac{\tau + a(\tau)}{2} \quad (31)$$

and comparing $\tau_{new}$ with $a(\tau_{new})$. If $\tau_{new}>a(\tau_{new})$, a search is conducted on the lower half of $[a_0, \tau_0]$; If $\tau_{new}<a(\tau_{new})$, the upper half is searched. One continues by computing $a(\tau)$ for the new middle points of the new search region until a stopping criterion is satisfied.

The terms to be used in a BS E-TAMI algorithm are defined as follows:

b: the bottom end of the search region.

t: the top end of the search region.

m: the middle point of the search region.

SSPDET (N,$\tau$): SSP detector using a threshold $\tau$ where the maximum allowable number of SSPs is N.

N($\tau$): the number of SSPs detected by SSPDET (N,$\tau$). Note that N($\tau$)<N.

pos($\tau$): positions of SSPs detected by SSPDET (N,$\tau$).

d$\tau$: previous threshold m satisfying m>a(m).

dpos: previous positions corresponding to d$\tau$.

The algorithm to find N positions is described generally as follows below:

1. Pick an initial threshold $\tau_0$ that produces N SSPs.
   Run SSPDET (N, $\tau_0$) and compute $a_0 = a(\tau_0)$.
   Set d$\tau$ ← t0 and dpos ← pos ($\tau_0$).

2. If $\tau_0 \leq a_0$, then go to step 6, otherwise
   {b ← $a_0$; t ← $\tau_0$}

3. m ← (b + t)/2.
   Run SSPDET (N,m) and compute a(m).

4. If m > a(m), then {
      t ← m − 1;
      If N (m) = N, then{d$\tau$ ← m; dpos ← pos(m)}
   } otherwise
            {b ← m − 1}

5. Repeat step 4 until m = a(m) or b > t

6. $\tau^*$ ← d$\tau$ and stop.
   dpos is the desired positions of SSPs corresponding to $\tau^*$.

Figure 31:
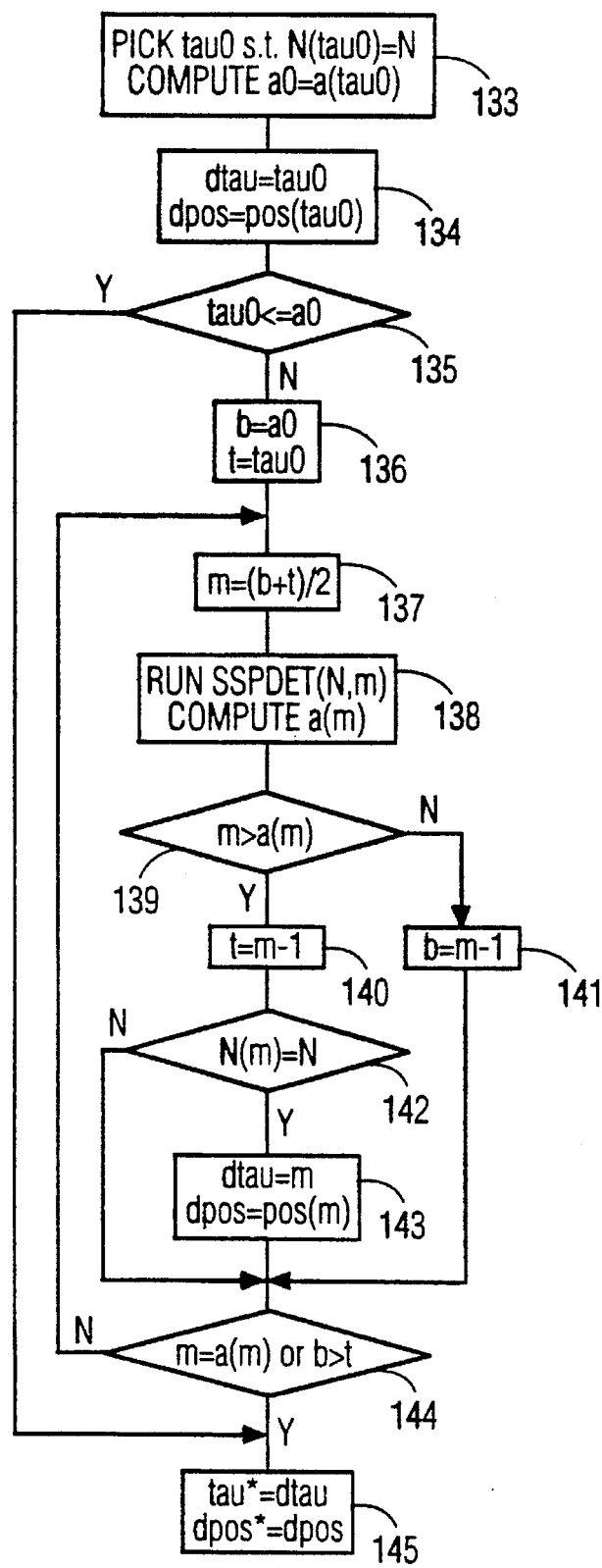
FIG. 31 shows an algorithm for another embodiment of the invention designated BS E-TAMI (Binary search equidistant TAMI).

In step 6, d$\tau$ becomes the desired solution because it is just before the position where $\tau$ becomes larger than $a(\tau)$, which means $\tau$ is closest to $a(\tau)$. A more detailed description of the algorithm for BS E-TAMI is shown in FIG. 31, for steps 133 through 145.

If a brute force search for $\tau_*$ were used, the required computation is on the order of $10^4$ assuming $\tau_0 \approx 10^4$ and $a_0 \approx 0$. The required computation using a binary search is $[(\log_2 L) +1]$ when the data size is L, which becomes about 15 when $L=10^4$. About a thousand-fold computational saving is obtained using the binary search. When monotonicity fails due to periodic motion for example, the heuristic is to use the initial SSP positions, pos($\tau_0$).

This approach of employing a binary search can easily be combined with the adaptive N scheme previously discussed. The advantage of this binary search approach is that it is fast and very simple compared to E-TAMI (equidistant TAMI). The disadvantage is that it fails when the monotonicity assumption is not satisfied. However, the assumption is valid for most GOPs in ordinary video material.

Hardware System/Software Implementation:

The present inventors conceived a software implementation of the TAMI and OSA embodiments of the invention, as shown in FIGS. 32 through 38, which will now be described. Note that the hardware implementation for the TAMI embodiment of the invention is shown in FIG. 3, as previously described.

Figure 32:
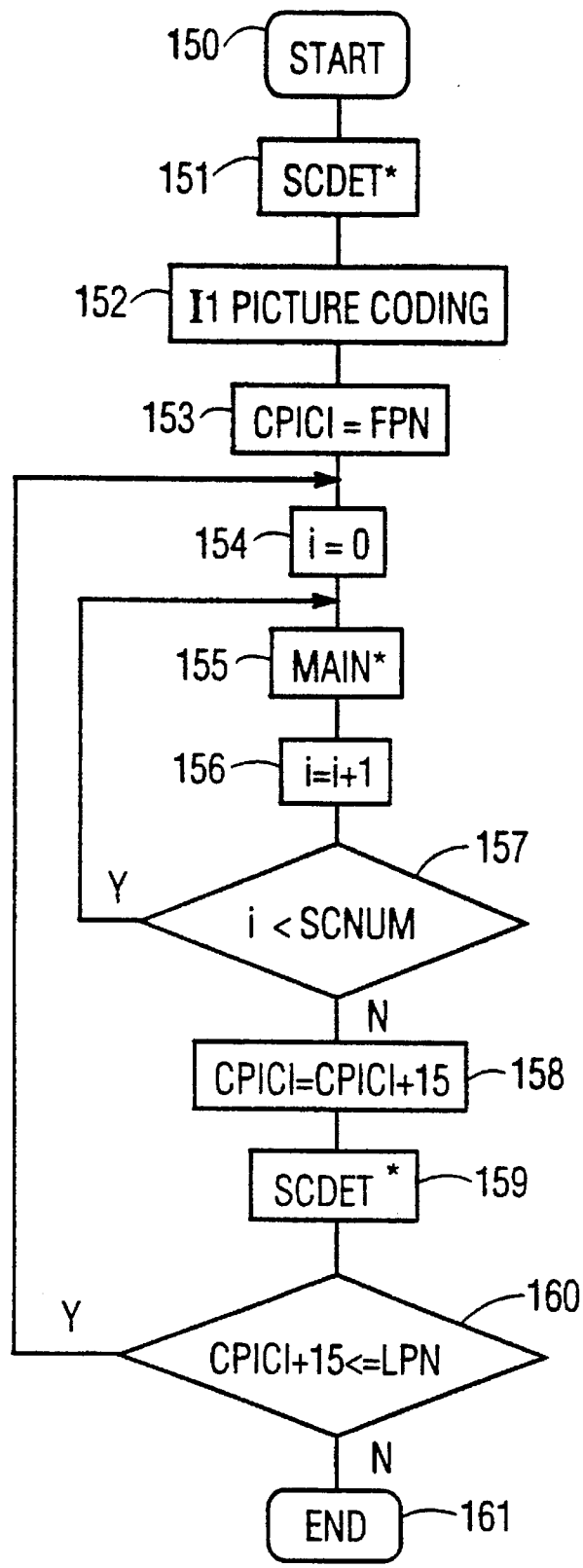
FIG. 32 shows a flowchart relative to both TAMI and OSA embodiments of the invention.

In FIG. 32, a flowchart for a software implementation embodiment for both the TAMI and OSA embodiments, as shown, includes steps 150 through 161. Note that this software implementation is applicable for all TAMI embodiments, including general TAMI, VBR TAMI, and FBR TAMI. More specifically, after starting the software routine in step 150, scene change detector step 151 is entered for detecting accumulated slow changes or complete slow changes, whereby different versions for software routines may be required for the various embodiments of the invention. The next step 152 or software routine "I1 picture coding" provides for initialization of the group of pictures or GOP being processed. The first frame is coded as an I frame in correspondence to the MPEG standard. However, in the present invention, the first frame is more specifically coded as an I1 picture providing full resolution coding, whereas as previously described, I2 coding may be used for other frames within the GOP being processed in association with the detection of Type 1 scene changes, whereby the I2 coding is coarser than the I1 coding. The next step 153 determines when the current picture index or actual picture number (CPICI) corresponds to the first frame of a GOP. In this step the variable is set to be the first picture number (FPN). The next step 154 provides for an index "i" for a scene segment, which index is initially set to zero for the first scene segment, and successively increased by one as additional scene segments or frames are processed.

The next step 155 processes the data through a encoding algorithm (MAIN), which includes some of the MPEG standard with the addition of new steps conceived by the inventor, as will be described below.

In the next step 156, the index for a scene segment "i" is incremented by one for advancing the processing to the next scene segment.

The next step 157 is a decision step for determining whether the index "i" is less than the number of scene segments (SCNUM) or loops as determined by the scene change detector in step 151. Note that a high number of segments is assigned if there are a high number of scene changes. In other words, the number of segments is directly proportional to the number of scene changes detected, thereby making the system an adaptive system.

After the final scene segment has been processed through the loop including steps 155 through 157, decision step 157, after determining that the final scene segment has been processed, exits from the processing loop into step 158, in which the actual picture number corresponding to the first frame of the GOP just processed is incremented by 15. Note that in this example, as previously explained, the GOP size chosen is 15 in the preferred embodiments of the invention, but per the MPEG standard can be other than 15.

The next step 159, SCDET, detects the scene changes for the next 15 frames, i.e. the frames of the next GOP to be processed.

The next step 160 determines whether the current picture index or number CPICI, incremented by 15, is less than the last picture number LPN. If the answer is yes, the data for the current frame being processed is fed to step 154, for continuing processing in the loop represented by steps 154 through 160. Once the last picture number LPN is processed, decision step 160 exits from the loop, ending the encoding process in step 161.

Figure 33:
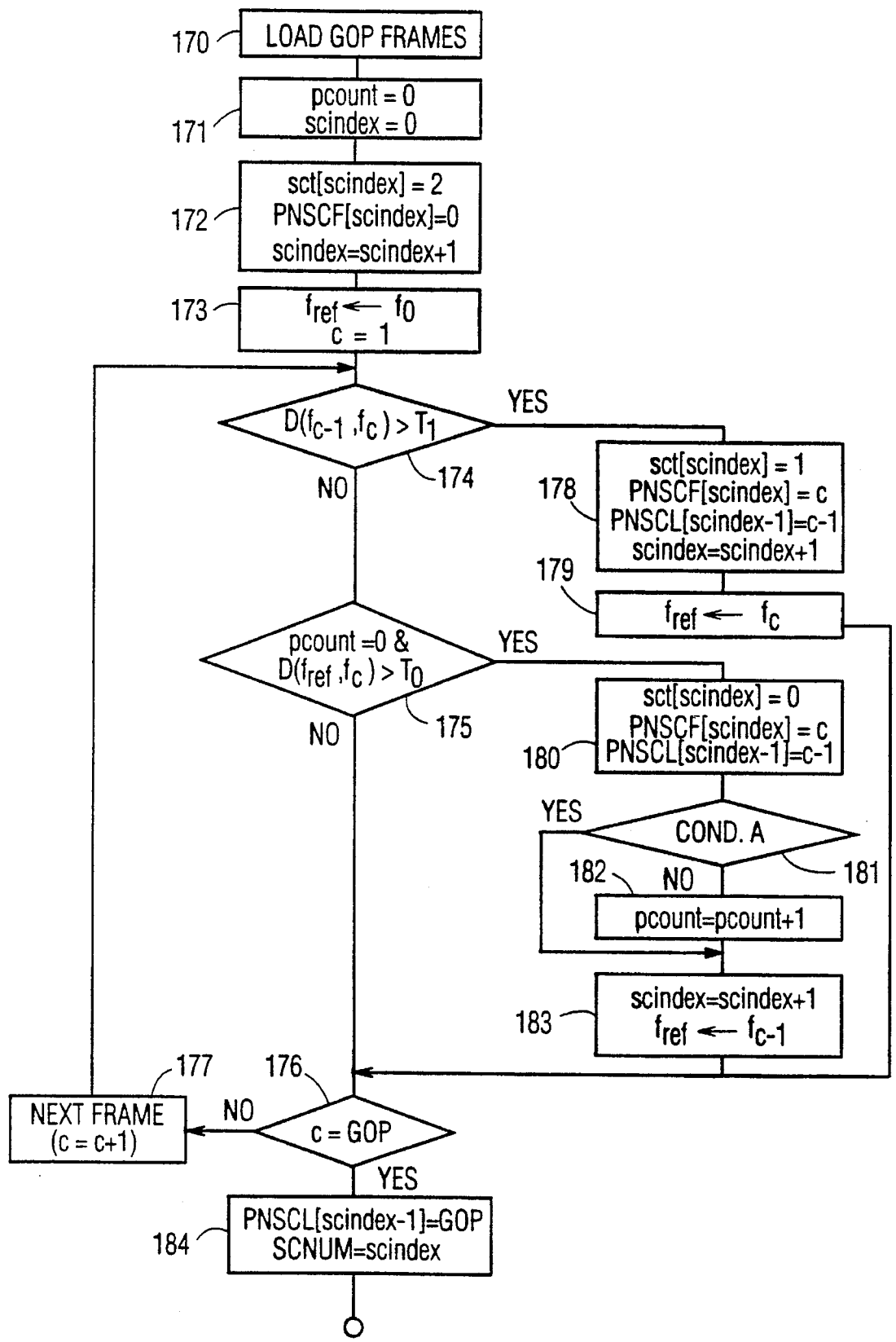
FIG. 33 shows a flowchart for the steps involved in a scene change detection step generally called for in the flowchart of FIG. 32.

In FIG. 33, the scene change detection processing, SCDET, for a FBRTAMI or fixed bit rate TAMI, is shown. This flowchart is similar to the flowchart of FIG. 4, but provides greater details of the processing. Note that the SCDET for VBRTAMI is shown and described above in association with FIG. 10. Similarly, the SCDET embodiment for the OSA embodiment of the invention is shown and described above in association with FIG. 11.

In FIG. 33, the SCDET for the FBRTAMI or fixed bit rate TAMI begins with the loading of the GOP frames into memory in step 170. IN step 171 counters in the system are initialized. In the example given for step 172, the scene index for a scene change is shown as being set to 2, the picture number of the first frame of a scene segment for a current frame is shown as set to 0, and the index for a scene segment is incremented by 1 before proceeding to the next step. In step 173, scene segment data $f_0$ is copied into a frame reference memory $f_{ref}$, and a current picture frame counter is set to 1. Next, in decision step 174, a determination is made as to whether the distance or movement between a current frame $f_c$ and an immediately previous reference frame $f_{c-1}$ is greater than a threshold $T_1$ for a Type 1 scene change. If the answer is affirmative, step 178 is entered. If the answer is negative, step 175 is entered, for determining whether the motion between the current frame and a previous reference frame exceeds a Type 0 threshold $T_0$. If affirmative, step 180 is entered, otherwise step 176 is entered.

If step 178 is entered from step 174, the scene change Type is set to 1, the picture number c of the first frame of a scene segment is identified, and the last frame of a previous scene segment is identified by (c−1); and the index for the scene segment is incremented by 1, as shown. Next, in step 179, the current frame data $f_c$ is copied to the reference frame data $f_{ref}$. From step 179, step 176 is entered for determining whether the end of the present GOP being processed has been reached, that is whether the 15th frame has been processed. If the answer is no, step 177 is entered for incrementing the current frame by 1 to proceed to the next frame, then the processing loops back into step 174. However, if the answer is yes, meaning that the frames within the GOP have been processed, step 184 is entered for processing the next GOP. Note that in FIG. 33, in the legend shown, that "D(,)" designates a distance measure for the amount of motion between frames. Also, the notation "Cond. A:sct[scindex-1]=1 & (pNSCL[scindex-1]-pNSCF[scindex-1])=0", means that a scene change type of a previous segment is 1, and its scene duration is 0.

Figure 34A:
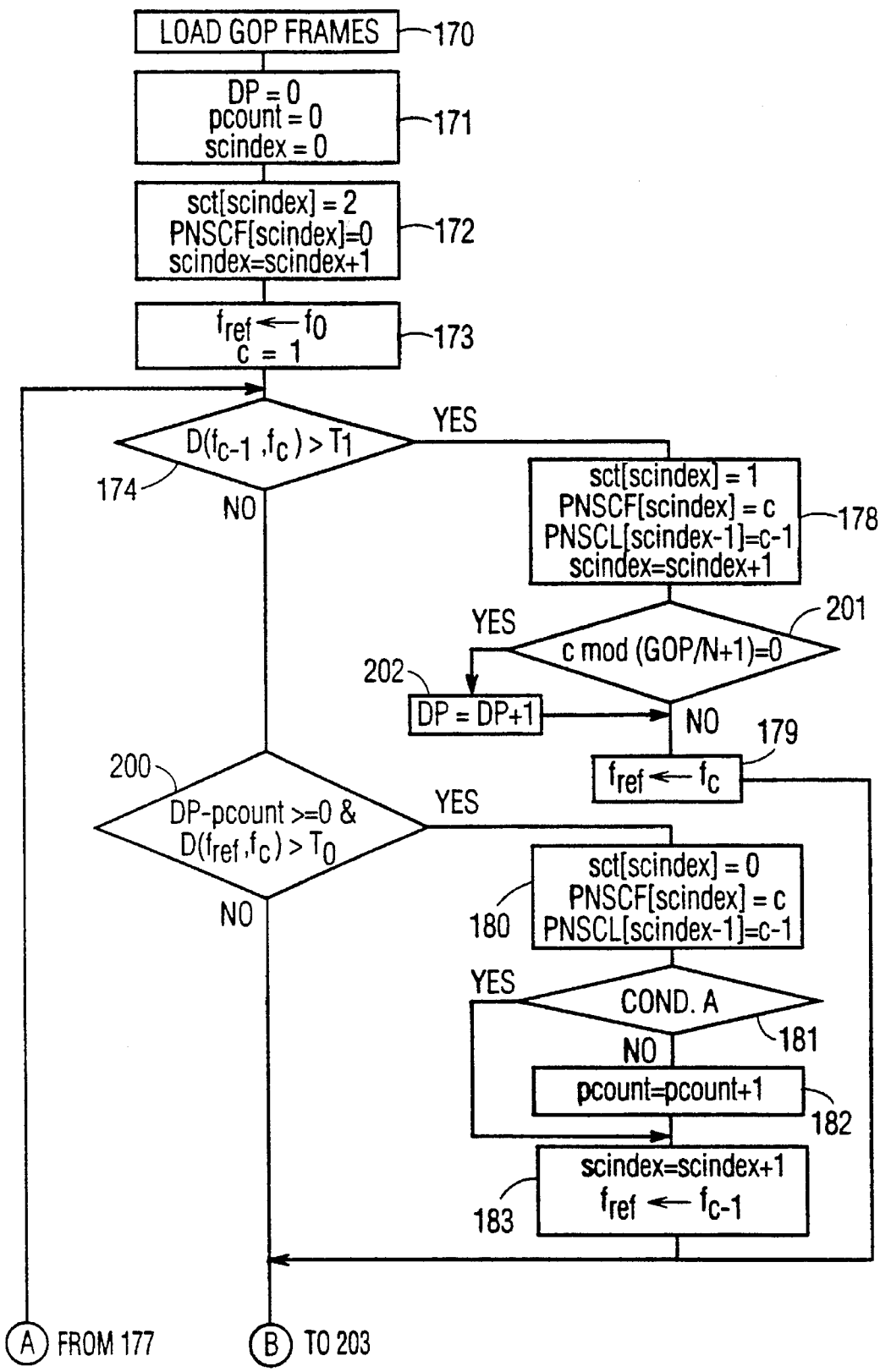
FIGS. 34A and 34B show another flowchart for a scene change detection method for another embodiment of the invention designated N-P TAMI, relative to a scene detection step of a flowchart of FIG. 32.
Figure 34B:
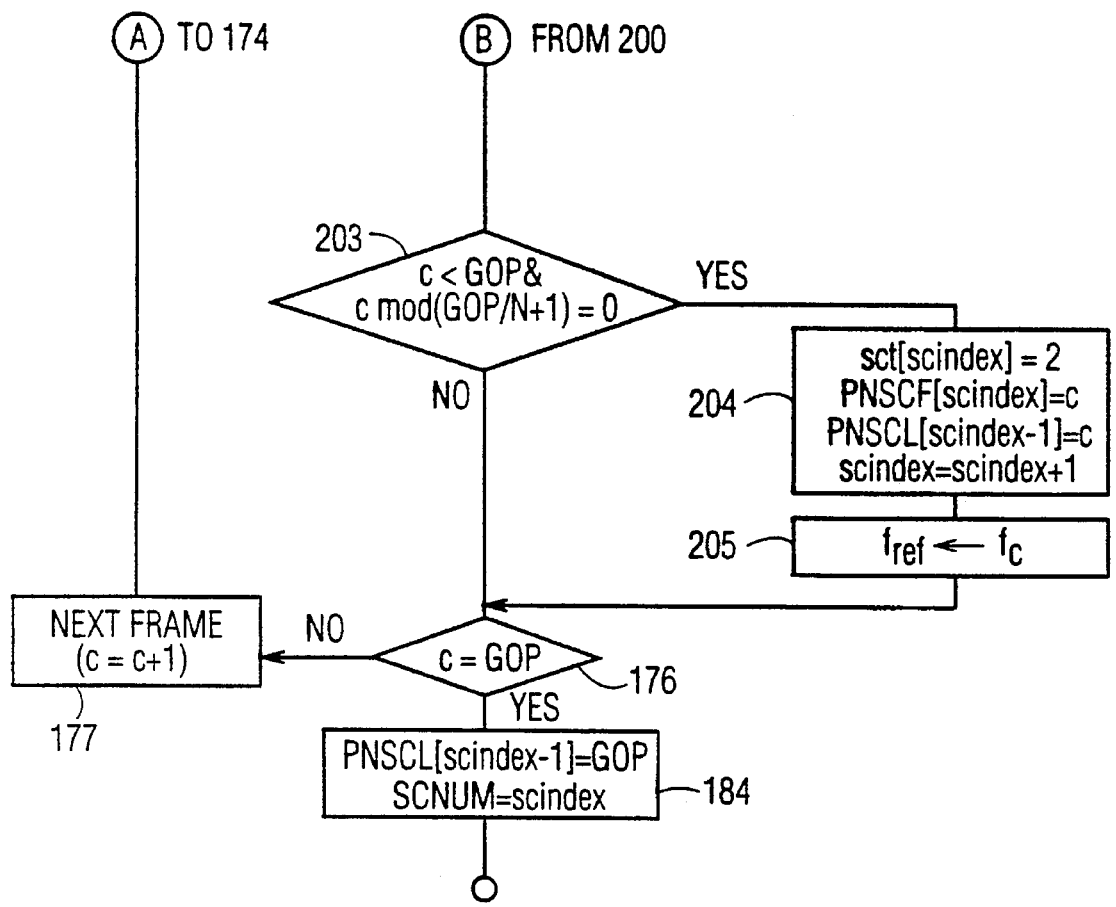

FIGS. 34 and 34B show an "N-P TAMI SCDET" scene change detector for use in the TAMI encoder routine of FIG. 32. Note that a substantial number of the steps in the flowchart of FIGS. 34A and 34B for N-P TAMI SCDET are the same as the steps shown in a portion of the flowchart of FIG. 33, wherein the reference designations for these steps are identical. For example, the initialization steps 170 through 173 are the same for the flowcharts of FIGS. 33, 34A, and 34B. Steps 200 through 205 of the N-P TAMI flowchart of FIGS. 34A and 34B are different than the SCDET FBRTAMI flowchart of FIG. 33. In the flowchart of FIGS. 34A and 34B, steps 174, 178, 201, and 202, detect a scene change of Type 1 whereas steps 180 through 183, and 200, detect a scene change of Type 0. Also, further note that these steps indicated for providing the Type 1 and Type 0 scene changes, together with step 179, provide an Exclusive OR function. Also note that steps 203 through 205 provide for the insertion or generation of default positions for P1 designated frames. For convenience, in this example, such default positions are designated as a scene change Type 2.

Figure 35:
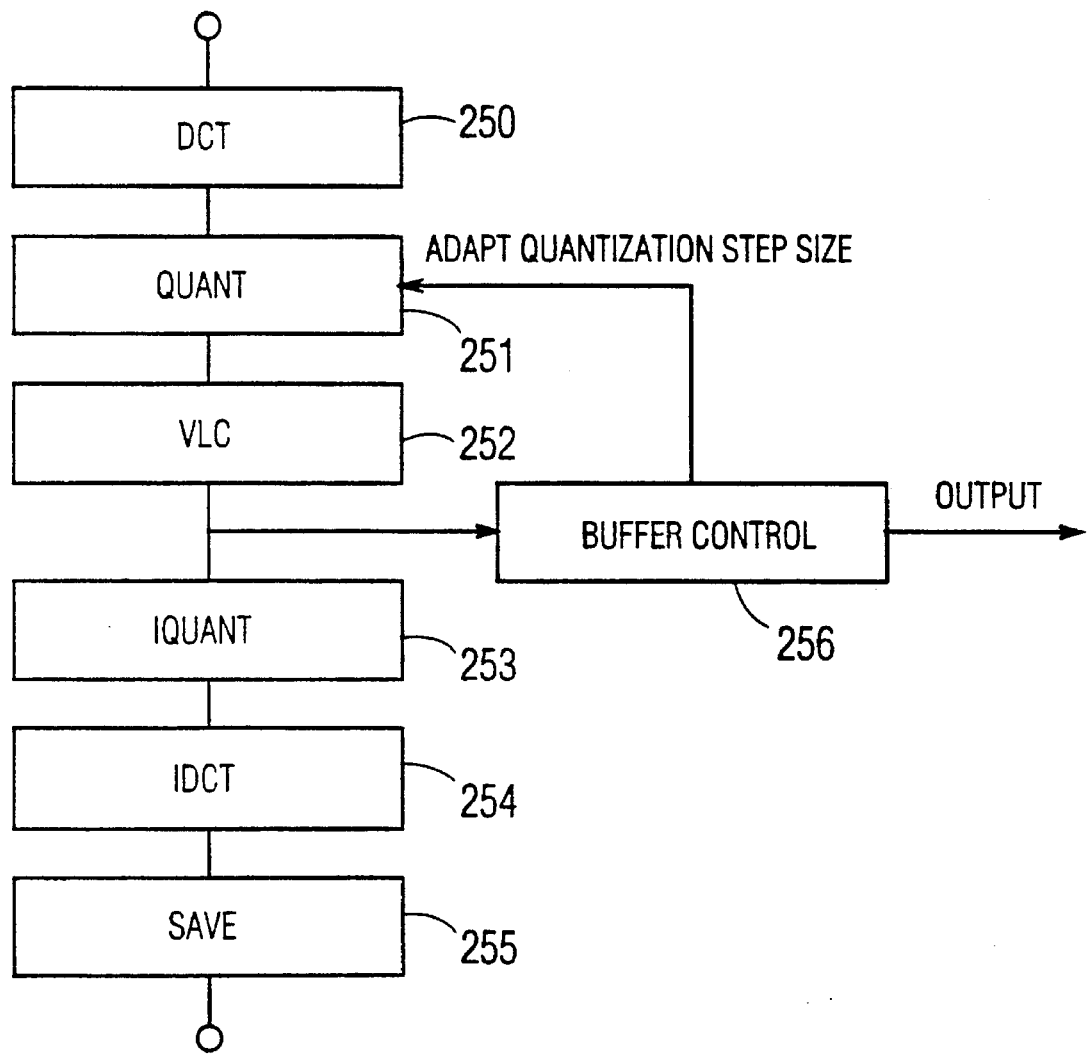
FIG. 35 shows a detailed flowchart of coding steps relative to one or more generalized coding steps shown in the flowcharts of FIGS. 32, 36A, and 36B.

The picture coding step 152 of the TAMI encoder flowchart shown in FIG. 32 is illustrated in greater detail in the flowchart of FIG. 35. Steps 250 through 256 provide for I1, I2, P1, P2, B1, and B2 coding, as illustrated. Step 250 provides for a discrete cosine transform of the data. Step 251 provides the main data compression, and is a quantizer having step sizes that can be adapted to provide different quantization levels. Step 252 provides variable length coding VLC, such as Huffman coding, for example. The buffer control provided in step 256 is included as part of the MPEG standard bit rate control for making the output bit rate constant, whereby if excess bits are being used the quantizer is controlled for coarser quantization in order to reduce the bit use. Steps 253 and 254 provide inverse quantization, and inverse discrete cosine transform processing, respectively. Step 255 provides for saving or storing in memory the decoded results from the inverse discrete cosine transform 254, which results are used for later motion compensation. Note that as shown in the legend, the present inventors elected to provide the quantizer in step 251 with 6 different default QS levels, whereby the greater the value of QS, the less resolution or coarser the quantization provided in step 251. As shown in this example, frames designated as I1 and P1 each have a designated quantization level of QS. Frames designated as bidirectional frames B1 or B2, each have quantization levels of 2QS. Frames designated as I2 have quantization levels of 10QS, and frames designated as P2 have quantization levels of 3QS.

Figure 36A:
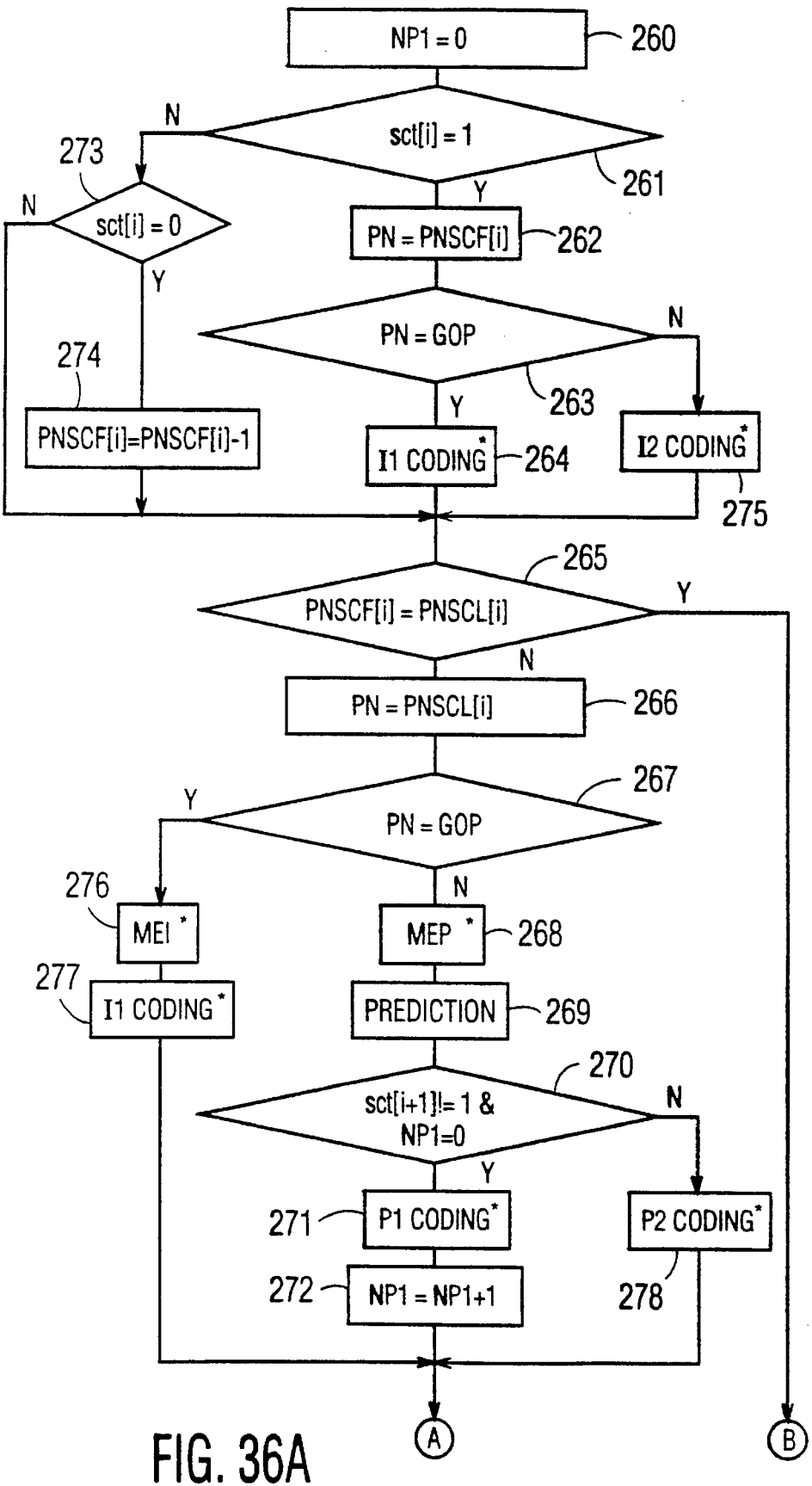
FIGS. 36A and 36B each show portions of the processing steps associated with the "MAIN" step of the flowchart of FIG. 32, in another embodiment of the invention.
Figure 36B:
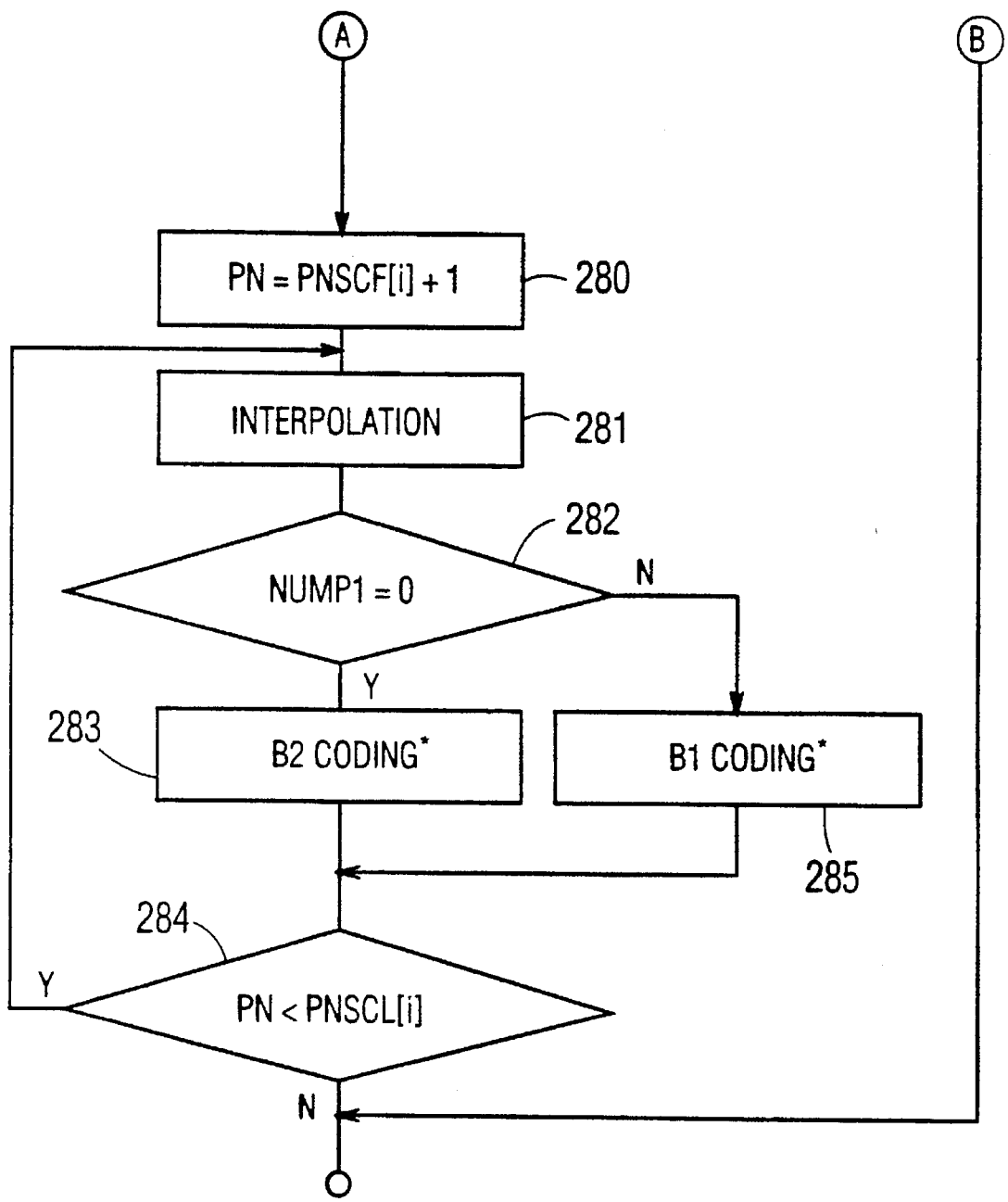

The MAIN encoding algorithm shown as step 155 in FIG. 32 for the TAMI encoder is shown in detail in the flowchart of FIGS. 36A and 36B for steps 260 through 278, and 280 through 285, respectively. More specifically, in step 260 a count of past P1 frames is kept, as designated by NP1, which initially has a "0" count as shown in the illustration. In step 261, a determination is made as to whether a scene change of Type 1 is attained. If the answer is yes, step 262 is entered for equating the current picture number PN to the picture number of the "ith" frame of a scene segment. Next, a decisional step 263, is entered for determining whether the picture number represents the last frame of the GOP. If so, step 264 is entered for coding the frame as an I1 frame, if not, step 275 is entered for coding the frame as a I2 frame.

If in step 261, a scene change of Type 1 is not detected for the current frame being processed, step 273 is then entered for determining whether the motion between frames for the frame being processed is a Type 0 change, that is whether the Type 0 scene change has been attained. If not, step 265 is entered. If so, step 274 is entered for decrementing the first picture number of the current scene segment by 1, as shown. Note that the further processing steps for the I1 coding step of step 264, and I2 coding step 275, is shown in the flowchart of FIG. 35, infra.

In step 265, it is determined whether the duration of the current scene segment being is zero or not. If so, step 156 of the flowchart shown in FIG. 32 is entered. If not, step 266 is entered to set the picture number to the last frame number of the segment being processed. Next, decisional step 267 is performed for determining whether the frame position is the last frame of the GOP. If yes, step 276 is entered for performing telescopic motion estimation for all B frames between the first and last scene segments of the associated picture number, whereafter step 277 is entered for I1 coding via steps 250 through 256 in the flowchart of FIG. 35. However, if in step 267 it is determined that the frame position is not the last frame position, step 268 is entered for performing motion estimation for a P frame and preceding B frames via steps 290 through 297 of the flowchart of FIG. 37. After step 297 of the flowchart of FIG. 37, step 269 is entered for prediction processing in accordance with the MPEG standard. Next, step 270, a decision step, is entered for determining whether the next scene has a Type 1 scene change, and whether any P1 frames were previously detected. If the answer is no, P2 coding is conducted in step 278 via steps 250 through 256 of FIG. 35. If the answer is yes, P1 coding is conducted via steps 250 through 256 of FIG. 35. Next, step 272 is entered for incrementing by 1 the count for the number of past P1 frames.

Step 280 (FIG. 36B) is then entered for setting the current picture number to the picture number of the first frame in the last scene segment incremented by 1. Next, interpolation step 281 is entered for conducting interpolation in accordance with the MPEG standard. Thereafter, step 282 is entered for determining whether the number of P1 frames is equal to 0. If the answer is yes, the B2 coding step 283 is entered. If the answer is no, the B1 coding step 285 is entered. Note that the substeps 250 through 256 for steps for 283 and 285 is shown in the flowchart of FIG. 35, as previously described. Next, decisional step 284 is performed for determining whether the current picture number PN is less than the picture number of the last frame of a scene segment "i". If the answer is yes, the processing loops back to step 281, whereas if the answer is no, the process proceeds to step 156 (see FIG. 32) for incrementing by 1 the index "i" for a scene segment.

Figure 37:
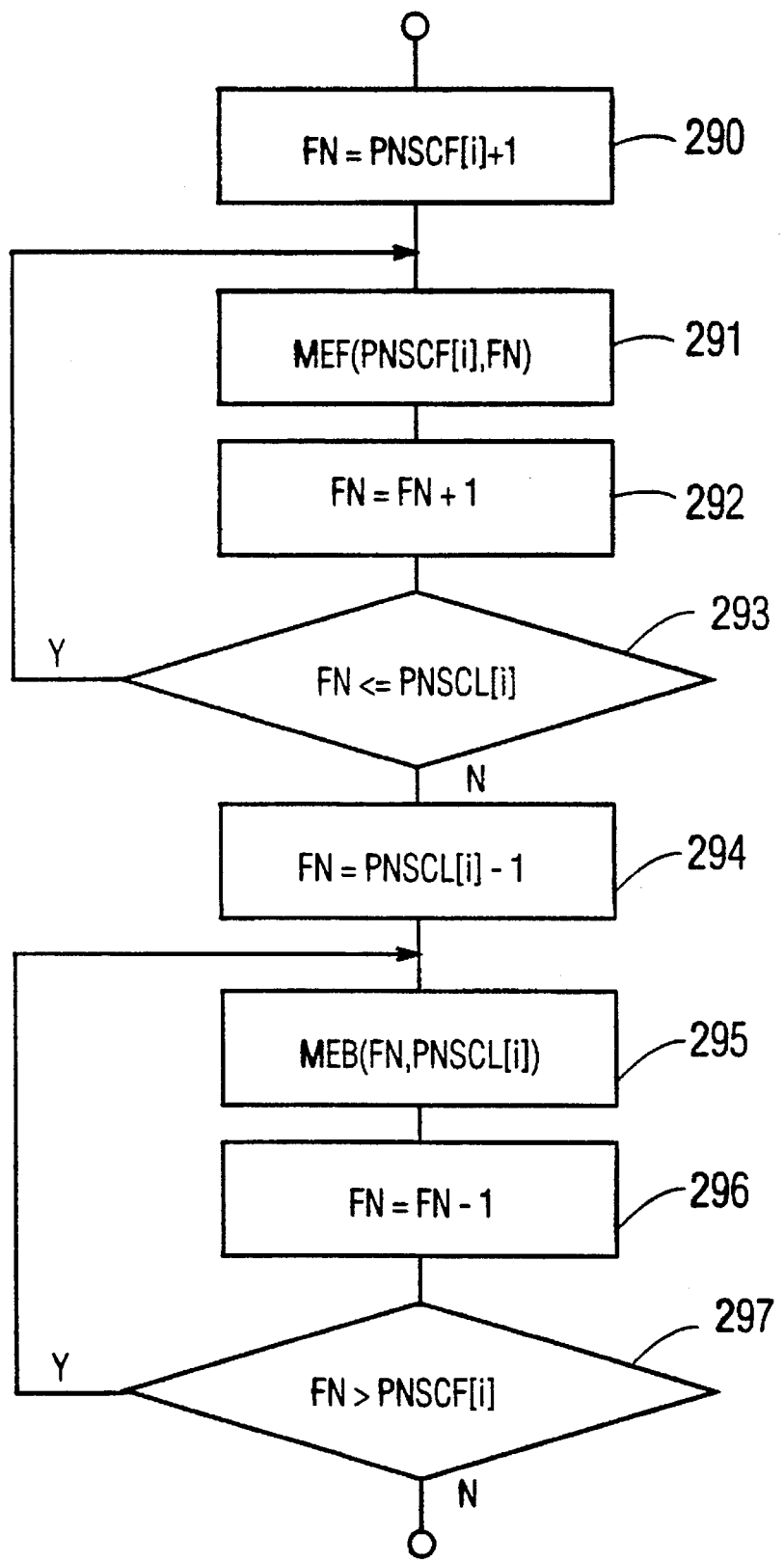
FIG. 37 is a flowchart showing details for the MEP step of the flowchart of FIG. 36A.

For the MAIN step 155 (see FIG. 32) or MAIN encoding algorithm, as described for the flowchart of FIGS. 36A and 36B, the motion estimation step 268 for determining the motion associated with P frames, is shown in detail in the flowchart of FIG. 37. As shown, the first step 290 is for sending the current frame number to the picture number of the "i" scene segment incremented by 1. Next, in step 291, the forward motion vector search between the current frame and the picture number scene segment of the last reference frame is computed. Next, the current frame number is incremented by 1 in step 292. Thereafter, step 293 is entered for determining whether the current frame is less than the picture number of the last frame of a scene segment. If the answer is yes, step 291 is entered through a loop, whereas if the answer is no, step 294 is entered for setting the current frame number to the picture number of the last scene segment decremented by 1. Next, step 295 is entered for conducting a backward motion estimation, using in this example the standard algorithm from the MPEG standard. Next, step 296 is entered for decrementing by 1 the current frame number FN. Thereafter, step 297 is entered for determining whether the current frame number is greater than the picture number for the first frame of the scene segment of the first frame. If the answer is yes, the processing loops back to step 295, whereas if the answer is no, the processing proceeds then to the prediction step 269 shown in FIG. 36A.

Figure 38:
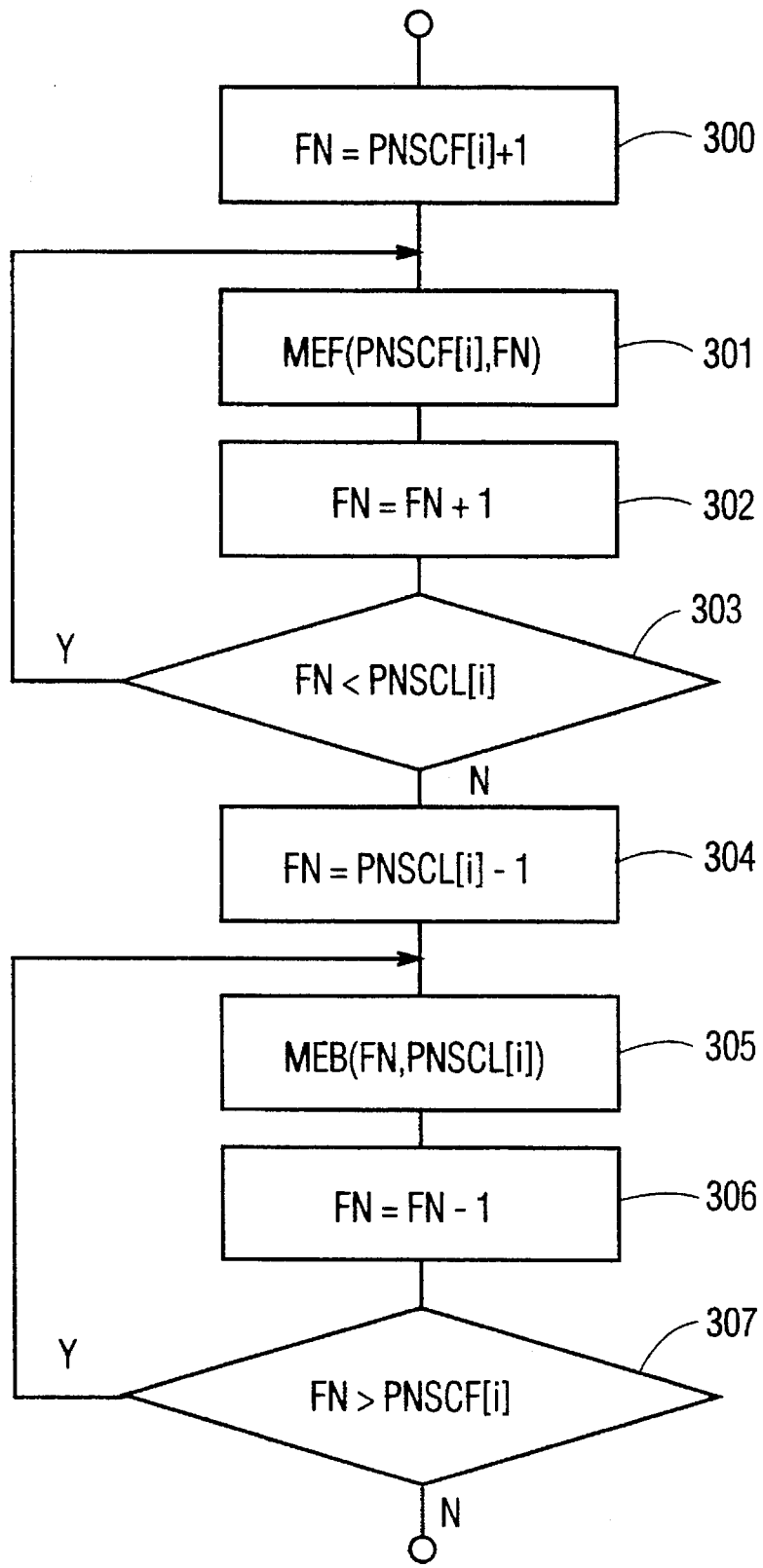
FIG. 38 is a flowchart showing the MEI step of the flowchart of FIG. 36A.

In the flowchart of FIG. 36A for the MAIN encoding algorithm of the TAMI encoder of FIG. 32, the motion estimation step 276 for I frames is shown in detail in the flowchart of FIG. 38 for steps 300 through 307. Note that the flowchart of FIG. 37 for the motion estimation steps for P frames is almost identical to the flowchart of FIG. 38. In other words, steps 290 through 292 and 294 through 297, of the flowchart of FIG. 37 are identical to steps 300 through 302, and 304 through 307, respectively, of the flowchart of FIG. 38. The only difference between the MEP and the MEI processing is between steps 293 of the former and 303 of the latter. Step 293 includes the last frame in the associated determination step, whereas step 303 excludes the last frame, and therefore is only determinative of whether the current frame number is less than the last frame.

Figure 39:
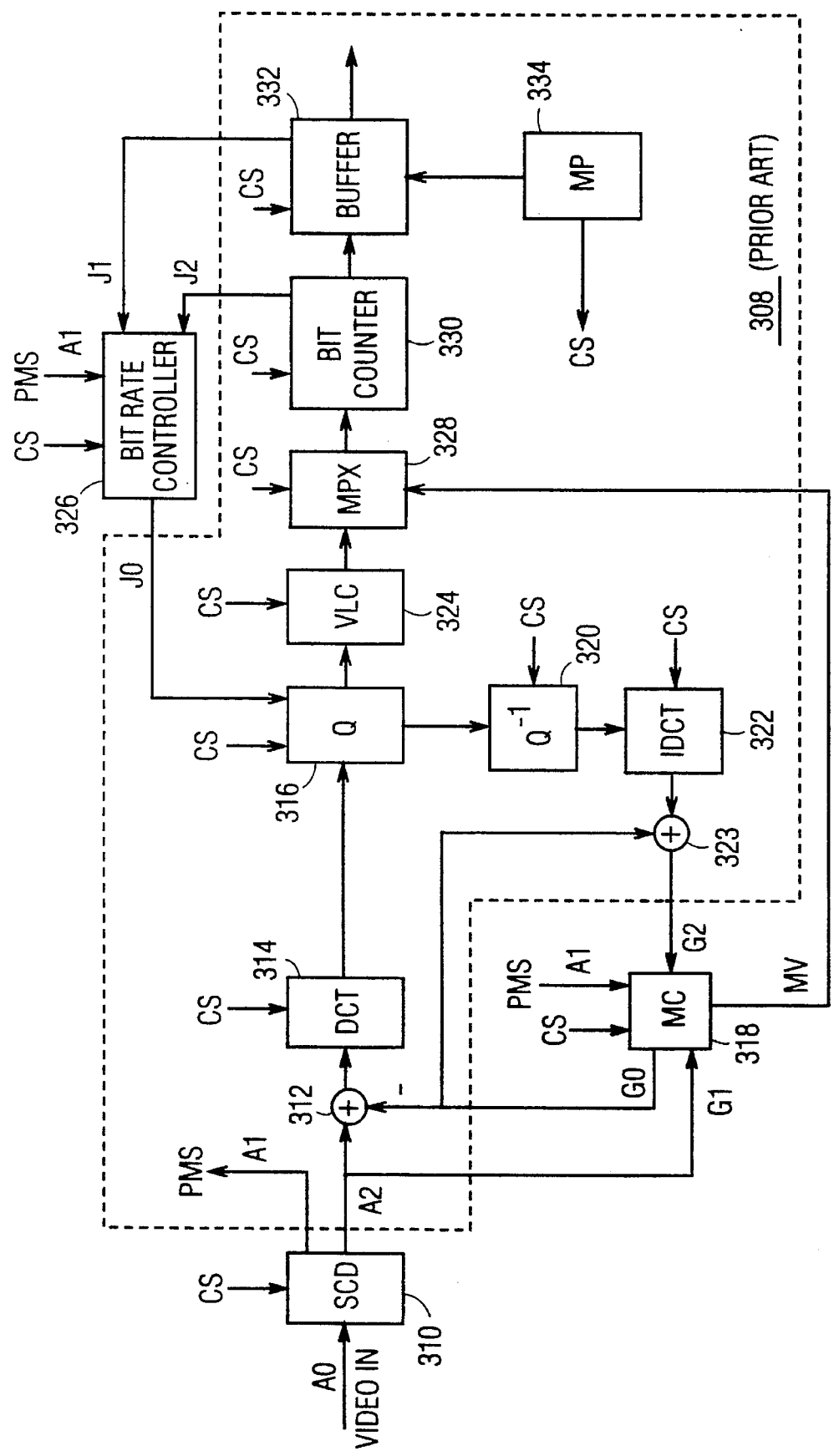
FIG. 39 is a block schematic diagram showing a hardware configuration for carrying out various embodiments of the invention.

A hardware system for permitting various embodiments of the invention as described above to be accomplished will now be described in greater detail than for the systems of FIGS. 3 and 9. With reference to FIG. 39, the system includes a scene change detector 310 for receiving video data, and designating the various frames as I, P, or B, via detection of scene changes of Type 0 and/or Type 1. The associated GOP is stored within the scene change detector 310. The Control Signal CS is obtained from a microprocessor 334, programmed to carry out the required steps, as previously described. One output signal on line A1 is a picture mode signal (PMS), which is a control signal identifying the designation of the frame being processed as either an I, P, or B frame. This signal is connected as an input signal to a motion compensator 318, which is described in greater below. Another output signal along line A2, is a frame output signal The signal is connected to a summing junction 312, and to the motion compensation module 318 via G1. An output along line G0 from motion compensator 318 is connected to the summing junction 312. The output signal or data of the summing junction 312 is connected to a discrete cosine transform module 314, which is connected in cascade with a quantization module 316, variable length coding module 324, multiplexer module 328, bit counter module 330, and a buffer 332. Feedback lines J1 and J2 are connected from buffer 332 and bit counter 330, respectively, to a bit rate controller 326, the output of which is connected along line J0 to the quantizer module 316. Another output of the quantizer module 316 is connected to an inverse quantizer 320 ($Q^{-1}$), the output of the latter being connected as in input to an inverse discrete cosine transform module 322. The output of the inverse discrete cosine transform (IDCT) module 322 is connected to another summing junction 323, which junction also receives an output signal along G0 of the motion compensation module 318. The output from a summing junction 323 is connected via G2 to an input of the motion compensation module 318. Note that the portions of the encoder enclosed within a dashed line area designated 308 are representative of a typical MPEG video encoder known in the art. The present inventors added the scene change detector module 310, bit rate controller 326, and motion compensation module 318 to the prior encoder, for modifying the same to accomplish the various embodiments of the present invention. Note that the output line MV from the motion compensation module 318 to the multiplexer (MPX) 328 provides motion vector bits to the latter. Also, the inverse quantizer 320 and inverse discrete cosine transform module 322 simulate a decoder, as is conventional in the art. The bit counter 330 serves to count bits generated in the system for determining the output behavior of the system, in order to control the quantizer 316 in a manner ensuring that the number of bits being utilized do not exceed the capability of the system. The bit rate controller 326 adjusts the coarseness of quantizer 316 to accomplish this result.

Figure 40:
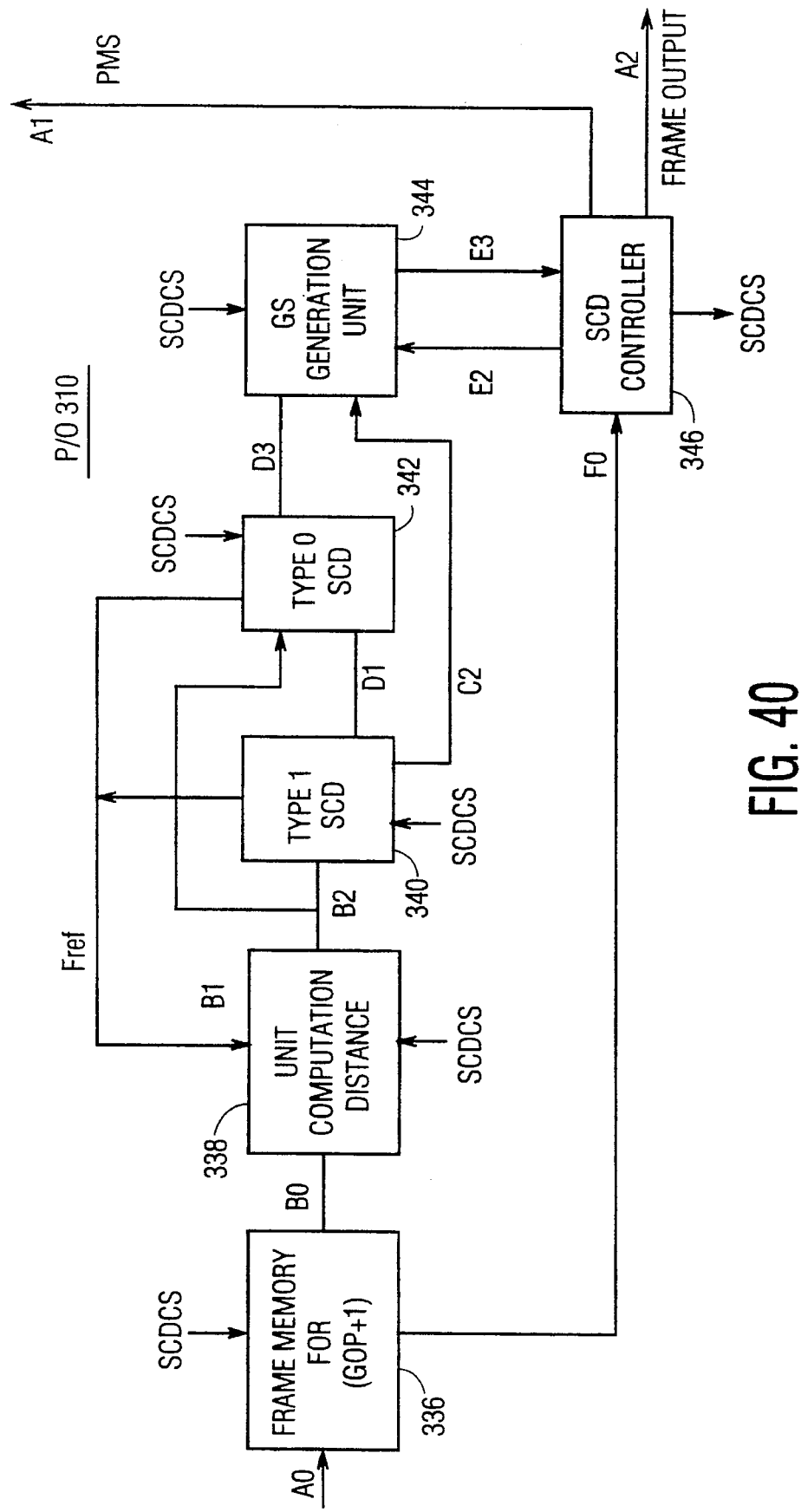
FIG. 40 is a block schematic diagram showing a portion of a scene change detector generally shown in FIG. 39.

The scene change detector module 310 will now be described in substantially greater detail with reference to FIGS. 40 through 45. Further reference is also made to the algorithms previously described above, particularly the algorithm of FIG. 32. As shown in FIG. 40, the scene change detector 310 includes a frame memory 336 connected to a distance computation unit 338, and a scene change detector controller 346, as shown. The frame memory 336 is also responsive to a scene change detector control signal (SCDCS). The frame memory 336 is a standard frame memory for 16 frames, in this example, assuming a GOP of 15 frames. The distance computation unit 338 computes the distances or motion between current and subsequent or following frames, and is also responsive to the SCDCS signal. It is also responsive to a reference frame number signal $F_{ref}$ from a Type 0 scene change detector module 342, or from a Type 1 scene change detector module 340, as shown. Note that the feedback signal $F_{ref}$ is a feedback signal that the distance computation unit responds to for resetting the reference frame positions used in distance or motion computation between frames, as previously discussed. The Type 1 scene change detector module 340 also provides output signals to both the Type 0 scene change detector 342, and to the GOP structure generation unit 344, as shown. The latter two scene change detector modules 340 and 342 are discussed in greater detail below. The GOP structure generation unit 344 is controlled via the SCDCS control signal, and provides an output along E3 to the scene change detector controller 346, and receives a signal along E2 from the latter. Controller 346 also receives a signal via F0 from the frame memory module 336, and provides a frame output signal on line or bus A2, and the picture mode signal PMS on signal line A1. The GOP structure generation unit 344 detects positions used to generate the complete GOP structure or map in accordance with the MPEG standard. Also, note that the SCD controller module 346 can be provided by a small microprocessor or by hardwired logic for the timing, data flow, synchronization, and so forth.

Figure 41:
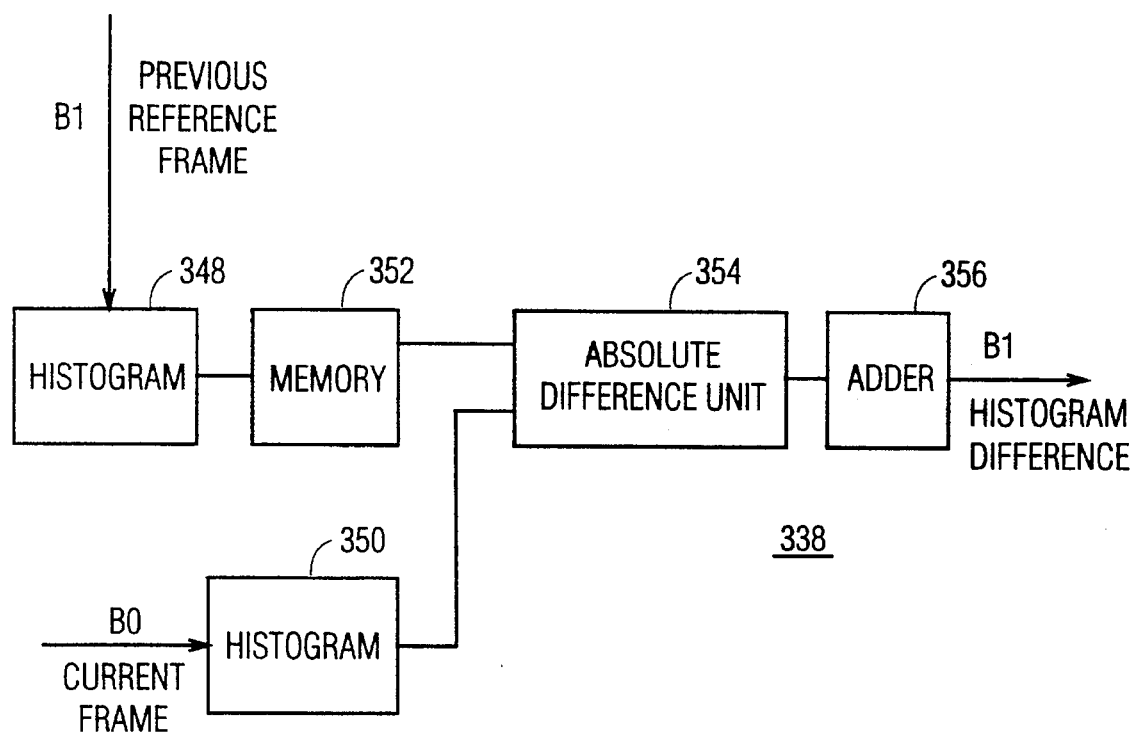
FIG. 41 shows a block schematic diagram of a distance computation unit generally shown in the diagram of FIG. 40.

The distance computation unit 338 is shown in greater detail in FIG. 41. As shown, a histogram module 348 is included for providing a histogram of the previous reference frame from data received along B1, and another histogram module 350 is included for producing a histogram of the current frame, the data for which is received along line B0. The histogram module 348 is connected to a memory 352 for storing the previous reference frame data until the memory 352 is reset by the scene change detector module 340 or scene change detector module 342. An output of memory 352 is connected to an absolute difference unit 354, which also receives the histogram data from histogram module 350 for the current frame. The absolute difference therebetween is computed by unit 354 and outputted to an adder module 356, the output of which is fed along line B1 as the histogram difference to the scene change detector modules 342 and 344. Note that although the example of FIG. 41 for the distance computation unit 338 shows the use of Histogram modules 348 and 350, block variance processing, histogram of difference processing, and so forth, could have alternatively been used in place of the histogram technique. These other techniques have been previously described above.

Figure 42:
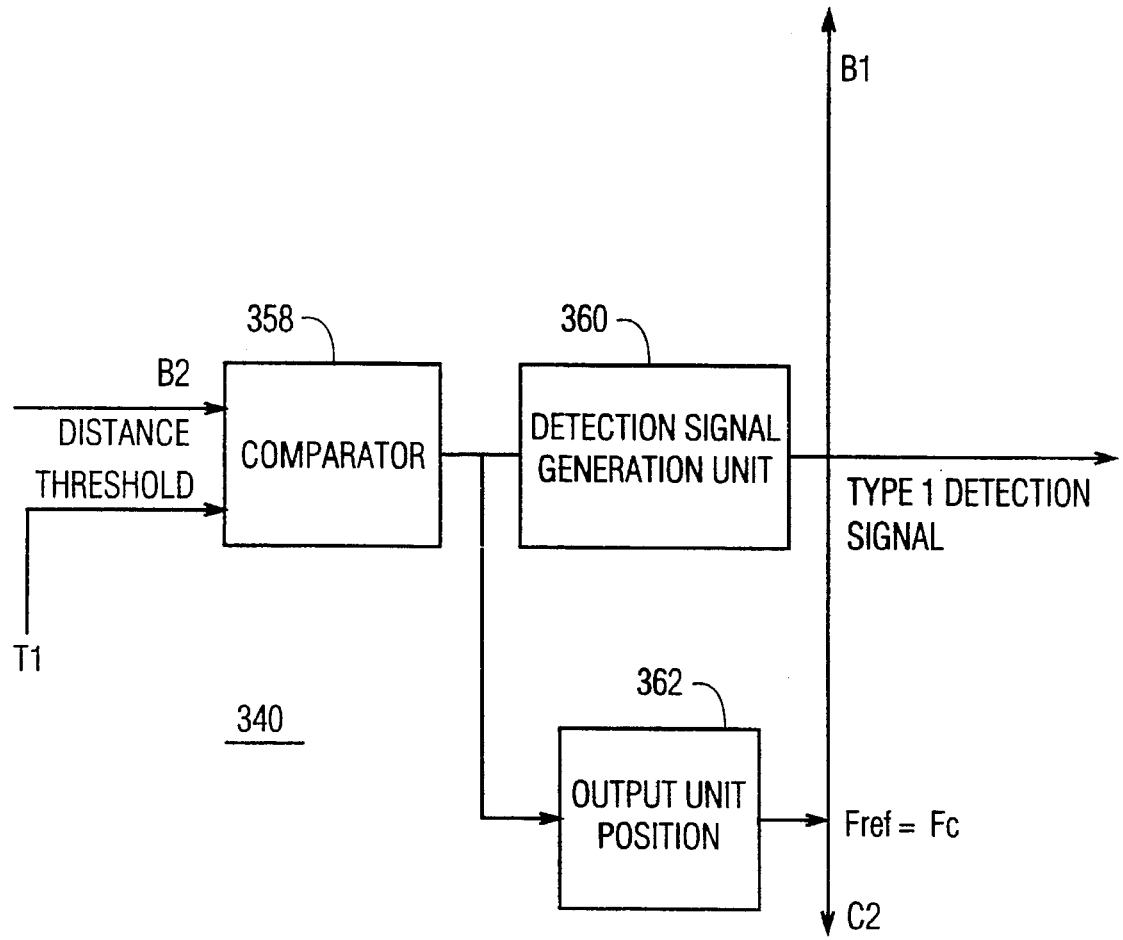
FIG. 42 is block schematic diagram of a Type 1 scene change detector showing generally in FIG. 40.

With reference to FIG. 42, the Type 1 scene change detector module 340 will now be described. A comparator 358 is included for receiving the distance or motion signal along line B2 from the distance computation unit 338, and comparing the signal with the Type 1 threshold signal T1, whereby if B2 is greater than T1, the output of the comparator is indicative of a digital "1", whereas if the signal B2 is less than T1, the output of the comparator 358 is representative of a digital "0". The output from comparator 358 is fed to both a detection signal unit 360 which acts as a buffer, and to a position output unit 362 which acts as a frame number generator for providing $F_{ref}$, which is set to $F_c$ (current frame number), along the line designated at a lower end as C2 and at an upper end as B1, as shown. Note that the buffer 360 is a noninverting buffer. Accordingly, if a digital "1" is provided as an input signal thereto, the output signal from the detection signal generation unit 360 will also be a digital "1".

Figure 43:
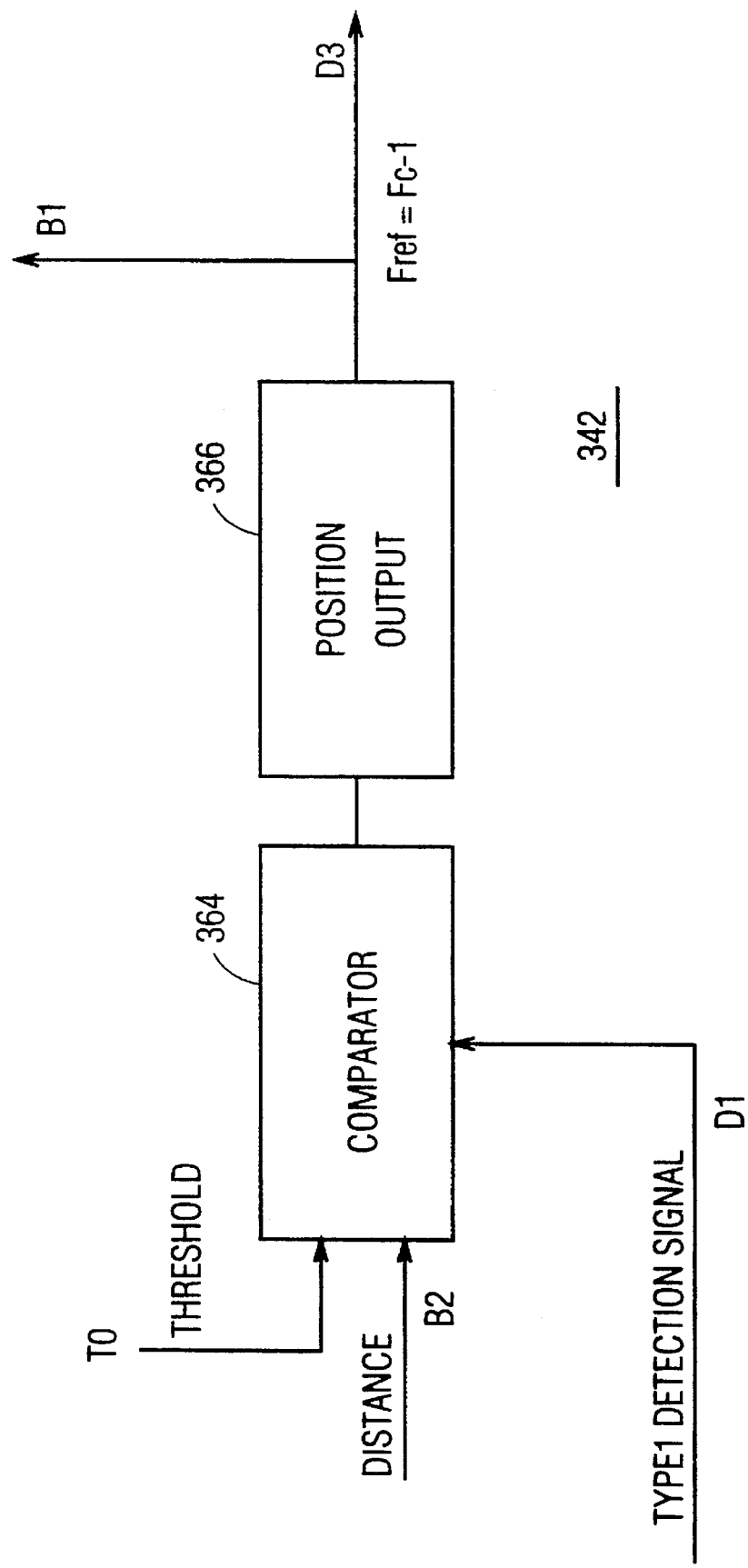
FIG. 43 is a block schematic diagram showing a Type 0 scene change detector shown generally in FIG. 40.

The Type 0 scene change detector module 342 will now be described in greater with reference to FIG. 43. As shown, the comparator 364 is included for comparing a distance or motion measurement signal D1 with the T0 threshold signal, for producing a digital "1" output if D1 is greater than T0, and a digital "0" if the distance D1 is less than T0 threshold. Comparator 364 also receives a Type 1 detection signal along D1 from the Type 1 scene change detector module 340, for inhibiting comparator 364, for in turn inhibiting the Type 0 scene change detector module 342 if a Type 1 scene change is detected by module 340. The output of comparator 364 is connected as an input to a position output unit 366 which provides along B1 the $F_{ref}$ signal which is equal to $F_{(c-1)}$ for the frame number of the previous frame. Also, the position output unit 366 provides a signal along D3 indicative of whether a Type 0 scene change has been detected between frames.

Figure 44:
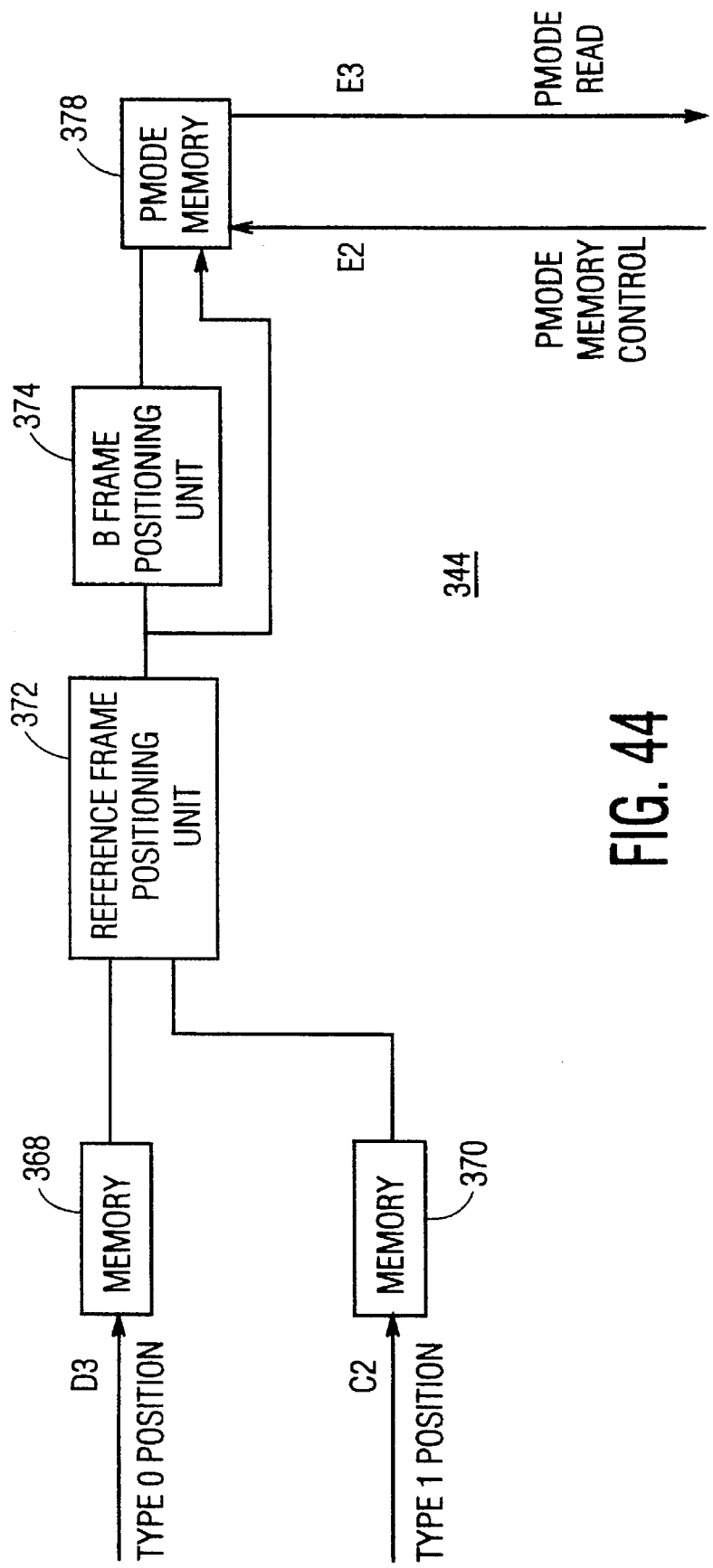
FIG. 44 shows a block schematic diagram of a GOP structure generation unit shown generally in FIG. 40.

The GOP structure generation unit 344 of FIG. 40 will now be described in greater detail with reference to FIG. 44. As shown, unit 344 includes two memories 368 and 370 for storing Type 0 scene change positions, and Type 1 scene change positions, respectively. These memories 368, 370 are individually connected to inputs of a reference frame positioning unit 372, which determines I and P frame positions based upon the detected scene changes. One output from the reference frame positioning unit is connected to a B frame positioning unit 374, for designating remaining frame positions not designated as I or P frames, as B frames. The reference frame positioning unit 372 is also connected to a PMODE memory 378. The PMODE memory 378 also receives the B frame positions from unit 374, and serves to store the I, P and B frame positions for the GOP being processed. In this example, the PMODE memory 378 contains 16 registers designated as the 0 through 15 registers relative to frames "0 to 15", respectively. The PMODE memory 378 receives along line E2 a PMODE memory control signal, and outputs along line E3 a PMODE read signal.

Figure 45:
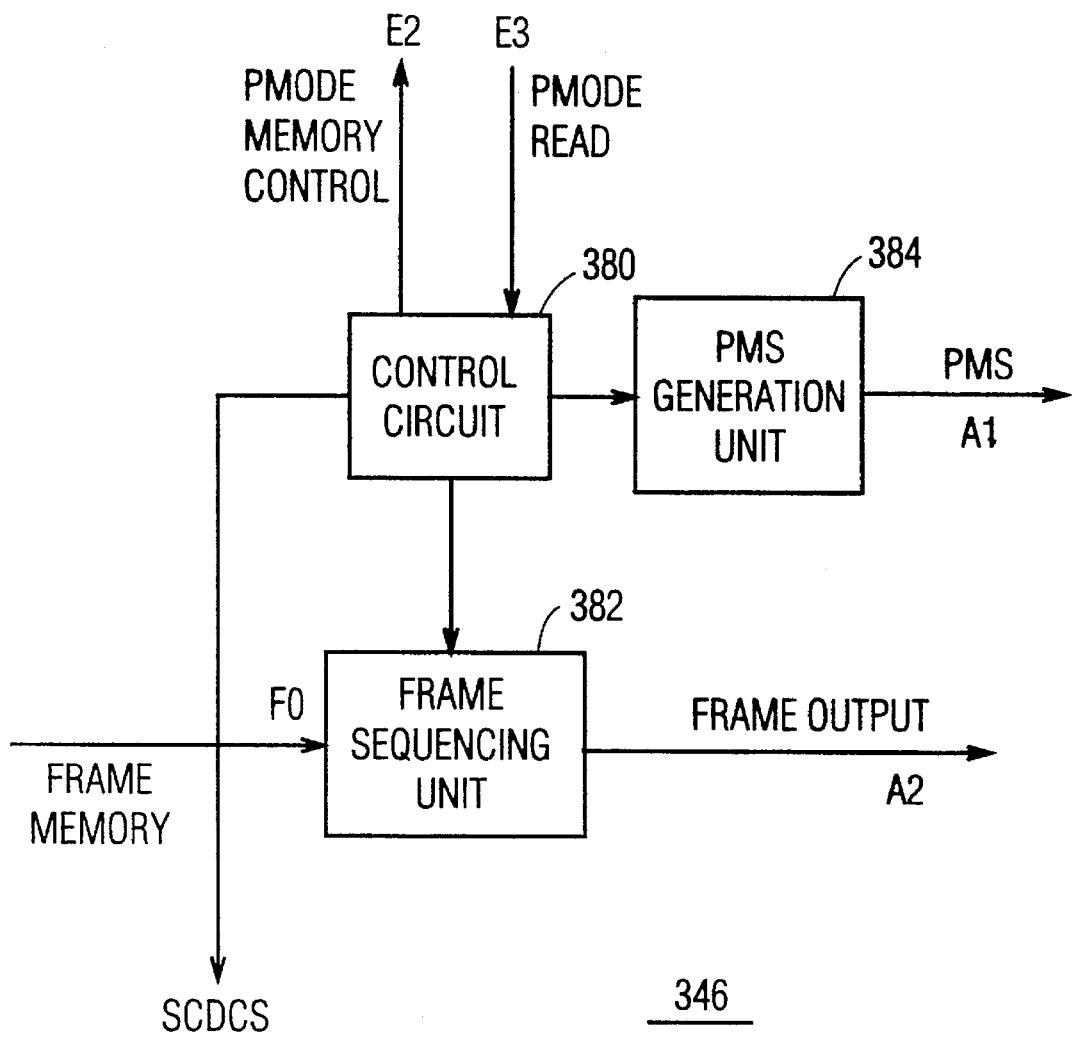
FIG. 45 shows a block schematic diagram of a scene detector controller module shown generally in FIG. 40.

The scene change detector controller module 346 of FIG. 40 will now be described in greater detail with reference to FIG. 45. Controller 346 includes a control circuit 380 that can include either a small microprocessor or be provided by handwired logic. The control circuit 380 is receptive of a PMODE read signal along line E3, and outputs both a PMODE memory control signal along line E2, relative to the GOP generation unit 344 (see FIG. 40). The control circuit also outputs the scene change detector control signal SCDCS. As further shown, control circuit 380 is connected to a picture mode signal (PMS) generation unit 384, and to a frame sequencing unit 382. The frame sequencing unit 382 acts as a buffer, and functions to receive frame data along line F0 from frame memory 336, the data being representative of the actual image data of the frame being processed, whereby the frame sequencing unit 382 provides frame data as an output along line A2 representative of the frame being processed. Also, the picture mode signal generation unit 384 provides along line A1 the picture mode signal (PMS) that represents a switch control signal described in detail below, for permitting detailed identification of the frame being processed.

Figure 46:
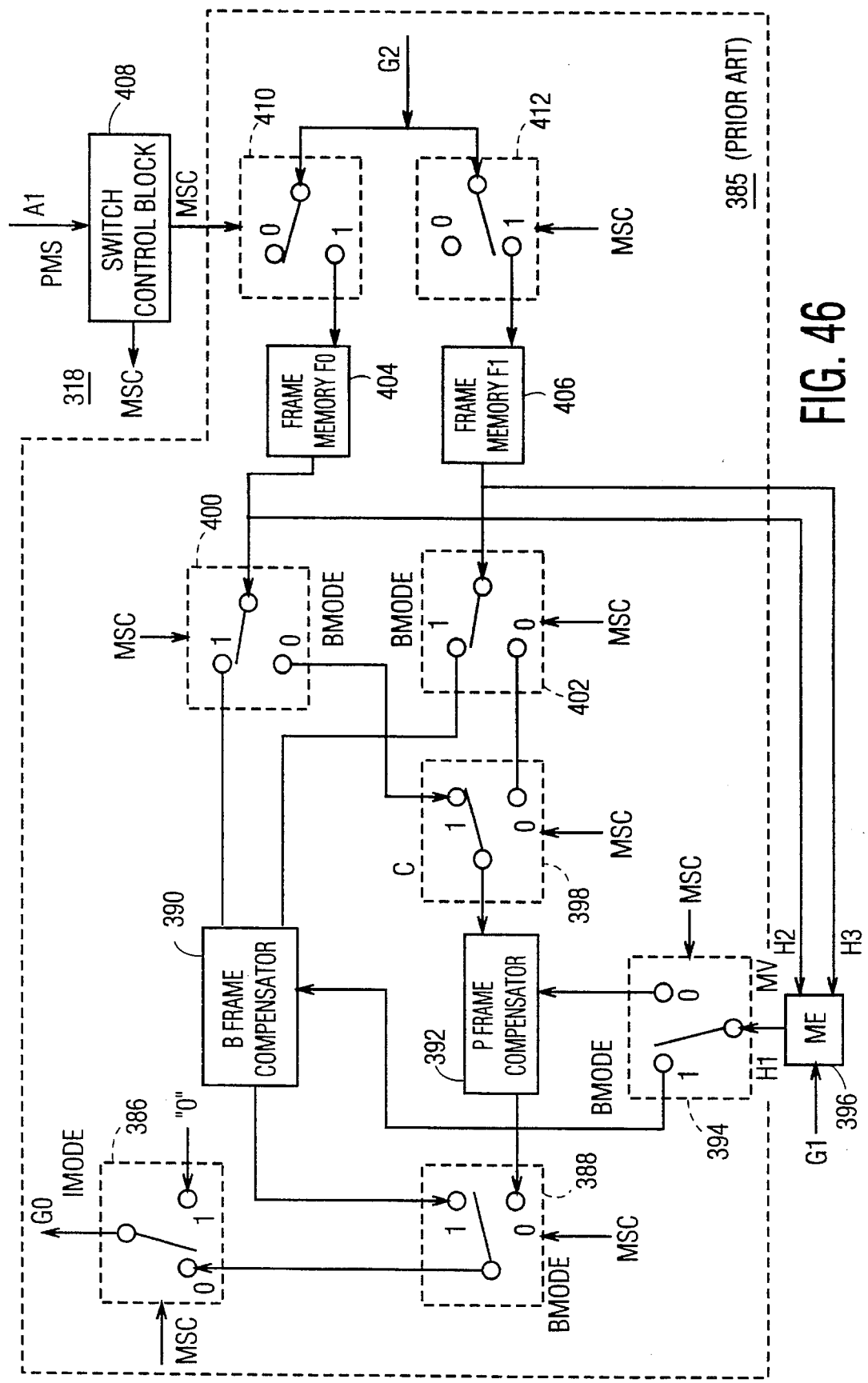
FIG. 46 shows a block schematic diagram of a motion compensator module shown generally in FIG. 39.

In FIG. 46 the motion compensation module 318 shown in FIG. 39 is shown in detail. The components enclosed within a dashed line rectangular area 385 represent a motion compensation circuit known in the prior art. The present inventors added two modules to the known motion compensation network, which modules include a telescopic motion estimator (ME) module 396, and a switch control block module 408, as shown. The prior motion estimation network 385 includes one IMODE or intraframe mode switch 386, and four BMODE switches 388, 394, 400, and 402, respectively. Three other data transfer switches 398, 410 and 412 are also included, as shown. Each one of these switches are controlled by an MSC or mode switch control signal, as shown, which signal is generated by a switch control block 408 in response to the picture mode signal PMS received along line A1. The truth table for switch control block 408 is shown in FIG. 47 as Table 414. Also, as shown, each of the switches are operable in response to the MSC signal for switching their associated switch arm between a "0" and "1" contacts. A B frame compensator 390 has individual connections to switches 388, 394, 400, and 402. A P frame compensator 392 has individual connections to switches 388, 394, and 398, respectively. Switch 394 has its switch arm connected to a motion estimator module 396. Switch 398 has its arm connected to the P frame compensator 392, and its "1" and "0" contacts connected to the "0" contact of switch 400, and "0" contact of switch 402, respectively. The switch arm of switch 400 is connected in common to a frame memory F0 404, and via an H2 line to a motion estimator module 396. A switch arm of switch 402 is connected in common to a frame memory F1 406, and via a signal line H3 to motion estimator module 396. Frame memories 404 and 406 are also connected to the "1" contacts of switches 410 and 412, respectively. The switch arms of 410 and 412 are connected in common along line G2 to a summing junction 323 (see FIG. 39).

Operation of the motion compensation module 318 will now be described with reference to FIGS. 46 and 47. The B frame compensator module 390 and P frame compensator module 392 are operative for providing the necessary interpolation functions for processing B and P frames, respectively. When the PMS signal is "0, 1", the IMODE switch 386 connects a 0 signal to summing junction 312. Switches 410 and 412 operate in an alternate manner for connecting an input of either frame memory F0 404 or frame memory F1 406 to the summing junction 323. These switches are switched alternatively for alternately connecting memories 404 and 406 to the summing junction 323 so long as the value of the picture mode signal PMS is either 0, 1, 2, or 3. However, if the value of the PMS signal is either 4 or 5, switches 410 and 412 remain in their last switch position so long as the value of the PMS signal remains at either 4 or 5. If the value of the PMS signal is either 0 or 1, switch 386 is operated for connecting 0 volt to summing junction 312 along signal line G0; B mode switch 388 is operated for disconnecting the output of the P frame compensator 392 from the circuit or network; B mode switch 394 is operated for connecting the output of the motion estimator module 396 as an input to the P frame compensator 392; switch 398 is operated for connecting the input of the P frame compensator 392 either through switch 400 or switch 402 to frame memories 404 and 406, respectively, depending upon which one of these frame memories is the most current that has been loaded with data; and switches 400 and 402 are operated for connecting the outputs of frame memories 404 and 406 to the inputs of the B frame compensator 390. When the value of the PMS signal changes to a "2" or "3", switch 386 and 388 are operated for connecting the output of the P frame compensator 392 to the summing junction 312, and switches 400 and 402 are operated for individually connecting the outputs of memories 400 and 406 to switch 398, whereby the latter operates to connect one of the frame memory outputs from memories 404 and 406 to the input of the P frame compensator 392 dependent upon the position of the switch arm of switch 398 at the time.

Figure 48:
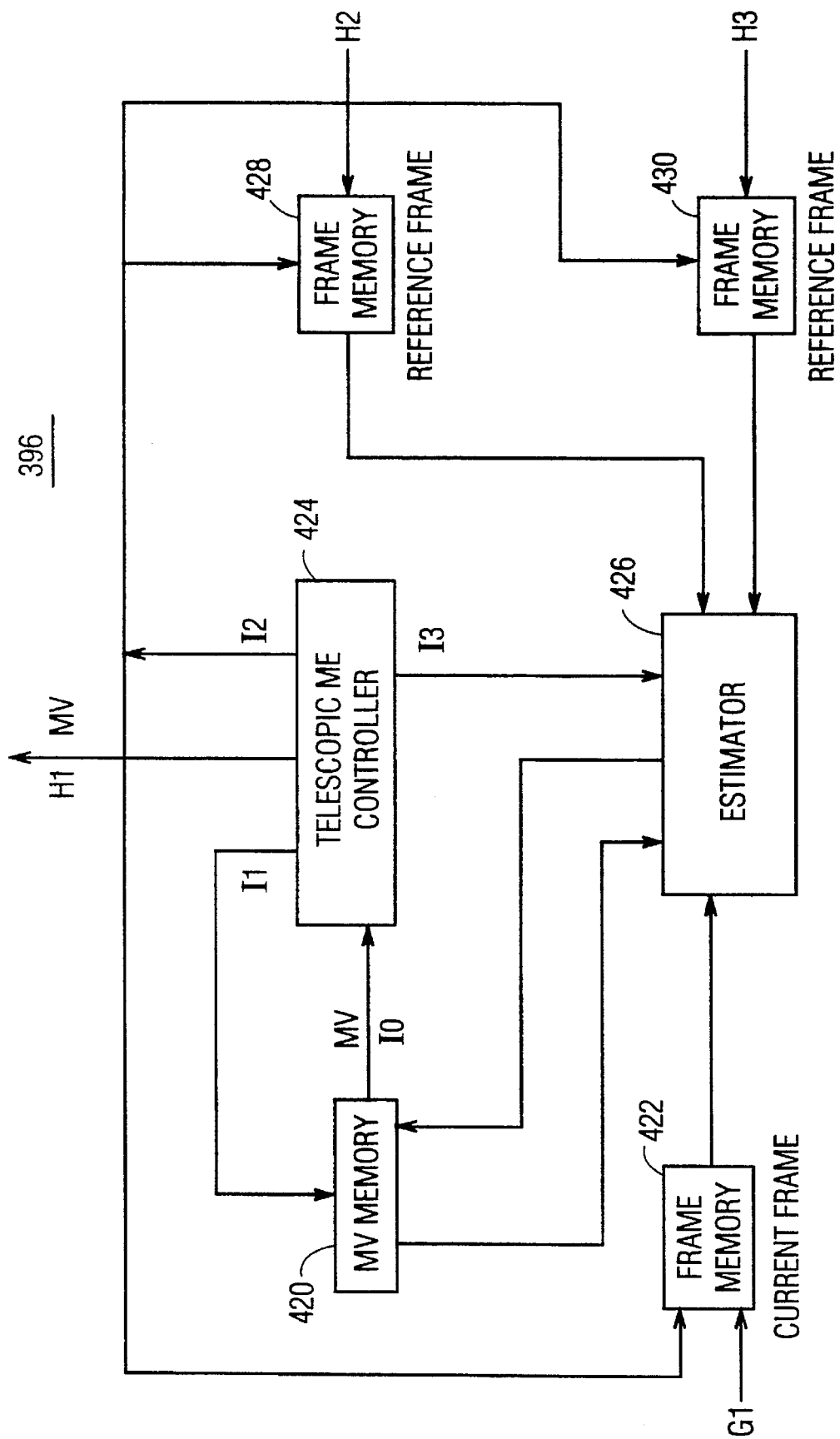
FIG. 48 shows a block schematic diagram of a motion estimator module for the motion compensator shown in FIG. 46.

The motion estimator module 396 will now be described in greater detail. With reference to FIG. 48, motion estimator module 396 includes a motion vector memory 420 connected between a telescopic motion estimator controller 424 and estimator module 426. A frame memory 422 is connected to estimator 426, and telescopic motion estimator controller 424. Another frame memory 428 is connected to estimator module 426, and the controller 424. A third frame memory 430 is also connected to controller 424 and estimator module 426. The motion vector memory 420 for storing motion vectors for future and prior reference frames, and for B frames located between such reference frames. This memory is controlled and accessed via the telescopic ME controller 424. Frame memory 422 is used to store current frame data temporarily, until such data is required for use. The estimator module 426 performs the actual motion vector search, and uses any conventional motion estimator method, including a full search method, or any of the other prior methods as previously described herein. The telescopic ME controller 424 controls the timing for the other modules of the associated motion estimator module 396, and reads the motion vectors from the motion vector memory 420, and outputs the estimated motion vectors to the B frame compensator 390, or P frame compensator 392 via the H1 signal line. Frame memories 428 and 430 are used for storing reference frames, where at any given time one of these memories will store the immediate reference frame, and the other of these memories will store the future reference frame. Frame data is brought into the frame memory 428 via the H2 signal line, and frame data is brought into the frame memory 430 via the H3 signal line.

Figure 49:
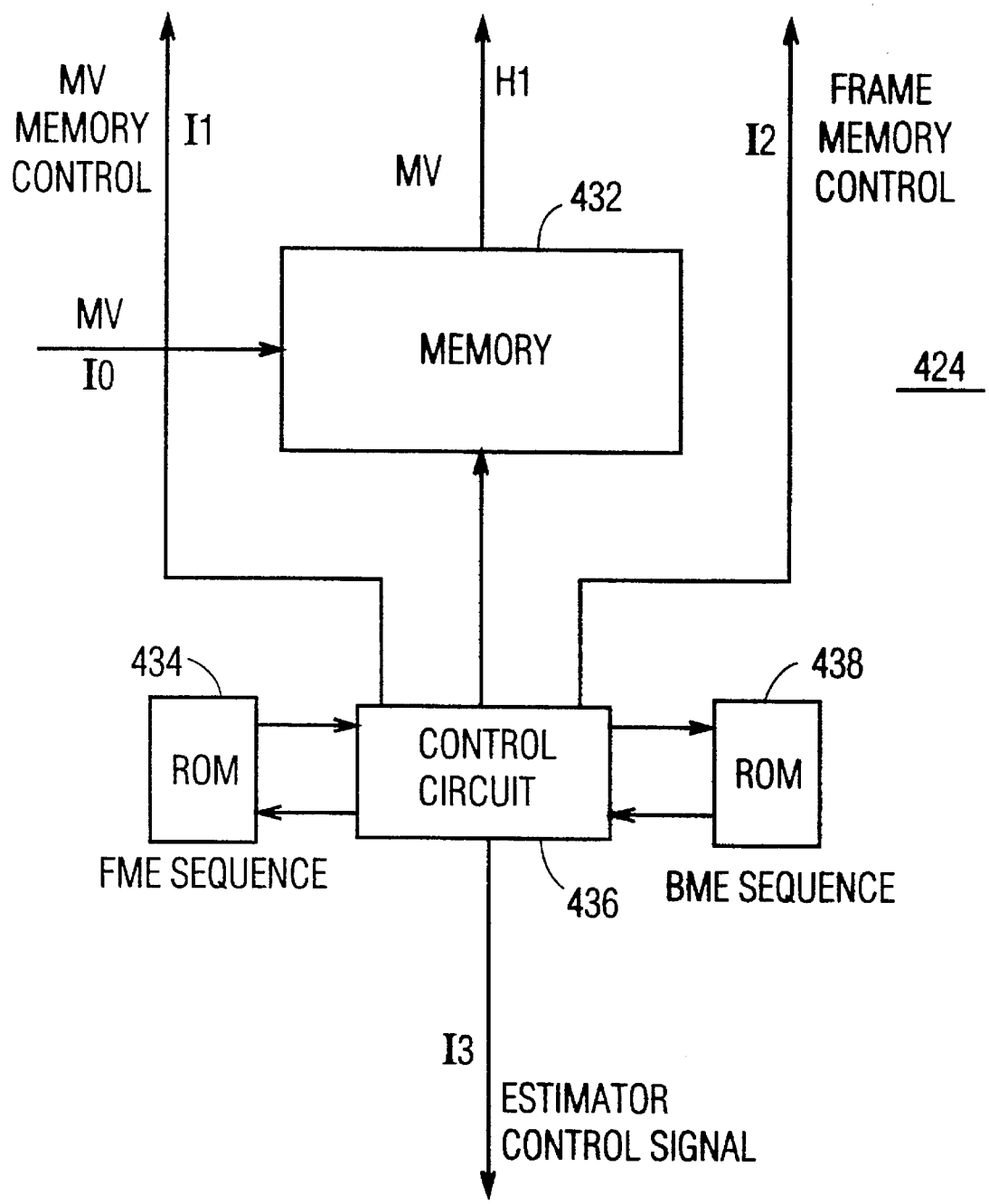
FIG. 49 shows a block schematic diagram of a telescopic motion estimator controller shown in the schematic of FIG. 48.

The telescopic motion estimator controller 424 of the telescopic motion estimator module 396 will now be described in greater detail with reference to FIG. 49. As shown, controller 424 includes a memory 432 connected to a control circuit 436. The controller circuit 436 is connected to two read only memories (ROMs) 434 and 438, respectively. ROM 434 is associated with a forward motion estimation (FME) sequence, whereas ROM 438 is associated with a backward motion estimation (BME) sequence. Control circuit 436 is operative for providing the estimator control signal along signal line 13, the motion vector memory control signal along signal line I1, and the frame memory control signal along signal I2, respectively.

Figure 50:
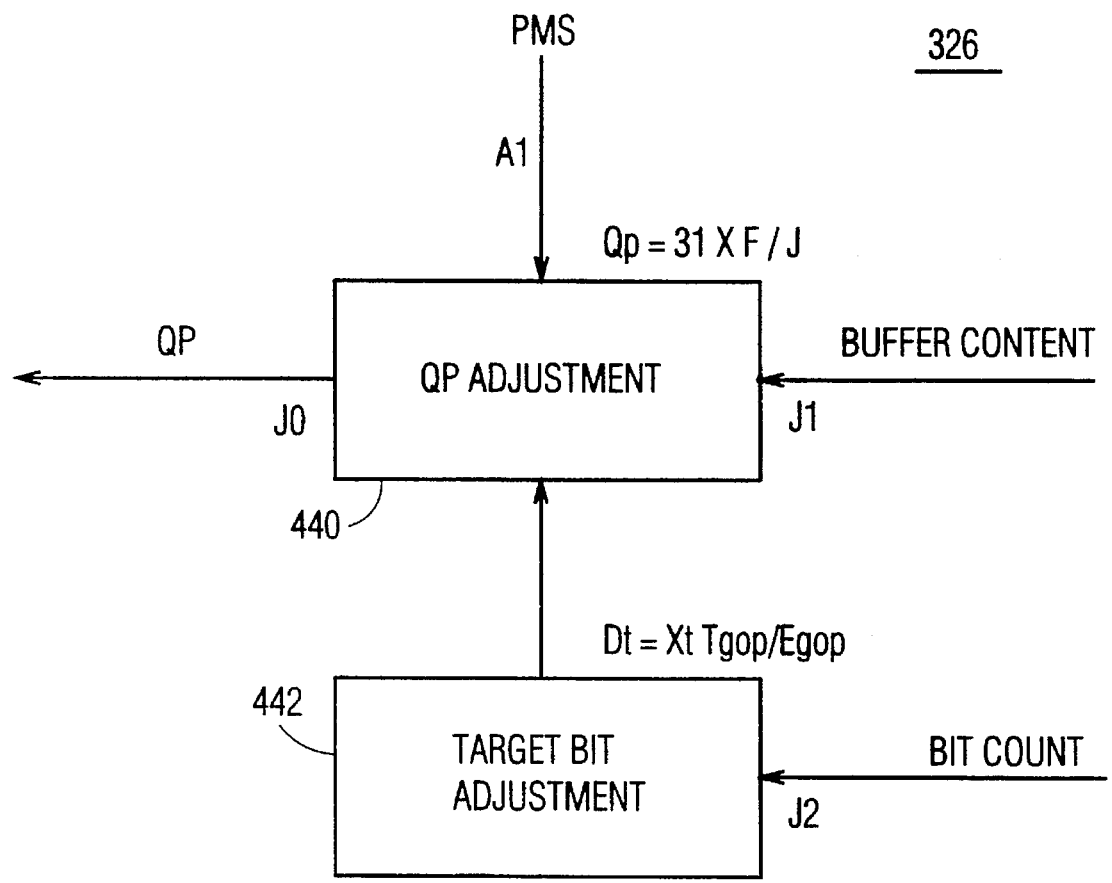
FIG. 50 shows a block schematic diagram and a table for the bit rate controller module of the system shown in FIG. 39.

The bit rate controller 326 will now be described in greater detail with reference to FIG. 50. As shown, controller 326 includes a quantization parameter or QP adjustment module 440, and a target bit adjustment module 442. A truth table 444 is shown, which indicates how the scaling factor X for each picture type is changed in correspondence to the value of the picture mode signal PMS received by the quantization parameter adjustment module 440. This module is programmed for computing the equation $Q_p = 31X(F/J)$. By using 31 steps in this quantization parameter equation, five bits may be used to designate the same. The ratio of buffer fullness F to buffer size J lies between zero and one, depending upon how many bits are associated with buffer 332 (see FIG. 39), i.e. from 0 to J, typically J represents the average bits needed to code about five pictures or 250Kbytes, when the bit rate is approximately 1.5 Mbyte/sec. Note with further reference to truth table 444, that when the PMS has a value of "0", the scaling factor of 1 is relative to a I1 frame. When the PMS signal is "1", the scaling factor X is ten, in association with a I2 frame, which is a coarsely quantized frame in this example. When the PMS signal has a value "2", the scaling factor X is "1", in association with a P1 frame. When the PMS signal is "3", this scaling factor is 3, in association with a P2 frame, which is a somewhat coarsely quantized frame. When the PMS signal is "4", the scaling factor X is 2, in association with a B1 frame When the PMS signal is "5", the scaling factor X is 2, in association with a B1 frame. Lastly, when the PMS signal is "5", the scaling factor X is 2, for a B2 frame. Further note that the target bit adjustment module 442 operates to compute the equation $D_t = X_t T_{gop}/E_{gop}$, whereby the legend in FIG. 50 defines each one of the components of the equation for $D_t$, i.e. the target bit allocation for picture Type t.

Figure 51:
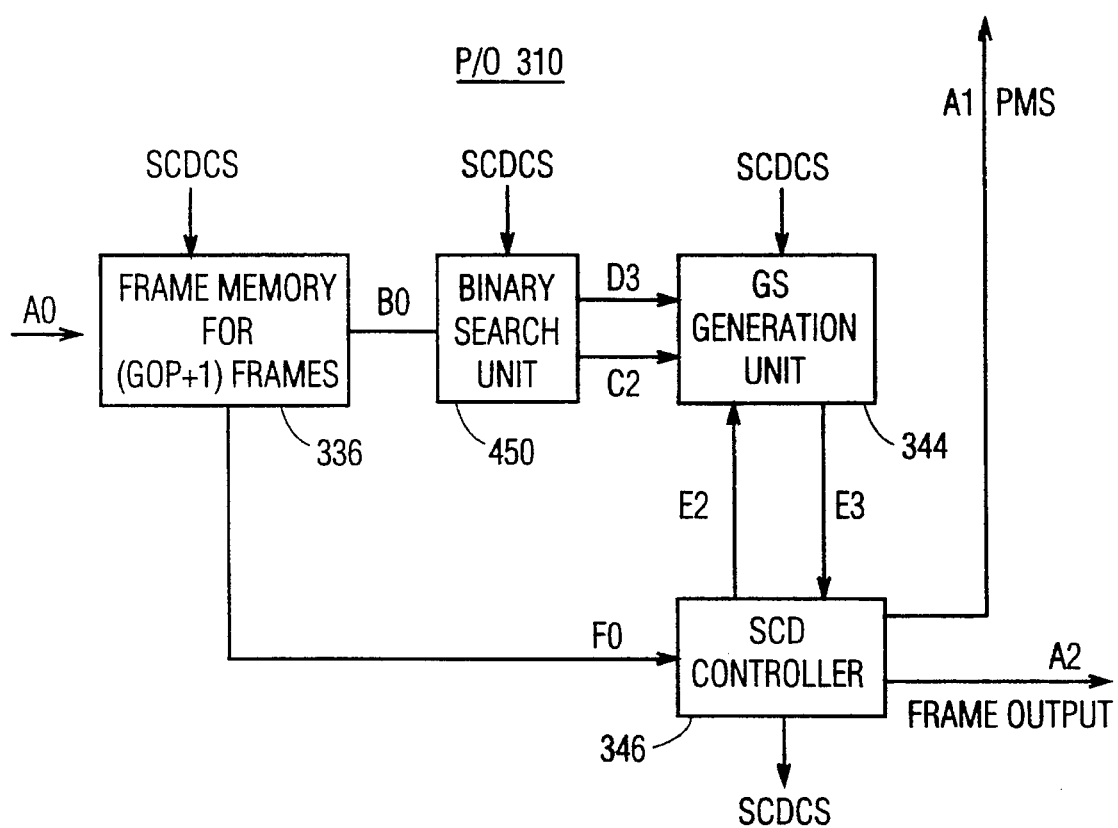
FIG. 51 shows a block schematic diagram for a scene change detector configuration associated with the encoder of FIG. 39, for a BS E-TAMI embodiment of the invention.

The embodiment of the invention for BS E-TAMI (Binary Search Equidistant TAMI), as presented above in association with the algorithm shown in FIG. 31, can be carried out using the general hardware configuration of FIG. 39. However, the scene change detector or SCD 310 is configured differently than for other embodiments of the invention. A generalized block diagram of the required SCD 310 configuration is shown in FIG. 51. The frame memory 336, GS or GOP structure generation unit 344, and the SCD controller 346, are as previously described for the embodiment of FIG. 40. The difference lies in the use of the binary search unit 450 between the frame memory 336 and the GOP structure generation unit 344, as shown.

Figure 52:
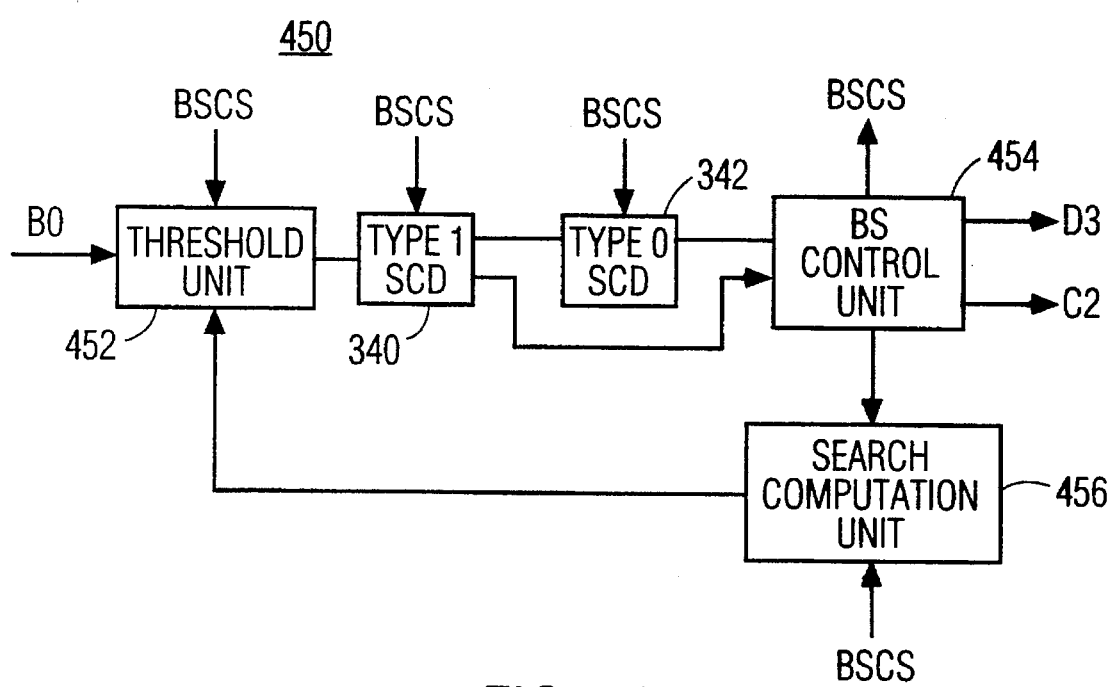
FIG. 52 shows a block schematic diagram of a binary search unit associated with the scene change detector of FIG. 51.

The configuration of the binary search unit 450 is shown in greater detail in FIG. 52. The threshold unit 452 operates to compute the value for m, the middle point of the search region of the frame being searched. Note that the frame data is carried over bus B0 from the frame memory 336. Control unit 454 operates to provide the appropriate timing and binary search control signal BSCS. Control unit 454, in response to the outputs of the scene change detectors 340 and 342, provides a signal indicative of a Type 0 scene change along output line D3, and the frame position for the Type 0 scene change along line C2. The search region computation unit 456 determines the next search region for conducting a binary search from one step to another of the associated algorithm, whereby the searching is conducted in an iterative manner, as shown in FIG. 31.

Subband Video Coding with TAMI:

It is known in the art to subsample a discrete-time signal as a step in separating its lowpass and highpass frequency components. This technique has been extended to processing of an image or a frame of video by applying subsampling along each of the two spatial directions. When following appropriate highpass and lowpass filters, subsampling by a factor of two in each spatial direction decomposes an image or video frame into four subimages, each of which has one quarter as many pixels as the original image. These subimages (subband images) may be labelled as $(L_v, L_h)$, $(L_v, H_h)$, $(H_v, L_h)$, and $(H_v, H_h)$ where the uppercase letters denote the type of filter (H=highpass, L=lowpass) and the subscripts denote the spatial processing direction (v=vertical, h=horizontal). The subband images may be recombined by interpolation and filtering to reconstruct the original image from which they are derived. Any or all of the subband images may be further processed by the same steps to produce subband images of smaller sizes. In transmission or storage system applications, frequency selective image coding may be achieved by using different coding methods on different subband images.

In yet another embodiment of the invention, a new subband video coding algorithm with temporally adaptive motion interpolation was conceived. In this embodiment, the reference frames for motion estimation are adaptively selected using temporal segmentation in the lowest spatial subband of a video signal. Variable target bit allocation for each picture type in a group of pictures is used to allow use of a variable number of reference frames with the constraint of constant output bit rate. Blockwise DPCM, PCM, and run-length coding combined with truncated Huffman coding are used to encode the quantized data in the subbands. As shown below, the thresholds for the Type 1 and Type 0 scene changes are adjusted in direct proportion to the number of pixels subsampled in a frame. Simulation results of the adaptive scheme compare favorably with those of a non-adaptive scheme.

Subband coding is known as having an inherent hierarchical resolution structure, which is suitable for prioritized packet video in ATM networks. Another known approach for video coding is motion compensation which has been recently standardized into the MPEG standard. Temporal redundancy reduction methods using subbands may be classified into two approaches. One is 3D spatio-temporal subband coding, and the other is motion compensated 2D subband coding. The present subband embodiment applies the latter approach in implementing the present fixed output bit rate subband video encoder shown in FIG. 53, and it provides improved performance in removing temporal redundancy due to motion.

In the known motion compensated 2D subband coding system of Y. Q. Zhang and S. Zafar, described in their paper "Motion Compensated Wavelet Transform Coding for Color Video Compression", IEEE Trans. Circuits Syst. Video Technol., Vol. 2, No. 3, pp. 285–296, Sept. 1992, for purposes of determining motion vectors, two stages of subband decomposition are used, whereby the ($L_v$, $L_h$) is decomposed by a second stage of low pass filtering and subsampling. This produces a low frequency subband image with one-sixteenth the number of pixels as the original image, comprised of the lowest one-fourth of the horizontal and vertical spatial frequency components of the original image, the so-called "lowest subband" image.

In the present subband embodiment, each picture of the input video is decomposed into subbands by using biorthogonal filters. The motion compensation scheme uses temporally adaptive motion interpolation (TAMI), as previously described. The number of reference frames and the intervals between them are adjusted according to the temporal variation of the input video.

More specifically, the algorithm for the present subband embodiment is a slightly modified version of TAMI as described above. It is modified to allow a variable number of P frames in each GOP. The new subband TAMI algorithm takes the following steps for each GOP (group of pictures):

(1) It detects the positions of scene change of Type 1;
(2) It detects the positions of scene change of Type 0; and
(3) It determines the positions of all I, P, B frames.

For this embodiment, I, P, and B frames with full bit allocation are denoted as I1, P1, and B frames, an I frame with reduced bit allocation as I2, a P frame with reduced bit allocation as P2, as with other embodiments of the invention.

Two types of scene detectors are required in the algorithm, as previously described for other embodiments of the invention. The first detector declares a scene change of Type 1 for the current frame when a distance measure between the current frame $f_n$ and the immediate past from $f_{n-1}$ is above a threshold $T_1$. This type of scene change corresponds to an actual scene content change; it is coded as an I2 frame (very coarsely quantized intra frame), and the immediate past frame $f_{n-1}$ is coded as a P2 frame (very coarsely quantized predicted frame). The I2 frame coding exploits the forward temporal masking effect, and the P2 frame coding takes advantages of the backward temporal masking effect. The second detector declares a scene change of Type 0 for the current frame when the distance measure between the current frame and the last reference frame is above a threshold $T_0$. In this case the immediate past frame $f_{n-1}$ becomes a P1 frame.

As indicated above, reference frame assignment strategy using Type 0 scene change detection is that the end frame of every temporal segment determined by a Type 0 scene change is a P1 frame, and that the frames in between should be B frames. Examples of GOP structures generated by the TAMI algorithm are as previously shown in FIG. 8A and FIG. 8B.

Figure 53:
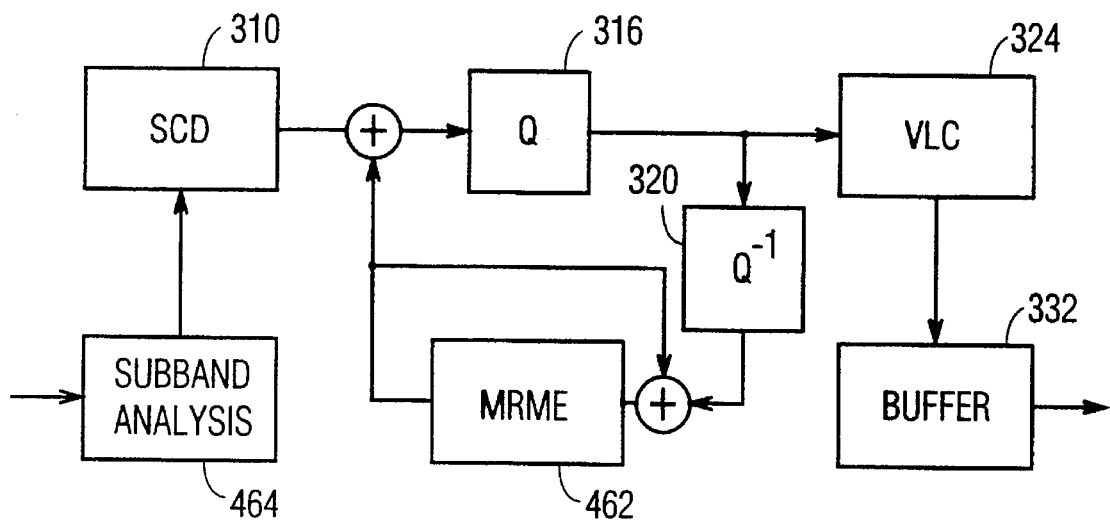
FIG. 53 shows a block schematic diagram of a generalized subband video encoder incorporating TAMI for another embodiment of the invention.

In FIG. 53 a block diagram for the subband coding system 460 using TAMI is shown. The TAMI algorithm using multi-resolution motion estimation is applied via SCD 310 and motion estimator 462 on the lowest of the spatial subbands after subband decomposition via the subband analysis module 464. The motion compensated data are then quantized via quantizer 316 and encoded by variable length coding in VLC module 324 using a Huffman code scheme, for example. The buffer 332 is necessary to convert the output encoded data from variable rate to constant channel bit rate.

Figure 54:
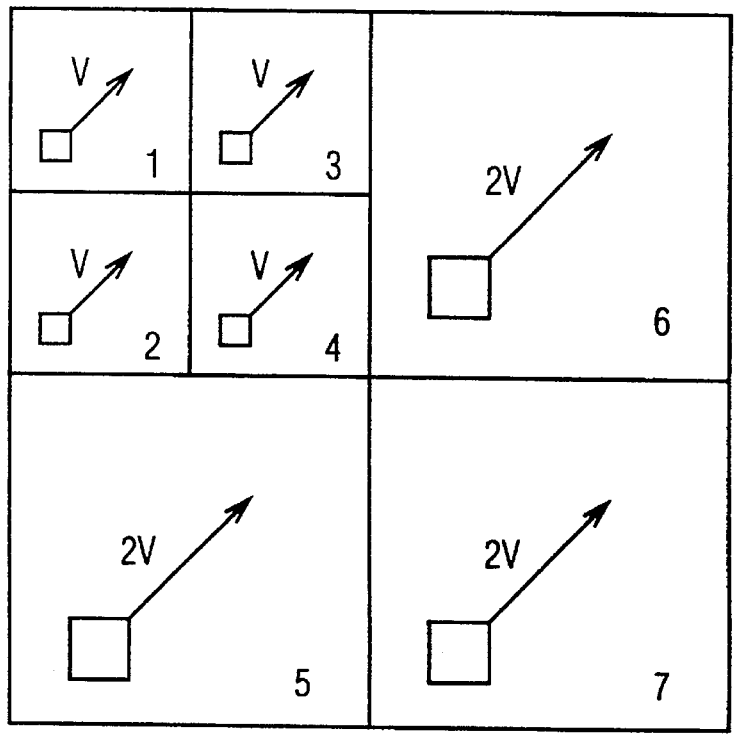
FIG. 54 is a simplified diagram showing a multi-resolution motion estimation method associated with the encoder of FIG. 53.

Two stages of subband filtering are used to generate seven spatial bands "1 through 7" as shown in FIG. 54. In this example, the filters are separable 2D filters that use low-pass and high-pass biorthogonal filters as taught by D. LeGall and A. Tabatabai in their paper entitled "Subband Coding of Digital Images using Symmetric Kernel Filters and Arithmetic Coding Techniques" (Proc. ICASSP 88, pages 761–763, April 1988), for subband analysis:

$$H_l(z)=\tfrac{1}{8}(-1+2z^{-1}+6z^{-2}+2z^{-3}-z^{-4}) \tag{32}$$

$$H_h(z)=\tfrac{1}{2}(1-2z^{-1}+z^{-2}) \tag{33}$$

The constant factor, ⅛, for the low-pass filter of equation (32) was chosen to provide a DC gain of 1. The corresponding synthesis low-pass and high-pass filters are $G_1(z)=H_h(-z)$ and $G_h(z)=-H_1(-z)$. These pairs of filters each have a perfect reconstruction property with three samples delay. In other words, it is easy to show $$\hat{X}(z)=z^{-3}X(z) \tag{34}$$

where $X(z)$ is the input and $\hat{X}(z)$ is the reconstructed signal.

The temporal segmentation (scene change detection) algorithm is applied on the lowest of the subbands, so that the amount of computation is reduced by factor of sixteen due to the reduced picture size of the lowest band.

The multi-resolution approach for motion estimation provided by MRME 462, will now be described. The resolution level is set to s, which corresponds to the subband filtering stage. Let the maximum filtering stage be denoted by S, which is 2 in FIG. 54. In FIG. 54, s=2 for bands (1, 2, 3, 4)

and s=1 for the others. The initial motion vectors are estimated only in band 1, and they are scaled to generate motion vectors for other subbands, as follows:

$$\vec{d}_i(x,y) = \vec{d}_s(x,y)2^{s-2} + \vec{\Delta}_i(x,y) \quad (35)$$

where $d_i(x,y)$ is the motion vector at block position (x,y) in resolution level i, $d_s(x,y)$ is the initial motion vector, and $\Delta_i(x,y)$ is the correction motion vector found by reduced search area. The initial motion vector, $d_s$, is estimated by a full search with search range 4×4, where the block size is also 4×4. In a computerized simulation, the inventors set $\Delta_i(x,y) = (0,0)$ because the overhead bits for the correction usually exceeded the saving of data bits.

To allow a variable number of P1 reference frames in a GOP, a variable target bit allocation scheme is updated at the beginning of each GOP, as described above for the adaptive selection of reference frames. Hence, the formula for target bit allocation is the same as equation "(30)" given above.

Within a GOP, the target bit allocation for each picture type is also allowed to vary to be adaptive to the changing scene complexity of the actual video sequence. The number of bits generated for the previous picture having the same picture type is used as the target bit allocation. When the number of bits produced for one frame deviates from the target number of bits, the bit allocation for the next picture is adjusted to maintain an acceptable range of bit rate according to the equation:

$$D_t = X_t \times \frac{T_{GOP}}{E_{GOP}} \quad (36)$$

where t is a picture type, with $t \in \{I1, I2, P1, P2, B\}$, $D_t$ is target bit allocation for picture type t, $X_t$ is the number of generated bits for the previous frame of the type t, EGOP is the expected GOP bit rate computed by the most recent data of bits generated for each frame type, and TGOP is the target GOP bit rate. $T_{GOP}$ is computed by M(R/30), where M is the GOP size and R is the target bit rate (bits/sec). $E_{GOP}$ can be computed by the equation:

$$E_{GOP} = \sum_{t \in A_{GOP}} n_t X_t \quad (37)$$

where $A_{GOP}$ is the set of all picture types used in the current GOP, $n_t$ is the number of the frames of picture type t in the GOP, and $X_t$ is either the generated bits for the previous frame of the type t or the initial bit allocation for picture type t when the picture is at the beginning of a GOP.

There are two other concerns for bit rate control; one is to adjust actual coding bits to target bit allocation, and the other is the buffer 332 content control to prevent a buffer overflow or underflow problem. Both of these control problems are handled by the following algorithm. At the end of each slice, the buffer 332 content is updated by $F=F+S_{gen}-S_t$, where F is the buffer 332 content and $S_{gen}$ is the number of bits generated for the slice, and $S_t$ is the number of target bits for the slice. To maintain stable buffer behavior and regulate the generated bit stream to be close to the target bit allocation per frame, the quantization parameter, $Q_p$, is adjusted according to the buffer fullness by using the relation:

$$Q_p = 31 \times F/J \quad (38)$$

where J is the buffer size, taken as the amount of raw data in about three to five pictures, and the number 31 means there are 31 different nonzero step sizes which are coded by 5 bits.

Figure 55:
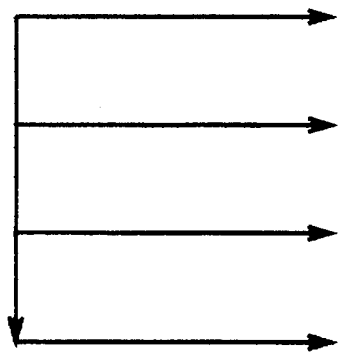
FIG. 55 shows a block scan mode for a differential pulse code modulation (DPCM) scheme using horizontal prediction from the left, with vertical prediction for the first column.
Figure 56:
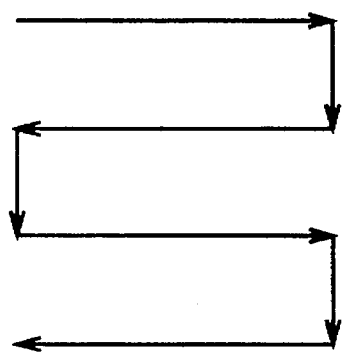
FIG. 56 shows a block scan horizontal scan mode relative to the subband encoding system of FIG. 53.
Figure 57:
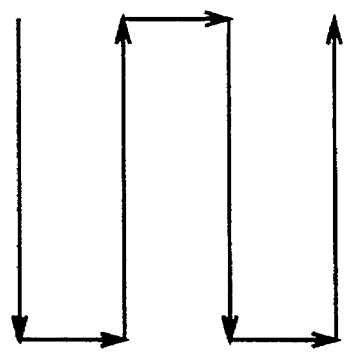
FIG. 57 shows a vertical block scan mode relative to the subband encoding system of FIG. 53.

Blockwise DPCM and a uniform quantizer are used only for the subband 1 of an I frame. In the DPCM, horizontal prediction from the left is used except for the first column where vertical prediction from above is used as in FIG. 55. All subbands except the lowest subband of an I frame, regardless of the picture type, are coded by PCM (pulse code modulation) with a deadzone quantizer because there is little spatial correlation in high-pass filtered subbands as well as motion compensated residual images. Horizontal and vertical scan modes are chosen according to the low-pass filtered direction. Hence, the horizontal scan mode in FIG. 56 is used for bands 2 and 5 (see FIG. 54). This mode is also used for bands 4 and 7 (see FIG. 54) by default because the bands are high-pass filtered in both directions. The vertical mode of FIG. 57 is used for bands 3 and 6 (see FIG. 54).

These scan mode selections contribute to statistical redundancy reduction by run-length encoding combined with Huffman coding. The Huffman coding table is generated from run-length histogram data obtained from several training image sequences including Tennis, Football, and flowergarden. Truncated Huffman coding is actually used to limit codeword length. The codeword entries having length larger than 17 bits, are replaced by fixed length codewords of either 20 or 28 bits which are defined in the MPEG standard.

Simulations were carried out using the Tennis and Football sequences to compare the TAMI algorithm to a fixed scheme. Block type decisions for P and B frames as in MPEG, 4×4 block size for s=1, 8×8 block size for s=2, and telescopic searching having half-pixel accuracy for motion estimation are used. As for the two temporal segmentation algorithms, difference of histograms of gray levels were selected for the distance measure. The thresholds used are $0.25N_{pix}$ for Type 1 detection, $0.1N_{pix}$ for Type 0 detection, where $N_{pix}$ is the number of pixels in a single frame. All three color components (Y, U, and V) are encoded, and the bit rate results are computed by summing the compressed data bits for the three color components, the bits for quantization parameter, the motion vector bits, and the header bits, but the SNR curves are for Y components only.

FIG. 58 shows a table of performance comparisons of average SNR and bits. It shows that TAMI is better than a nonadaptive scheme by 0.9 dB for Tennis and 0.7 dB for Football. Although the SNR difference between the two schemes has been shown to be slight, TAMI has a more stable picture quality than the fixed scheme. TAMI automatically inserts more P frames by detecting the global motion, such as zooming, for example.

In a real time display of the reconstructed sequences of Tennis and Football, the quality differences between TAMI and a nonadaptive scheme were much more noticeable. The quality of TAMI was shown to be clearer and to have less blinking than that of the fixed scheme.

It was shown by experiments that adaptive selection of reference frames for subband motion compensation compares favorably with the nonadaptive schemes in terms of both subjective quality and an objective measure, SNR. The trade-off is that it requires a certain amount of encoding delay because it needs to look ahead at GOP frames prior to encoding. The present embodiment provides a good scene adaptive scheme for removing temporal redundancy using motion compensation in subband domain.

Figure 59:
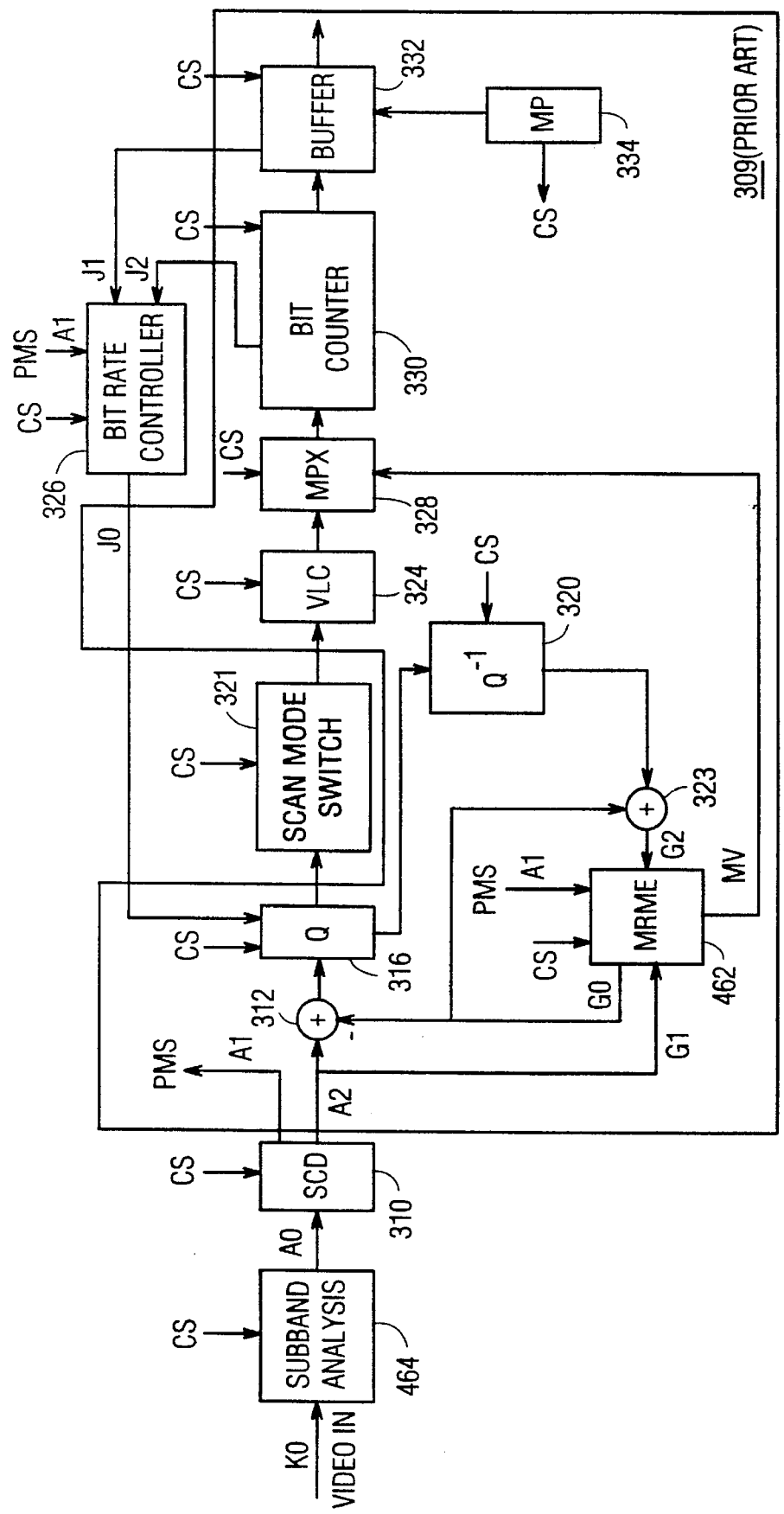
FIG. 59 shows a block schematic diagram supplementary to FIG. 53 for providing greater details of a system for the subband video encoding embodiment of the invention.

In FIG. 59, a block schematic diagram supplementary to and an expansion of FIG. 53 as shown, for giving greater details of a system for the subband video encoding embodiments of the invention. The system as shown is very similar to the encoding system shown in FIG. 39, and like components relative to the latter are shown in FIG. 59 with same reference designation, which components provide the same functions as described for FIG. 39. The differences are that the motion compensation module 318 on FIG. 39 is replaced by the multi-resolution motion estimation module 462. Such a multi-resolution motion estimation module 462 is known in the art, and is described in the paper of Y. Q. Zhang and S. Zafar, Ibid. Also, the discrete cosine transform module 314, and inverse discrete cosine transform module 322 of FIG. 39 are not included in the system of FIG. 59. Another difference is that a scan mode switch 321 is included between the quantizer 316 and the variable length coding module 324 in FIG. 59. The purpose of the scan mode switch 321 is to switch between the various scan modes, for processing each subband. Lastly, another difference is that the subband analysis module 464 is included before the scene change detector 310 in the system of FIG. 59, and is not included in the system of FIG. 39.

Figure 60:
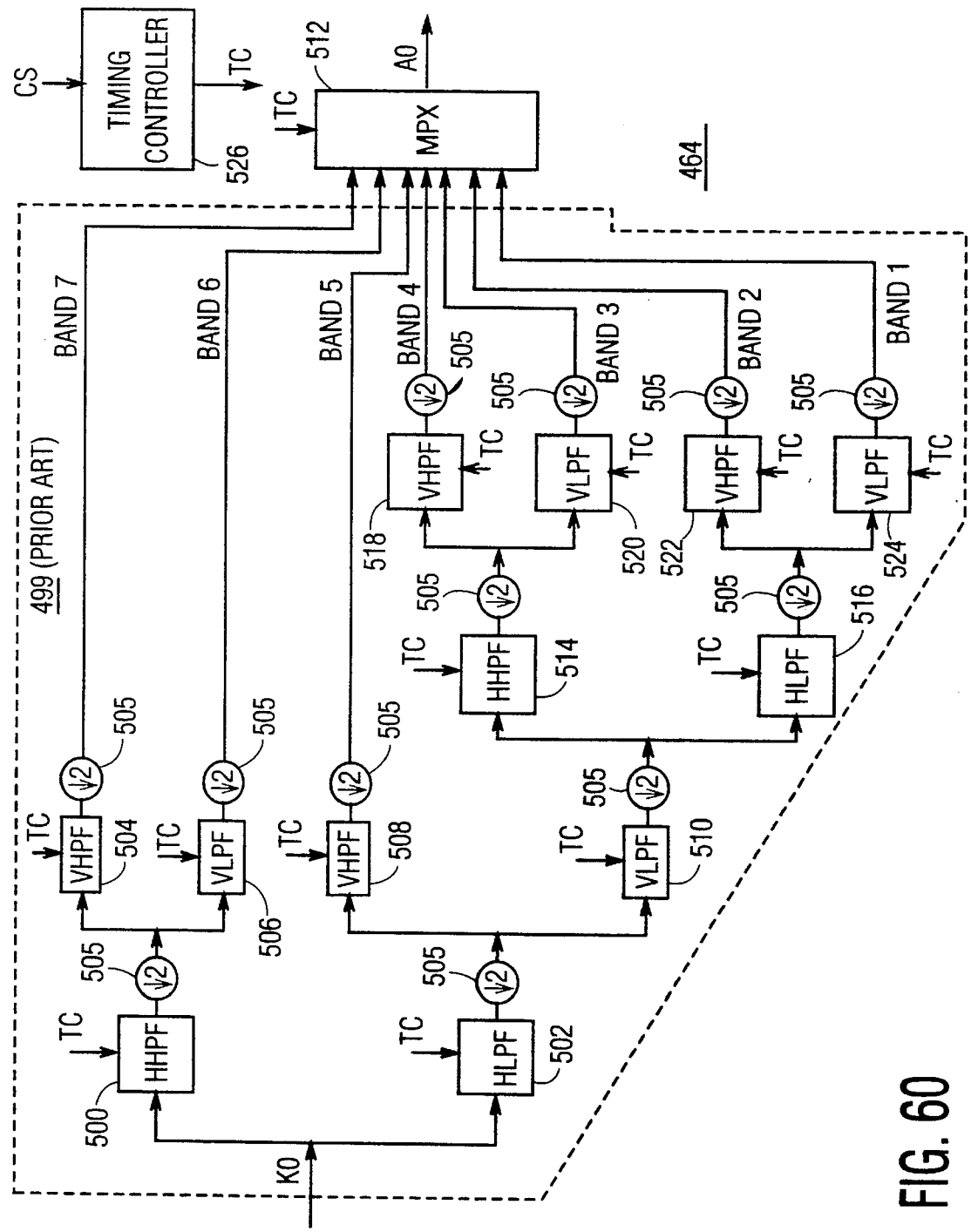
FIG. 60 shows a block schematic diagram of the subband analysis module of the subband video encoding system of FIG. 59.

The subband analysis module 464 of FIGS. 53 and 59 is shown in greater detail in FIG. 60. As shown, the subband analysis module 464 includes a timing controller module 526, responsive to a control signal CS for outputting a timing control signal TC that is used to control all of the various modules of the remainder of the system shown. Video data received along line K0 is passed through a horizontal highpass filter 500, and a horizontal lowpass filter 502. The output of horizontal highpass filter 500 is passed through a subsampling module or decimator or downsampler 505, for removing every other data sample, which are redundant after the filtering step, as is known in the art. The subsampled filtered video data is then passed through a vertical highpass filter 504 and vertical lowpass filter 506, respectively, the respective outputs of which are passed through subsampling modules 505, for providing the filtered subband data along output lines labelled "Band 7" and "Band 6", respectively.

The filtered video data from the horizontal lowpass filter 502 is passed through a subsampling module 505, and provided as input data to both a vertical highpass filter 508 and vertical lowpass filter 510. The filtered video output data from the vertical highpass filter 508 is passed through a subsampling module 505, and outputted as video subband data along an output line labeled "Band 5".

The filtered output data from the vertical lowpass filter 510 is passed through a subsampling module 505, and delivered therefrom as input video data to both a horizontal highpass filter 514, and a horizontal lowpass filter 516. The filtered video output data from the horizontal highpass filter 514 is passed through a subsampling module 505, and provided as filtered video input data to both a vertical highpass filter 518 and vertical lowpass filter 520, the respective outputs which are passed through respective subsampling modules 505 and passed along subband lines shown as "Band 4" and "Band 3", respectively.

The filtered video output data from horizontal lowpass filter 516 is passed through a subsampling module 505, and therefrom provided as filter input video data to both a vertical highpass filter 522 and vertical lowpass filter 524, respectively; the respective outputs of which are passed through subsampling modules 505, respectively, and therefrom outputted onto subband lines "Band 2" and "Band 1", respectively. All of the aforesaid horizontal and vertical highpass and lowpass filters enclosed within the dashed line area designated 499 represent a known subband filtering system, as previously indicated, for providing double filtering. The present inventors added a multiplexer 512 for receiving the subband data from subband lines "Band 1" through "Band 7", respectively. The multiplexed output data is then provided along output line A0 from multiplexer 512 for connection as input data to the scene change detector 310, as shown in FIG. 59.

Although various embodiments of the invention have been shown and described herein, they are not meant to be limiting. Those of skill in the art may recognize certain modifications to these embodiments, which modifications are meant to be covered by the spirit and scope of the appended claims.

What is claimed is:

1. A method for compressing video data comprising the steps of:

determining the degree of global motion between frames of video data, where global motion is the motion between frames as a whole;

assigning reference frames based upon the global motion;

adjusting the temporal spacing between reference frames relative to the degree of global motion measured between frames relative to temporal masking in human vision, thereby determining the group of pictures (GOP) structure;

establishing different threshold magnitudes or levels of motion between frames as representing different scene change types;

assigning different bit rates to individual frames based upon said pre-established threshold levels of motion between frames;

said threshold establishing step including the steps of designating a Type 1 scene change between a pair of successive frames as occurring whenever the measured motion therebetween exceeds a value defining a $T_1$ threshold representing a substantial scene or picture change; and designating and defining pursuant to the value of measured motion defining a Type 1 scene change, the first occurring or prior frame of the pair as a P2 frame, and the second occurring or past frame as an I2 frame, each being of predetermined bit rates via said assigning step.

2. The method of claim 1, further including the step of:

assigning a bit rate for video coding each frame based upon the degree of global motion measured between frames.

3. The method of claim 2, further including the step of:

assigning reference frames as intra (I) and predictive (P) based upon the degree of global motion measured between frames.

4. The method of claim 3, further including the step of: assigning bidirectional (B) interpolated frames between reference frames.

5. The method of claim 1, further including the steps of:

said threshold establishing step including a step of designating and defining a Type 0 scene change between frames occurring whenever the measured motion therebetween exceeds a value defined as a $T_0$ threshold, whereby the $T_0$ threshold represents substantial motion in a scene or picture; and detecting when the cumulative motion from an immediately preceding reference frame and a successive frame exceeds a $T_0$ threshold, for designating and defining the immediately prior frame to said successive frame as a P1 frame of predetermined bit rate via said assigning step, said P1 frame being a reference frame.

6. The method of claim 1, wherein said assigning step further assigns bit rates to said frames by using forward temporal masking in human vision, whereby at a scene change an immediately following frame is coarsely coded.

7. The method of claim 1, wherein said assigning step further assigns bit rates to said frames in a manner utilizing a backward temporal masking effect in a resulting coding scheme, whereby in instances where a scene change involves relatively large motion between two successive frames, the immediately past frame at the scene change and the immediately following frame are coarsely coded via the assignment of a relatively low bit rate.

8. The method of claim 1, wherein said global motion determining step uses any one of five different distance measures for temporal segmentation including difference of histograms (DOH), histograms of difference (HOD), block histogram difference (BH), block variance difference (BV), and motion compensation error (MCE).

9. The method of claim 1, wherein said assigning step includes the step of designating individual frames as intra frames (I), and/or predicted frames (P) based upon the magnitude of motion between associated frames exceeding a given threshold level.

10. The method of claim 1, further including the steps of:
said threshold establishing step including a step of designating a Type 0 scene change between frames occurring whenever the measured motion therebetween exceeds a value defined as a $T_0$ threshold representing substantial motion in a scene or picture; and
detecting when the cumulative motion from an immediately preceding reference frame and a successive frame exceeds a $T_0$ threshold, for designating and defining the immediately prior frame to said successive frame as a P1 frame of predetermined bit rate via said assigning step, said P1 frame being a reference frame.

11. The method of claim 10, further including the steps of:
designating successive frames between reference frames as bidirectional B frames, respectively.

12. The method of claim 10, wherein the magnitude of said $T_1$ threshold is made about four times greater than the magnitude of said $T_0$ threshold, whereby the $T_1$ threshold represents a complete scene or picture change between a pair of successive frames.

13. The method of claim 10, further including the step of:
optimally spacing said P1 designated frames for substantially optimizing the frame spacing between I1, I2, P1, and P2 reference frames.

14. The method of claim 13, wherein said optimally spacing step includes the step of conducting a binary search between frames to find substantially equidistant positions for Type 0 threshold change P1 designated frames.

15. The method of claim 13, wherein said optimal spacing step includes the steps of:
minimizing the deviation from the mean of distances between frame positions initially designated P1 through Type 0 threshold detection, and paired frame positions designated I2 and P2, respectively, via Type 1 threshold detection; and
determining the structure for each GOP based upon the optimally spaced P1 frames.

16. The method of claim 15, wherein said optimal spacing step includes the steps of exhaustively searching each frame for determining motion vectors.

17. The method of claim 15, wherein said optimal spacing step includes the steps of using a backward telescopic search for determining motion vector information between frames.

18. The method of claim 10, further including the steps of:
establishing a predetermined number of successive frames as a group of pictures (GOP) thereby grouping said successive frames into a plurality of successive GOP's; and
designating the first frame of each of said plurality of GOP's as an I1 frame of predetermined bit rate via said assigning step.

19. The method of claim 18, further including the steps of:
designating and defining frames as B1 frames between $I_1$ and $P_1$ reference frames in each of said plurality of GOP's where at least one Type 0 scene change has been detected, said B1 frames each having a predetermined bit rate via said assigning step; and
designating and defining frames as B2 frames between reference frames in each of said plurality of GOP's where no Type 0 scene changes have been detected, said B2 frames each having a predetermined bit rate via said assigning step.

20. The method of claim 19, wherein said I1 and I2 frames are intra frames, said P1 and P2 frames, are predicted frames, and said B1 and B2 frames are bidirectionally interpolated frames.

21. The method of claim 19, further including the step of gradually increasing to a full bit rate the bit rate of frames following a scene change to render the degradation of frames following a scene change imperceptible.

22. The method of claim 19, further including the step of computing the bit allocations for B2 frames to follow the equation:

$$|B2| = |B1| + \frac{|P1| - |B1|}{M - N - 1}$$

where N is the number of |P1| frames, M is the number of frames in each GOP, |B1| is the bit allocation for B1 frames, and |P1| is the bit allocation for P1 frames.

23. The method of claim 19, wherein said assigning step further includes the steps of:
assigning the relatively highest bit rate to I1 designated frames;
assigning the second highest bit rate to P1 designated frames;
assigning the third highest bit rate to B2 designated frames; and
assigning relatively lower bit rates to I2, P2, and B1 designated frames.

24. The method of claim 23, wherein said assigning step includes assigning bit rates of 200kB/sec. for I1 frames, 100kB/sec. for P1 frames, greater than 10kB/sec. for B2 frames, and 10kB/sec. for B1, I2, and P2 frames, respectively.

25. The method of claim 23, further including the step of:
allocating the same number of bits from GOP to GOP for I1, I2, P1, and P2 designated frames, respectively.

26. The method of claim 23, further including the steps of:
varying the bit allocations for each I1, I2, P1, P2, and B1 frame types from GOP to GOP; and
retaining the bit rate constant for each of said frame types.

27. The method of claim 26, further including in said bit allocation varying step the step of assigning target bit allocations for each GOP in accordance with the following formula:

$$D_t = C_t \frac{R}{2(C_{I1} + NC_{P1} + (M - N - 1)C_{B1})}$$

where $D_t$ is the target bit allocation for picture Type t, t being either I1, I2, P1, P2, or B1; $C_{I1}$, $C_{P1}$, and $C_{B1}$, respectively; N is the number of P1 frames, M is the GOP size or number of frames in a GOP; R=2G where G=[$C_{I1}$+$NC_{P1}$+(M-N-

1)$C_{B1}$]X; and X is a common factor determined from R and G.

28. The method of claim 23, further including the step of:

varying the number of bits allocated for I1, I2, P1, P2, B1, and B2 designated frames, respectively, from GOP to GOP in accordance with the number of detected Type 0 scene changes; and maintaining the ratio of bit allocations between I1, I2, P1, P2, B1, and B2 designated frames constant from frame to frame within a GOP.

29. The method of claim 28, further including the step of:

inserting extra P1 frames into temporally busy regions, for producing a more constant perceptual picture quality.

30. The method of claim 29, wherein said inserting step further includes the step of satisfying the following equation:

$$R = \frac{30}{M} [R_{i1} + kR_{p1} + (M - 1 - k)R_{b1}]$$

where k is the number of P1 designated frames, M is the GOP size, $R_{i1}$, $R_{p1}$, and $R_{b1}$ are bit rate allocations for I1, P1, and B1 frames, respectively, and R is the channel bit rate per second, whereby $R_{i1}$, $R_{p1}$, and $R_{b1}$ are adjusted to keep R at a desired constant value.

31. The method of claim 23, further including the step of using the designated positions of P1 and/or P2, and B1, and/or B2 frames, for processing the frames through a motion compensated interpolation encoder, for encoding or compressing the associated video data.

32. The method of claim 31, further including the step of using a telescopic motion vector searching for determining motion between frames.

33. The method of claim 31, further including the steps of:

sensing the bit rate being employed in said encoder in processing frames; and adjusting the coarseness of quantizing frames in said encoder in proportion to the deviation or error between an actual bit rate and a target bit rate.

34. The method of claim 33, further including the step of limiting the number of quantized P1 frames in high-motion segments between frames by replacing such P1 frames with B1 frames for substantially maximizing the quality of the resultant picture.

35. The method of claim 33, wherein said adjusting step is in accordance with the following equation:

$$TB = XTB \left[ \frac{TBR_{GOP}}{ABR_{GOP}} \right]$$

where TB is target bit allocation, XTB is the target bit allocation for the previous frame, $ABR_{GOP}$ is the actual GOP bit rate, and $TBR_{GOP}$ is the target GOP bit rate.

36. The method of claim 31, further including the step of:

inserting N P1 frames into the structure of each GOP by default, for reducing encoding delays and distances between reference frames, where N is an integer number 1, 2, 3 . . . ; and processing each GOP through said encoder via encoding the first frame through successive frames to the first P1 default, and through the next successive frames to the next occurring P1 default, in an iterative manner until all frames have been encoded.

37. The method of claim 36, further including the step of:

sizing each GOP to have an even number of frames whenever N is odd; and sizing each GOP to have an odd number of frames whenever N is even.

38. A system for compressing video data comprising video data associated with groups of pictures (GOP) including a predetermined number of frames, said system comprising:

motion detection means for determining the degree of global motion between said frames, where global motion is the motion between frames as a whole, wherein said motion detection means includes Type 0 scene change detector means for detecting when the cumulative motion from an immediately preceding reference frame, and a successive frame exceeds a predetermined value defined as a $T_0$ threshold, whereby said designating means responds by designating and defining the immediately prior frame to said successive frame as a P1 frame;

means responsive to said global motion measurements from said motion detection means for both designating certain of said frames as reference frames, and adjusting the temporal spacing between reference frames, thereby determining the GOP structure, wherein said designating means includes means for coding said reference frames as I and/or P, and B frames relative to global motion between frames; and encoder means for encoding said reference frames.

39. The system of claim 38, wherein said motion detection means includes:

Type 1 scene change detector means for detecting when the measured level of global motion between two successive frames exceeds a predetermined value defined as a $T_1$ threshold representing a substantial scene or picture change, whereby said designating means responds by designating and defining the first occurring of the two successive frames as a P2 frame, and the other or second occurring of the two successive frames as an I2 frame.

40. The system of claim 38, wherein said motion detection means further includes:

Type 1 scene change detector means for detecting when the global motion between two successive frames exceeds a predetermined $T_1$ threshold representing a substantial scene or picture change, whereby said designating means responds by designating the first occurring of the two successive frames as a P2 frame, and the other or second occurring of the two successive frames as an I2 frame.

41. The system of claim 40, wherein said frames are arranged in groups of pictures (GOP) each consisting of a predetermined number of successive frames, and said encoder means further includes:

bit rate controller means for insuring that the number of bits being utilized in encoding a given GOP do not exceed the bit capability of said system.

42. A method for compressing video data comprising the steps of:

determining the degree of global motion between frames of video data, where global motion is the motion between frames as a whole;

assigning reference frames based upon the global motion;

adjusting the temporal spacing between reference frames relative to the degree of global motion measured between frames relative to temporal masking in human vision, thereby determining the group of pictures (GOP) structure;

establishing different threshold magnitudes or levels of motion between frames as representing different scene change types; and assigning different bit rates to individual frames based upon said pre-established threshold levels of motion between frames, wherein said assigning step further assigns bit rates to said frames in a manner utilizing a backward temporal masking effect in a resulting coding scheme, whereby in instances where a scene change involves relatively large motion between two successive frames, the immediately past frame at the scene change and the immediately following frame are coarsely coded via the assignment of a relatively low bit rate.

43. A system for compressing video data comprising video data associated with groups of pictures (GOP) including a predetermined number of frames, said system comprising:

motion detection means for determining the degree of global motion between said frames, where global motion is the motion between frames as a whole, wherein said motion detection means includes Type 1 scene change detector means for detecting when the measured level of global motion between two successive frames exceeds a predetermined value defined as a $T_1$ threshold representing a substantial scene or picture change, whereby said designating means responds by designating and defining the first occurring of the two successive frames as a P2 frame, and the other or second occurring of the two successive frames as an I2 frame;

means responsive to said global motion measurements from said motion detection means for both designating certain of said frames as reference frames, and adjusting the temporal spacing between reference frames, thereby determining the GOP structure; and encoder means for encoding said reference frames.

44. A method for compressing video data comprising the steps of:

determining the degree of global motion between frames of video data, where global motion is the motion between frames as a whole;

assigning reference frames based upon the global motion;

adjusting the temporal spacing between reference frames relative to the degree of global motion measured between frames relative to temporal masking in human vision, thereby determining the group of pictures (GOP) structure;

establishing different threshold magnitudes or levels of motion between frames as representing different scene change types; and assigning different bit rates to individual frames based upon said pre-established threshold levels of motion between frames, wherein said assigning step further assigns bit rates to said frames by using forward temporal masking in human vision, whereby at a scene change an immediately following frame is coarsely coded.

* * * * *